US012483329B2

(12) United States Patent
Hariq et al.

(10) Patent No.: US 12,483,329 B2
(45) Date of Patent: Nov. 25, 2025

(54) RELAYED GROUND-TO-SATELLITE FREE-SPACE-OPTICAL COMMUNICATIONS

(71) Applicant: Hughes Network Systems, LLC, Germantown, MD (US)

(72) Inventors: Sayed Hasan Hariq, Germantown, MD (US); Rohit Iyer Seshadri, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 241 days.

(21) Appl. No.: 18/296,436

(22) Filed: Apr. 6, 2023

(65) Prior Publication Data

US 2024/0340083 A1 Oct. 10, 2024

(51) Int. Cl.
| | | |
|---|---|---|
| *H04B 10/11* | (2013.01) | |
| *H04B 10/112* | (2013.01) | |
| *H04B 10/118* | (2013.01) | |
| *H04B 10/29* | (2013.01) | |

(52) U.S. Cl.
CPC ....... *H04B 10/118* (2013.01); *H04B 10/1127* (2013.01); *H04B 10/29* (2013.01); *H04B 10/11* (2013.01); *H04B 10/112* (2013.01); *H04B 10/1129* (2013.01)

(58) Field of Classification Search
CPC .. H04B 10/118; H04B 10/1127; H04B 10/29; H04B 10/11; H04B 10/112; H04B 10/1129
USPC .................................................. 398/118–131
See application file for complete search history.

(56) References Cited

U.S. PATENT DOCUMENTS

| | | | | |
|---|---|---|---|---|
| 8,152,093 B2* | 4/2012 | Liggett | ..................... | B32B 3/08 244/30 |
| 8,493,889 B2* | 7/2013 | Wittenschlaeger | ... | H04W 36/12 370/254 |
| 8,918,047 B1* | 12/2014 | Teller | ................. | H04B 7/18513 455/427 |

(Continued)

OTHER PUBLICATIONS

Ray Partha Pratim: "A review on 6G for space-air ground integrated network: Key enablers, open challenges, and future direction," King Saud University Journal of Computer and Information Sciences, vol. 34, No. 9, Oct. 1, 2022 (Oct. 1, 2022), pp. 6949-6976, P093.051484, SA ISSN: 1319-1578, DOI: 10.101 / .jksuci.2021.08. 014 abstract; figure 2.

(Continued)

*Primary Examiner* — Dibson J Sanchez
(74) *Attorney, Agent, or Firm* — Kilpatrick Townsend & Stockton LLP

(57) ABSTRACT

Techniques are described for implementing free space optical (FSO) ground-to-satellite communications. In general, an optical ground station communicates optically with a satellite via a ground-to-satellite FSO communication link. Embodiments described herein deploy at least two FSO relays at one or more aerial platform altitudes to effectively segment the ground-to-satellite FSO communication link into three or more FSO sub-links. Each FSO sub-link has better optical link performance (e.g., lower outage probability) than a single direct link. The FSO relays can include tropospheric FSO relays on low-altitude platforms and/or stratospheric FSO relays on high-altitude platforms, and architectures can use the FSO relays in a serial and/or parallel manner.

18 Claims, 38 Drawing Sheets

(56) References Cited

U.S. PATENT DOCUMENTS

| | | | | |
|---|---|---|---|---|
| 9,153,854 | B1* | 10/2015 | Biffle | H04B 7/18502 |
| 9,712,900 | B1* | 7/2017 | Wang | H04B 10/1129 |
| 10,225,011 | B1* | 3/2019 | Schubert | H04B 10/1121 |
| 10,359,570 | B1* | 7/2019 | Belt | H04B 10/112 |
| 10,805,807 | B1* | 10/2020 | Barritt | H04B 7/18504 |
| 2016/0285541 | A1* | 9/2016 | Liu | H04B 10/503 |
| 2017/0181158 | A1* | 6/2017 | Gong | H04W 40/20 |
| 2017/0272173 | A1* | 9/2017 | Ito | H04B 10/572 |
| 2019/0020701 | A1* | 1/2019 | Barritt | H04L 67/5681 |
| 2019/0140737 | A1 | 5/2019 | Vandenberg et al. | |
| 2020/0119805 | A1* | 4/2020 | Miyakawa | H04W 24/04 |
| 2021/0194583 | A1* | 6/2021 | Maho | H04B 10/1123 |

OTHER PUBLICATIONS

Olfa Ben Yahia et al: "HAPS Selection for Hybrid RF/FSO Satellite Networks", arxiv.org, Cornell University Library, 201 Olin Library, Cornell University, Ithaca, NY 14853, Nov. 30, 2021 (Nov. 30, 2021), XP091090552f figure 1, 12 pages.

Kremenetskaya Yana et al: "Optical-Radio Hybrid Technology in Multilayer Non-Terrestrial Telecommunications", 2021 IEEE International Conference on Information and Telecommunication Technologies and Radio Electronics (UKRMICO), IEEE, Nov. 29, 2021 (Nov. 29, 2021), pp. 1-6, XP034091699, DOI: 10 .1109 / UKRMIC052950. 20tl.9716661 [retrieved on Feb. 17, 2022] abstract; figure 5.

Samy Ramy et al: "Reliable Terabits Feeder Link for Very High-Throughput Satellite Systems with SAG-FSO Transmission", IEEE Wireless Communications, Coordinated Science Laboratory; Dept. Electrical and Computer Engineering; University of Illinois at Urbana-Champaign, US, vol. 31, No. 2, Mar. 25, 2023 (Mar. 25, 2023), pp. 112-116, XP011966007, ISSN: 1536-1284, DOI 10.1109 / MWC.0i6.2200425 [retrieved on Mar. 27, 2023] figure 1, p. 113, Section 11 "Low-Complexity. SAG-FSO Feeder Link Solution with Multiple HAP Relays".

* cited by examiner

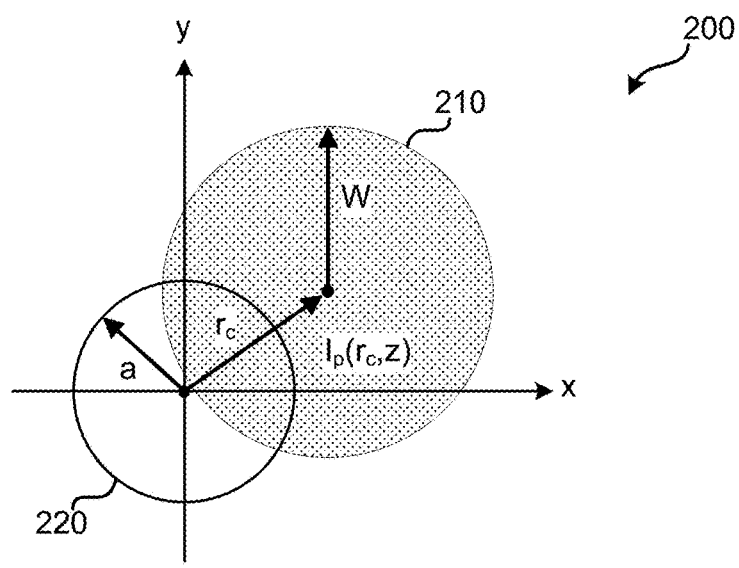
FIG. 2
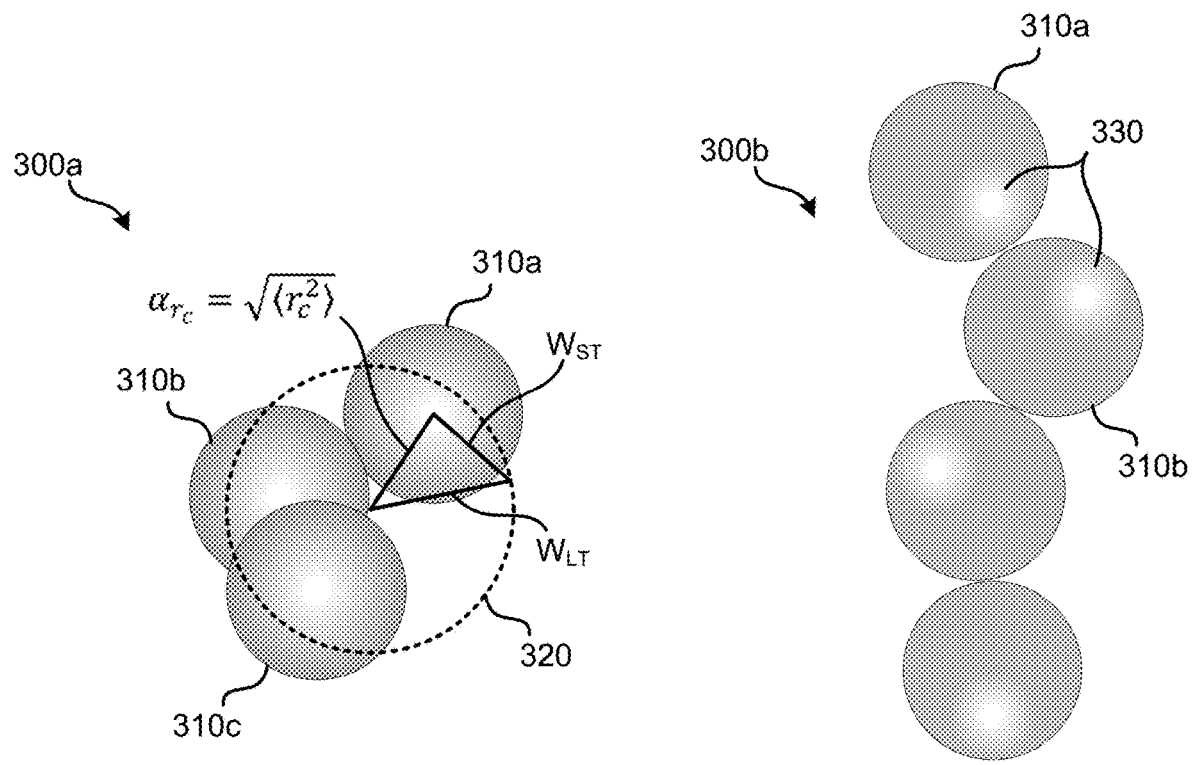
FIG. 3A  FIG. 3B

RELAYED GROUND-TO-SATELLITE FREE-SPACE-OPTICAL COMMUNICATIONS

BACKGROUND

Satellite communications are generally in several radiofrequency (RF) bands. However, those RF bands have become increasingly congested and costly, particularly as most suitable frequency bands have been licensed. Free-space-optical (FSO) communications refers to line-of-sight (LOS) communications using an optical carrier to convey information between two fixed points in the outdoor environment. FSO communications are typically infrared (IR) band communications, such as using IR lasers, not in the RF bands generally used by satellite communications. FSO communications can potentially provide certain features as compared to RF communications, due, for example, to appreciable amounts of unlicensed spectrum, very narrow beams, low power consumption, inexpensive installation cost with faster deployment, etc. With recent advancements in space technology and in sophisticated optical sources and detectors, there has been an interest in exploring use of FSO links in satellite communication contexts, potentially offering appreciably larger data rates (e.g., up to terabits per second).

The performance of a ground-to-satellite FSO link is mainly affected by atmospheric channel impairments, such as atmospheric attenuation, beam scintillation, beam wandering, and pointing errors. These types of channel impairments produce frequent link failures. For example, the interaction between the photons of the optical beam and the molecular constituent of the atmosphere, as well as the existence of fog and clouds in the atmosphere, can cause very large signal attenuations. Inhomogeneities in the atmospheric temperature from point to point can cause atmospheric turbulence, which can result in random fluctuation of the atmospheric refractive index along the path of the optical radiation traversing the atmosphere. Beam scintillation and beam wandering is the result of interactions between the laser beam and this turbulent atmospheric medium, which results in random fluctuations of the received beam intensity and degradation of system performance. Pointing error can result from lack of perfect alignment between the transmitter and the receiver, which can result in power penalties. These and other practical constraints have frustrated conventional attempts at implementing reliable ground-to-satellite FSO links.

SUMMARY

Embodiments described herein include systems and methods for implementing free space optical (FSO) ground-to-satellite communications. In general, an optical ground station communicates optically with a satellite via a ground-to-satellite FSO communication link. Embodiments described herein deploy at least two FSO relays at one or more aerial platform altitudes to effectively segment the ground-to-satellite FSO communication link into three or more FSO sub-links. Each FSO sub-link has better optical link performance (e.g., lower outage probability) than a single direct link. The FSO relays can include tropospheric FSO relays on low-altitude platforms and/or stratospheric FSO relays on high-altitude platforms, and architectures can use the FSO relays in a serial and/or parallel manner.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 shows an illustrative representation of a circular detection aperture and a Gaussian beam profile at a receiver, with misalignment in the receiver plane.

FIG. 3A illustrates random movement of a beam centroid in a receiver plane due to beam wander.

FIG. 3B illustrates random movement of a beam hot-spot around a beam centroid due to beam wander.

DETAILED DESCRIPTION

Figure 1:
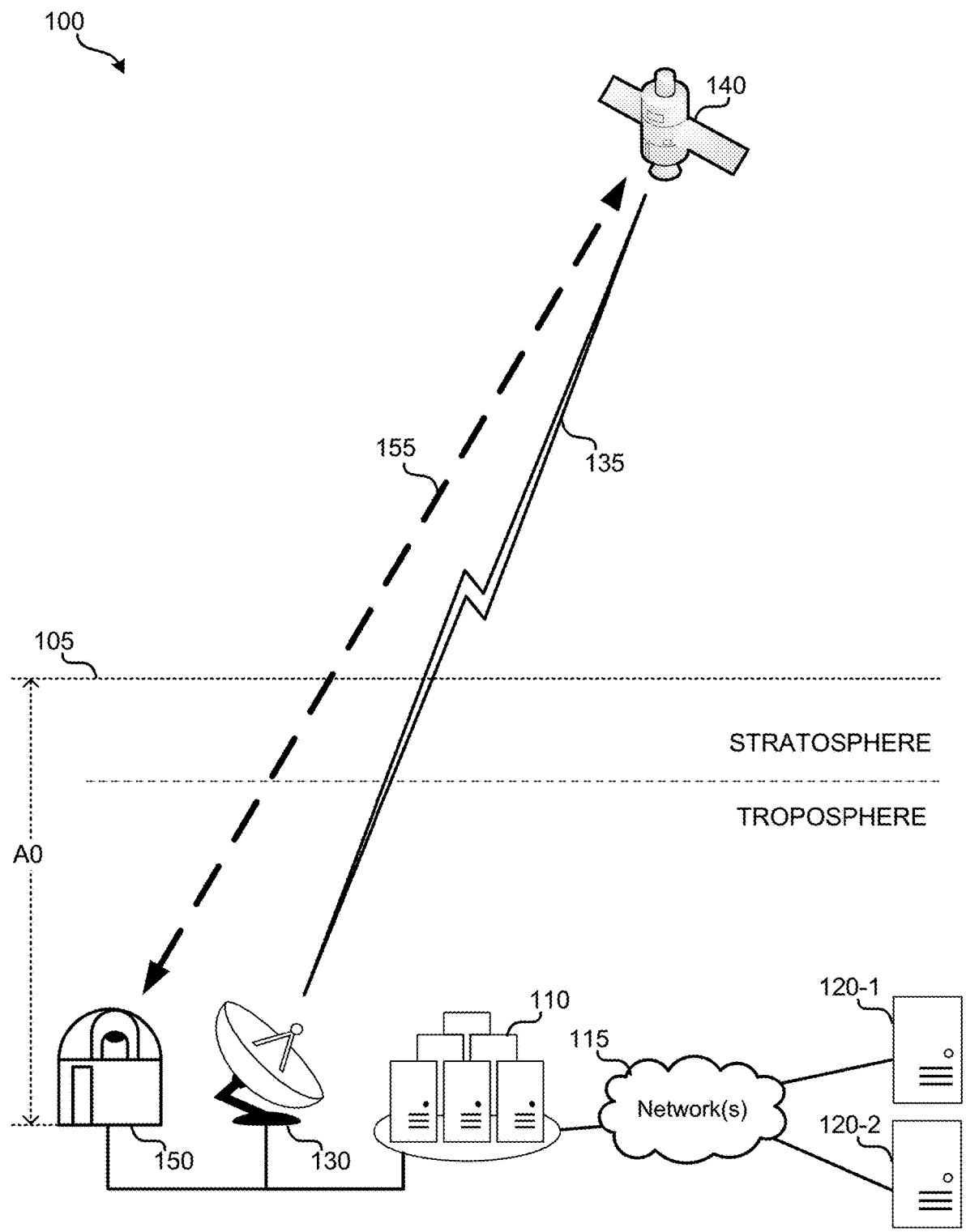
FIG. 1 shows an example of a communication environment in which ground equipment is in communication with a communication satellite via one or more communication links.

Embodiments described herein seek to implement reliable ground-to-satellite free-space-optical (FSO) links. Implementing an FSO link directly between a ground station and a satellite involves sending an optical signal over a very large distance (e.g., up to around 1,000 kilometers for a low-Earth orbit (LEO) satellite, and up to tens of thousands of kilometers for a geosynchronous (GEO) satellite), including passing the signal through tens of kilometers of atmosphere. Conventional attempts have been frustrated by presence of adverse atmospheric effects.

One such effect is atmospheric attenuation and path loss. For example, the molecular and gaseous structure of the atmosphere and its interaction with photons of a propagated FSO beam can cause appreciably large optical signal attenuation, even in clear weather conditions. Presence of fog and clouds cause further signal attenuation and even signal blockage. Further, FSO links tend to experience a very large free-space path loss due to the very short wavelengths of the infrared (IR) beam. Other adverse atmospheric effects include beam scintillation and beam wander. Inhomogeneities in the temperature of the atmosphere can cause fluctuations in the refractive index of the atmosphere from point to point, referred to as optical turbulence, and can produce eddies of different temperatures that act like refractive prisms of different sizes and indices of refraction. Interactions between the FSO links (e.g., an IR laser beam) and the turbulent medium, in particular with the small-scale eddies in the order of or smaller than the beam size, can produce random phase and amplitude variations of the information-bearing optical beam, known as beam scintillation, which can result in fading of the received optical power. Interactions between the FSO link and larger scale eddies (larger than the beam size) can cause random displacement of the instantaneous center of the beam in the receiver plane, known as beam wander, which can result in beam wander-induced pointing error.

In addition to atmospheric effects, additional power penalties can arise from imperfect alignment between the Earth transmitter and the receiving satellite. For example, even a very small pointing error can result in an appreciable receiver-transmitter misalignment when the transmitter and receiver are separated by thousands of kilometers. The various real-world impairments described above have all frustrated conventional attempts at implementing a reliable ground-to-satellite FSO link.

Several novel techniques are described herein to mitigate these types of impairments, thereby providing a highly reliable ground-to-satellite FSO link. In particular, embodiments include at least two FSO relays in the ground-to-satellite FSO link. The at least two FSO relays include high-altitude platform stations (HAPSs) and/or low-altitude platform stations (LAPSs), deployed as series and/or parallel relay architectures between a ground station and a satellite to split the ground-to-satellite link into several sub-links. Each sub-link experiences appreciably smaller effects from atmospheric channel impairments and alignment errors, which can appreciably improve the overall reliability of the link from the ground station to the satellite. For example, smaller sub-links will tend to have much lower attenuation and path loss compared to a single direct link, smaller sub-links will tend to have a reduced scintillation index (which is distance-dependent), and smaller sub-links will tend to experience reduced beam wander and pointing error effects (which are also distance-dependent). Some embodiments also seek to further improve power efficiency and/or other performance of the ground-to-satellite FSO link, such as by seeking to optimize power allocation to source and relay nodes, by seeking to optimize HAPS and/or LAPS altitude based on intermediate channel conditions, by seeking to optimize beam radius at the transmitter to further decrease the effect of beam wander and pointing error, etc.

As used herein, FSO communications generally refer to line-of-sight optical communications in the infrared (IR), or more particularly the near-IR, frequency band. Although FSO can generally refer to line-of-sight communications in any optical frequency band, most bands do not have propagation characteristics suitable for the types of distances of concern in this disclosure. For example, even communications between a ground terminal and a LAPS tend to use near-IR lasers, or the like, to produce optical beams with desired beam width, beam power, etc.

For context, FIG. 1 shows an example of a communication environment 100 in which ground equipment is in communication with a communication satellite 140 via one or more communication links. The communication environment 100 can include a gateway system 110, network(s) 115, data systems 120 (e.g., 120-1, 120-2), gateway satellite antenna 130, optical ground station 150, and satellite 140. The gateway system 110 can be an implementation of a ground Earth station (GES) teleport gateway. Gateway system 110 may serve as a bridge or gateway between a satellite communication network and the one or more networks 115. For example, the network(s) 115 can include the Internet, and/or any other communication networks that are public and/or private, wired and/or wireless, etc. The network(s) 115 can also be in communication with computational data systems 120, such as Internet-accessible server systems. For example, the gateway system 110 can communicate with the Internet and one or more of various other public or private networks.

Gateway system 110 may use one or more satellite antennas, such as gateway satellite antenna 130, to communicate with satellite 140 via gateway-satellite radiofrequency (RF) communication links 135. The same or separate antennas may be used to receive data from satellite 140 and transmit data to satellite 140 via the gateway-satellite RF communication links 135. For example, the gateway satellite antenna 130 is used by the gateway system 110 to send forward-channel data via uplink portions of gateway-satellite RF communication links 135 and/or to receive return-channel data via downlink portions of gateway-satellite RF communication links 135.

As illustrated, alternative and or additional communications can be between the optical ground station 150 and the satellite 140 via one or more gateway-satellite free space optical (FSO) communication links 155. The Earth's atmosphere is typically considered as having layers. For example, between the ground and the edge of outer space, the Earth's atmosphere can be considered as including the troposphere, stratosphere, mesosphere, thermosphere, and exosphere. FIG. 1 shows only an illustrative boundary between the troposphere and stratosphere. Although the layers do not have precise boundaries, the troposphere can generally be considered as occupying approximately the first 10 kilometers of atmosphere, and the stratosphere can be considered as occupying the next 40 kilometers of atmosphere (i.e., from approximately 10-50 kilometers in altitude from the ground level).

As noted above, certain atmospheric effects (e.g., atmospheric attenuation and path loss, beam scintillation, beam wandering, etc.) can tend to interfere with FSO communications. Prior experimentation has demonstrated that these interfering atmospheric effects tend to be dominant at altitudes below an atmospheric effect boundary ("A0") 105. For example, A0 105 is typically at altitudes around 20 kilometers from the ground, which can be in the lower stratosphere close to the ozone layer. Such interfering atmospheric effects tend to be relatively negligible above A0 105. While described as a "boundary," there is no sharp change in atmospheric effects that can be observed at a particular altitude. Rather, statistical changes in atmospheric effects tend to change gradually over a range of altitudes around A0 105, such that A0 105 provides a convenient reference for comparing altitudes well below A0 105, altitudes around A0 105, and altitudes well above A0 105.

For the sake of illustration, an optical ground station 150 can be considered as communicating with the satellite 140 using intensity modulation based on-off keying (OOK) at the transmitter, and direct detection with PIN photodetectors at the receiver ("PIN" refers to an intrinsic, 'i', region between p-doped and n-doped regions). With such an illustrative configuration, the received signal via the FSO communication link 155 at the satellite 140 can be given as:

$$r_{SAT} = P_T R I s + n \qquad \text{(Eq. 1)}$$

where $P_T$ is the transmitted optical power; R is the responsivity of the photodetector; I is the channel coefficient; $s \in \{0,1\}$ is the transmitted information bit; and n is the additive white Gaussian noise with zero mean and variance $\sigma_n^2$, which represents the thermal noise at the photodetector and is a dominant noise term in a PIN photodetector. The channel coefficient models all channel impairments including the atmospheric attenuation ($I_l$) due to varying weather conditions (e.g., fog, clouds, etc.), the atmospheric turbulence ($I_a$), and the pointing error due to misalignment between transmitter and receiver ($I_p$), and can be given as ($I = I_l \times I_a \times I_p$). It should be noted that $I_l$ is a deterministic channel coefficient and $I_a$ and $I_p$ are randomly varying channel coefficients.

As noted above, one interfering atmospheric effect that tends to be dominant up to around A0 105 is atmospheric attenuation between the optical ground station 150 and the satellite 140. Such atmospheric attenuation can be given using the so-called Beer-Lambert law as follows:

$$I_{l,G-S} = e^{-\sigma \cdot z_{G-S}} \qquad \text{(Eq. 2)}$$

where σ is the attenuation coefficient, and $z_{G-S}$ is the propagation distance between ground station and the satellite. In the approach used to model the atmospheric attenuation, weather effects are characterized in terms of visibility.

For different weather conditions, σ can be calculated using the so-called Kim model as follows:

$$\sigma = \frac{3.91}{V(\text{km})}\left(\frac{\lambda(\text{nm})}{550}\right)^{-\delta} \tag{Eq. 3}$$

where V is the visibility in km, λ is the beam wavelength in nm, and δ is the particle size related coefficient given by the following:

$$\delta = \begin{cases} 1.6 & V \geq 50 \text{ km} \\ 1.3 & 6 \text{ km} \leq V < 50 \text{ km} \\ 0.16V + 0.34 & 1 \text{ km} \leq V < 6 \text{ km} \\ V - 0.5 & 0.5 \text{ km} \leq V < 1 \text{ km} \\ 0 & V < 0.5 \text{ km} \end{cases} \tag{Eq. 4}$$

Another interfering atmospheric effect that tends to be dominant up to around A0 105 is atmospheric turbulence and beam scintillation. Typically, weak fluctuation theory of turbulence can be sufficient to study the effect of turbulence for a ground-to-satellite FSO link 155. In the weak fluctuation regime, in the absence of beam wander effect, the received irradiance statistics of an optical wave tend to be governed by a log-normal probability distribution function (PDF) model, given by the following:

$$f_{I_a}(I_a) = \frac{1}{2I_a\sqrt{2\pi\sigma_\chi^2}}\exp\left(-\frac{(\ln(I_a) - 2\mu_\chi)^2}{8\sigma_\chi^2}\right) \tag{Eq. 5}$$

where $\mu_\chi$ and $\sigma_\chi^2$ denote the log-amplitude mean and variance of the optical intensity, respectively.

The log-amplitude mean and variance of the optical beam can be given in terms of so-called Rytov variance, or scintillation index, as follows:

$$\sigma_\chi^2 = \frac{\sigma_R^2}{4} = \frac{1}{4}\ln(\sigma_I^2 + 1) \tag{Eq. 6}$$

$$\mu_\chi = -\sigma_\chi^2$$

where $\sigma_R^2$ is the Rytov variance and $\sigma_I^2$ is the scintillation index.

In the absence of beam wander effect, such as in the case of a downlink FSO channel, the scintillation index can be given by the following:

$$\sigma_I^2 \approx \sigma_R^2 = 2.25 \ k^{7/6}\sec^{11/6}(\theta_{z_{G-S}})\int_{h_0}^{H_{SAT}} C_n^2(h)(h - h_0)^{5/6} dh \tag{Eq. 7}$$

where $k = 2\pi/\lambda$ is the optical wave number, $\theta_{z_{G-S}}$ is the zenith angle between ground station and satellite, $h_0$ is the ground station altitude from the sea level, $H_{SAT}$ is the altitude of the satellite, and $C_n^2(h)$ is the refractive index structure parameter of the atmosphere which is a function of altitude for a slant path.

To describe variations in the structure parameter as a function of altitude, it is customary to use a $C_n^2(h)$ profile model. A widely used model is the so-called Hufnagel-Valley (H-V) model, which can be described as follows:

$$C_n^2(h) = 0.00594\left(\frac{w}{27}\right)^2(10^{-5}h)^{10}\exp\left(-\frac{h}{1000}\right) + \tag{Eq. 8}$$

$$2.7 \times 10^{-16}\exp\left(-\frac{h}{1500}\right) + C_n^2(0)\exp\left(-\frac{h}{100}\right)$$

where w is the RMS wind speed and $C_n^2(0)$ is the ground level refractive index structure parameter.

As noted above, in addition to atmospheric effects, pointing errors due to misalignment can appreciably degrade the quality and/or efficacy of FSO communications over such a long ground-satellite FSO communication link 155. Because FSO communications are line-of-sight communications, pointing accuracy can have a significant effect in determining the link performance and reliability. Misalignment between transmitter (e.g., optical ground station 150) and receiver (e.g., satellite 140) can cause pointing errors and signal fading at the receiver (e.g., at satellite 140).

To investigate pointing error due to misalignment, as well as beam wander models for a ground-to-satellite FSO uplink channel (i.e., from the optical ground station 150 to the satellite 140), beam parameters are first introduced for a Gaussian beam wave propagating through the atmospheric channel. The Gaussian beam wave in the plane of the transmitter at z=0 can be described as follows:

$$U_0(r, 0) = \exp\left(-\frac{r^2}{W_0^2} - i\frac{kr^2}{2F_0}\right) \tag{Eq. 9}$$

where r is a vector in the transverse direction, $W_0$ is the $1/e^2$ field radius of the beam, and $F_0$ is the phase front radius of curvature.

For a propagating distance of z, the free-space propagation of a Gaussian beam can be described by two sets of non-dimensional beam parameters, as follows:

$$\Theta_0 = 1 - \frac{z}{F_0}, \tag{Eq. 10}$$

$$\Lambda_0 = \frac{2z}{kW_0^2},$$

$$\overline{\Theta}_0 = 1 - \Theta_0$$

$$\Theta = 1 + \frac{z}{F}, \tag{Eq. 11}$$

$$\Lambda = \frac{2z}{kW^2},$$

$$\overline{\Theta} = 1 - \Theta$$

where W and F are the spot size radius of the beam and phase front radius of curvature at the receiver plane.

For added context, FIG. 2 shows an illustrative representation 200 of a circular detection aperture 220 and a Gaussian beam profile 210 at a receiver, with misalignment in the receiver plane. As illustrated, the circular detection aperture 220 has radius a, and the Gaussian beam profile 210 has a spot size of radius W. The misalignment between the transmitter and receiver results in a pointing error, $r_c$. When a pointing error of $r_c$ is present, due to the symmetry of the beam shape and the detector area, the fraction of the power collected by the detector, $I_p$, depends on the radial distance $r_c = \|\mathbf{r}_c\|$.

Therefore, the fraction of the power collected by the detector of radius a can be approximated as follows:

$$I_p(r_c, z) \approx A_0 \exp\left(-\frac{2r_c^2}{W_{eq}^2}\right) \quad \text{(Eq. 12)}$$

where $v = (\sqrt{\pi}a)/(\sqrt{2}w)$, and $$A_0 = [\mathrm{erf}(v)]^2, \quad \text{(Eq. 13)}$$

$$W_{eq}^2 = W^2 \frac{\sqrt{\pi}\,\mathrm{erf}(v)}{2v \exp(-v^2)}$$

where $A_0$ denotes the coupling loss including transmit aperture gain, free-space path loss, and receive aperture gain, and $W_{eq}$ is the equivalent beam width.

If independent and identical Gaussian distributions are considered for the displacements along the x- and y-axes, the radial displacement $r_c$ can be modeled by a so-called Rayleigh distribution, as follows:

$$f_{r_c}(r_c) = \frac{r_c}{\sigma_{r_c}^2} \exp\left(-\frac{r_c^2}{2\sigma_{r_c}^2}\right), \; r_c > 0 \quad \text{(Eq. 14)}$$

where $\sigma_{r_c}^2$ is the random radial displacement variance at the receiver.

Combining (14) and (12), the PDF of $I_p$ can be expressed as follows:

$$f_{I_p}(I_p) = \frac{\gamma^2}{A_0^{\gamma^2}} I_p^{\gamma^2 - 1}, \; 0 \le I_p \le A_0 \quad \text{(Eq. 15)}$$

where $\gamma = W_{eq}/2\sigma_{r_c}$.

Considering the PDFs given by (5) and (15) for $I_a$ and $I_p$, and since $I_l$ is deterministic, an aggregate PDF can be given for $I = I_l I_a I_p$, which can model the atmospheric attenuation, beam scintillation, and pointing error as follows:

$$f_I(I) = \frac{\gamma^2}{2(A_0 I_l)^{\gamma^2}} I^{\gamma^2 - 1} \mathrm{erfc}\left(\frac{\ln\left(\frac{I}{A_0 I_l}\right) + \mu}{\sqrt{8}\,\sigma_\chi}\right) \exp(2\sigma_\chi^2 \gamma^2(1 + \gamma^2)) \quad \text{(Eq. 16)}$$

where $\mu = 2\sigma_\chi^2(1 + 2\gamma^2)$, and $\mathrm{erfc}(\cdot)$ is the complementary error function.

As noted above, in addition to the atmospheric effects and pointing error effects described above, FSO communication reliability can also be impacted by beam wander. A finite optical beam will randomly wander as it propagates through turbulent atmospheric scale sizes on the order of the beam or larger. Due to beam wandering effect, the beam centroid will randomly move in the receiver plane, which can cause a pointing error similar to that of a residual pointing error due to transmit and receive aperture misalignment. Further, the hot-spot of the beam (i.e., the point in the beam profile with the maximum intensity) tends to randomly move around the beam centroid, which can lead to an effective pointing error displacement of the beam that is distinct from the centroid displacement. Such beam wander can result in an increase of the detected on-axis scintillation index.

To further describe beam wander effects, FIG. 3A shows an illustrative representation 300a of random movement of a beam centroid 310 in a receiver plane due to beam wander, and FIG. 3B shows an illustrative representation 300b of random movement of a beam hot-spot 330 around a beam centroid 310 due to beam wander. Beam wander can be modeled at the receiver plane as if it arises from a random tilt angle at the transmitter plane. In FIG. 3A, it can be seen that the combined movement of the hot-spot and short-term beam centroid 310 paints out a larger circle over a long time period. The larger dashed circle can be referred to as the long-term spot size, $W_{LT}$ 320.

For a ground-to-satellite uplink FSO channel, $W_{LT}$ 320 can be described as follows:

$$W_{LT} = W\sqrt{1 + 4.35\mu_{2u}\Lambda^{5/6}k^{7/6}(H_{SAT} - h_0)^{5/6}\sec^{11/6}(\theta_{z_{G-S}})} \quad \text{(Eq. 17)}$$

where $\mu_{2u}$ is given by:

$$\mu_{2u} = \int_{h_0}^{H_{SAT}} C_n^2(h) \left(1 - \frac{h - h_0}{H_{SAT} - h_0}\right)^{5/3} dh \quad \text{(Eq. 18)}$$

As illustrated in FIG. 3A, the short-term spot size, $W_{ST}$, can be given as follows:

$$W_{ST}^2 = W_{LT}^2 - \langle r_c^2 \rangle \quad \text{(Eq. 19)}$$

where $\langle r_c^2 \rangle$ is the beam wander displacement variance.

This variance can be described as follows:

$$\langle r_c^2 \rangle = 0.54(H_{SAT} - h_0)^2 \sec^2(\theta_{z_{G-S}}) \quad \text{(Eq. 20)}$$
$$\left(\frac{\lambda}{2W_0}\right)^2 \left(\frac{2W_0}{r_0}\right)^{5/3} \left[1 - \left(\frac{\kappa_0^2 W_0^2}{1 + \kappa_0^2 W_0^2}\right)^{1/6}\right]$$

where $\kappa_0$ is a scaling parameter related to the outer-scale values and $r_0$ is the atmospheric coherence width.

The atmospheric coherence width (also called Fried's parameter) can be defined as follows:

$$r_0 = \left[0.42 \sec(\theta_{z_{G-S}}) k^2 \int_{h_0}^{H_{SAT}} C_n^2(h)\, dh\right]^{-3/5} \quad \text{(Eq. 21)}$$

Referring to FIG. 3B, the pointing variance due to the random movement of the beam hot-spot 330 around the beam centroid 310 for a collimated beam can be described as follows:

$$\sigma_{pe}^2 = 0.54(H_{SAT} - h_0)^2 \sec^2 \quad \text{(Eq. 22)}$$
$$(\theta_{z_{G-S}})\left(\frac{\lambda}{2W_0}\right)^2 \left(\frac{2W_0}{r_0}\right)^{5/3} \left[1 - \left(\frac{C_r^2 W_0^2/r_0^2}{1 + C_r^2 W_0^2/r_0^2}\right)^{1/6}\right]$$

where the parameter $C_r$ is a scaling constant that is typically in the range of 1 to $2\pi$. A good fit between theory and simulation results can be obtained by selecting $C_r=\pi$.

Considering both the beam scintillation and beam wander effects together, the received irradiance statistics $I_a$ can be modeled as follows:

$$I_a = I_{a_{sci}} \times I_{a_{bw}} = \exp(2\chi)\exp\left(-\frac{2r_c^2}{W_{ST}^2}\right) \quad \text{(Eq. 23)}$$

where $I_{a_{sci}}$ is the channel coefficient due to scintillation, and $I_{a_{bw}}$ is the channel coefficient due to beam wander induced pointing error. It should be noted that there will be an increase in the scintillation index of $I_{a_{sci}}$ due to random displacement of the beam hot-spot around the beam centroid.

In the preceding equation, $\chi$ is the log-amplitude of the beam which is normally distributed with mean $\mu_\chi$ and variance $\sigma_\chi^2$, which can be described as follows:

$$\mu_\chi = -\sigma_\chi^2 \quad \text{(Eq. 24)}$$

$$\sigma_\chi^2 = \frac{1}{4}\ln\left(1+\sigma_I^2(r,z)\right)$$

where $\sigma_I^2(r, z)$ is the scintillation index which is affected by the beam wander.

The scintillation index evaluated at the displacement $r=\sigma_{pe}$ can be described as follows:

$$\sigma^2(r=\sigma_{pe}, z) = 5.95(H_{SAT}-h_0)^2\sec^2(\theta_{zG-S})\left(\frac{2W_0}{r_0}\right)^{5/3}\left(\frac{\alpha_{pe}}{W}\right)^2 + \quad \text{(Eq. 25)}$$
$$8.70\mu_{3u}k^{7/6}(H_{SAT}-h_0)^{5/6}\sec^{11/6}(\theta_{zG-S})$$

where $\alpha_{pe}=\sigma_{pe}/z$. This quantity is the jitter-induced angular pointing error, $\mu_{3u}$, which can be described as follows:

$$\mu_{3u} = \text{Re}\int_{h_0}^{H_{SAT}} C_n^2(h)\{\xi^{5/6}[\Lambda\xi + i(1-\overline{\Theta}\xi)]^{5/6} - \Lambda^{5/6}\xi^{5/3}\}dh \quad \text{(Eq. 26)}$$

and $\xi=1-(h-h_0)/(H_{SAT}-h_0)$.

Thus, $I_{a_{sci}}$ in (23) follows a log-normal distribution similar to (5) with a modified log-amplitude mean and variance, as given by (24) and (25). Notably, $I_{a_{bw}}$ in (23) is similar to that of $I_p$ in (12), such that it can be modeled according to the approach used to model $I_p$. In (23), $r_c$ denotes the radial random displacement of the centroid of the beam from the center of receiver, which is defined by the random displacement of the centroid of the propagated beam along the X and Y coordinates, $r_{c_X}$ and $r_{c_Y}$. These are normal random variables with zero mean and equal standard deviations. Therefore, the radial displacement follows a so-called Rayleigh distribution having a PDF given by (14). Combining $\exp(-2r_c^2/W_{ST}^2)$ with (14), and considering the coupling loss, the PDF of $I_{a_{bw}}$ can be described as follows:

$$f_{I_{a_{bw}}}(I_{a_{bw}}) = \frac{\gamma^2}{A_0^{\gamma^2}}I_{a_{bw}}^{\gamma^2-1}, \quad 0 \leq I_{a_{bw}} \leq A_0 \quad \text{(Eq. 27)}$$

where $\gamma=W_{ST}/2\sigma_{r_c}$.

Considering log-normal distribution for $I_{a_{sci}}$, similar to (16), an aggregate PDF can be obtained for $I=I_lI_{a_{sci}}I_{a_{bw}}$, which can model the atmospheric attenuation, beam scintillation, and beam wandering effects as follows:

$$f_I(I) = \frac{\gamma^2}{2(A_0I_l)^{\gamma^2}}I^{\gamma^2-1}\text{erfc}\left(\frac{\ln\left(\frac{I}{A_0I_l}\right)+\mu}{\sqrt{8}\sigma_\chi}\right)\exp\left(2\sigma_\chi^2\gamma^2(1+\gamma^2)\right) \quad \text{(Eq. 28)}$$

where $\mu=2\sigma_\chi^2(1+2\gamma^2)$. Notably, while the PDFs given by (16) and (28) look to be the same, the manner of computing parameters, such as $\gamma$ and $\sigma_\chi^2$, can be different for each different PDF.

As noted above, there are several typical sources of impairments to FSO communication links. Some types, such as atmospheric attenuation and atmospheric turbulence, are dependent on atmospheric conditions and tend to be dominant at altitudes below A0 105 (e.g., in the first 20 kilometers of atmosphere above the ground). Other types, such as pointing misalignment and free-space path loss, are independent of atmospheric conditions. However, the detailed analysis above demonstrates that the effects of all of these impairments, whether or not atmospherically dependent, increase over distance. Thus, while FSO communication links have been widely explored for use in terrestrial communication systems, their use has tended to be avoided in ground-to-satellite applications. The few conventional cases where FSO links have been attempted for ground-to-satellite applications have tended to rely on hybrid FSO and RF links, such as using one or the other as a backup link to improve reliability of the communications.

Embodiments described herein use two or more FSO relays to effectively split the ground-to-satellite FSO link into at least three FSO sub-links. The at least two FSO relays include high-altitude platform stations (HAPSs) and/or low-altitude platform stations (LAPSs), deployed as series and/or parallel relay architectures between a ground station and a satellite to split the ground-to-satellite link into several sub-links. The term "tropospheric FSO relay," or the like, is used to refer to an FSO relay implemented on a LAPS. The LAPS is an aerial vehicle (e.g., a drone, balloon, etc.) with a stable aerial position in the troposphere. For example, tropospheric FSO relays tend to be deployed at altitudes of around 200 meters to around 6 kilometers above sea level. The term "stratospheric FSO relay," or the like, is used to refer to an FSO relay implemented on a HAPS. The HAPS is an aerial vehicle (e.g., a drone, balloon, etc.) with a stable aerial position in the stratosphere, typically the lower stratosphere. For example, stratospheric FSO relays tend to be deployed at altitudes of around 17 kilometers to around 32 kilometers above sea level. In some cases, multiple tropospheric FSO relays can be deployed on a single LAPS, and/or multiple stratospheric FSO relays can be deployed on a single HAPS.

Figure 4:
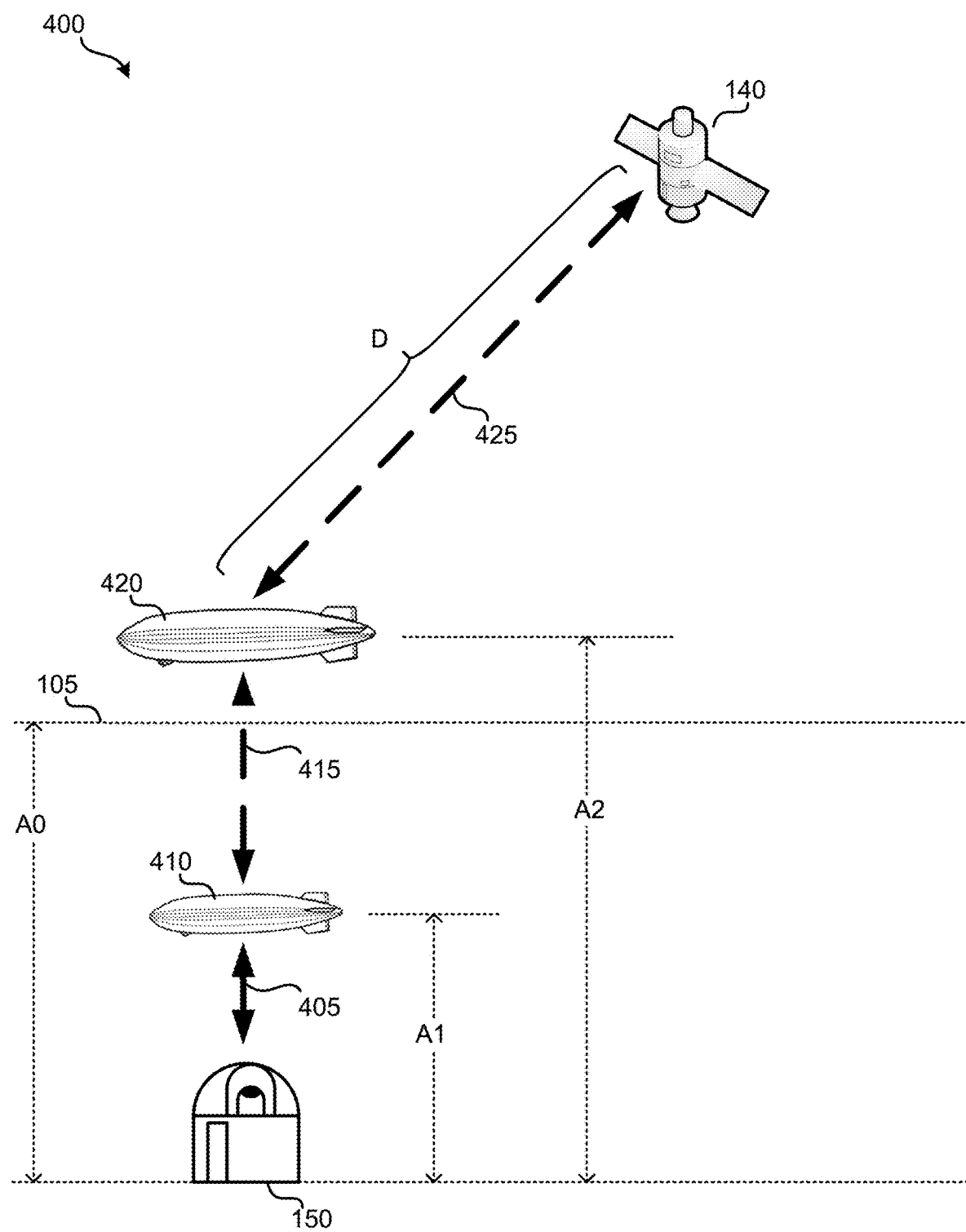
FIG. 4 shows an illustrative satellite communication system having an optical ground station in communication with a satellite via a serial relay-assisted ground-to-satellite FSO communication link, according to several embodiments described herein.

FIG. 4 shows an illustrative satellite communication system 400 having an optical ground station 150 in communication with a satellite 140 via a serial relay-assisted ground-to-satellite FSO communication link, according to several embodiments described herein. As illustrated, the satellite communication system 400 includes a tropospheric FSO relay 410 and a stratospheric FSO relay 420. The tropospheric FSO relay 410 is simply illustrated as part of a deployed LAPS (e.g., a low-altitude blimp) at a first altitude (A1), and the stratospheric FSO relay 420 is simply illustrated as part of a deployed HAPS (e.g., a high-altitude blimp) at a second altitude (A2). Typically, A1 is in the troposphere and well below A0 105 (i.e., the atmospheric effect boundary); and A2 is at, near, or slightly above A0 105. In some cases, A2 is further selected for practical concerns, such as to more easily stabilize a HAPS at an altitude having relatively low atmospheric wind.

The ground-to-satellite FSO communication link is implemented as a first FSO sub-link 405 between the optical ground station 150 and the tropospheric FSO relay 410, a second FSO sub-link 415 between the tropospheric FSO relay 410 and the stratospheric FSO relay 420, and a third FSO sub-link 425 between the stratospheric FSO relay 420 and the satellite 140. Based on the detailed analyses presented above, it can be seen that high atmospheric attenuation and turbulence will affect the first FSO sub-link 405 and the second FSO sub-link 415, but those effects will be substantially negligible in the third FSO sub-link 425. However, free-space path loss is not atmospherically dependent and will impact all three FSO sub-links. As described below, the altitudes of the tropospheric FSO relay 410 and/or the stratospheric FSO relay 420, transmission power, and/or other parameters can be optimized to minimize the effects of both atmospheric and non-atmospheric attenuating factors, thereby maximizing the reliability of the FSO communications.

In some embodiments, the optical ground station 150 transmits an intensity-modulated signal to the tropospheric FSO relay 410. The tropospheric FSO relay 410 receives the intensity-modulated signal via the first FSO sub-link 405 and determines whether a received signal-to-noise ratio (SNR) exceeds a predetermined decoding threshold, such as in accordance with a decode-and-forward protocol. If the threshold is met, the tropospheric FSO relay 410 decodes the intensity-modulated signal (after direct detection), remodulates the decoded signal to generate a second-modulated signal, and retransmits the second-modulated signal to the stratospheric FSO relay 420. In some implementations, the tropospheric FSO relay 410 remodulates the decoded signal to generate the second-modulated signal using OOK. A similar decode-and-forward protocol can be implemented at the next FSO relay, the stratospheric FSO relay 420. For example, the stratospheric FSO relay 420 receives the second-modulated signal via the second FSO sub-link 415 and determines whether the received SNR exceeds a predetermined decoding threshold (e.g., the same threshold as used at the tropospheric FSO relay 410). If the threshold is met, the stratospheric FSO relay 420 decodes the second-modulated signal (after direct detection), remodulates its decoded signal to generate a third-modulated signal, and retransmits the third-modulated signal to the satellite 140. In some implementations, the stratospheric FSO relay 420 remodulates its decoded signal to generate the third-modulated signal using OOK.

Although FIG. 4 only shows two relays, including a single tropospheric FSO relay 410 and a single stratospheric FSO relay 420, any suitable number of relays, I, can be deployed serially to split the ground-to-satellite FSO communication link into I+1 FSO sub-links. In such a serial relaying approach, the received signal at any $i^{th}$ node (i.e., FSO relay) of the I nodes, i∈{LAPS, HAPS, SAT}, can be described as follows:

$$r_i = P_{T_{i-1}} RI_{i-1,i} s + n_i \qquad \text{(Eq. 29)}$$

where $P_{T_{i-1}}$ is the transmitted optical power of the prior node, $I_{i-1,i}$ is the channel coefficient between the prior node and the current node, and $n_i$ is the noise term in the current photodetector. In some implementations, the total power is divided equally between all nodes. In other implementations, as described further below, power allocation can be optimized based on intermediate channel conditions for additional performance improvement of the system and power efficiency in the relay nodes. The models for each channel state $I_{i-1,i}$ can be derived from the analyses provided above, considering any or all channel impairments.

Figure 5:
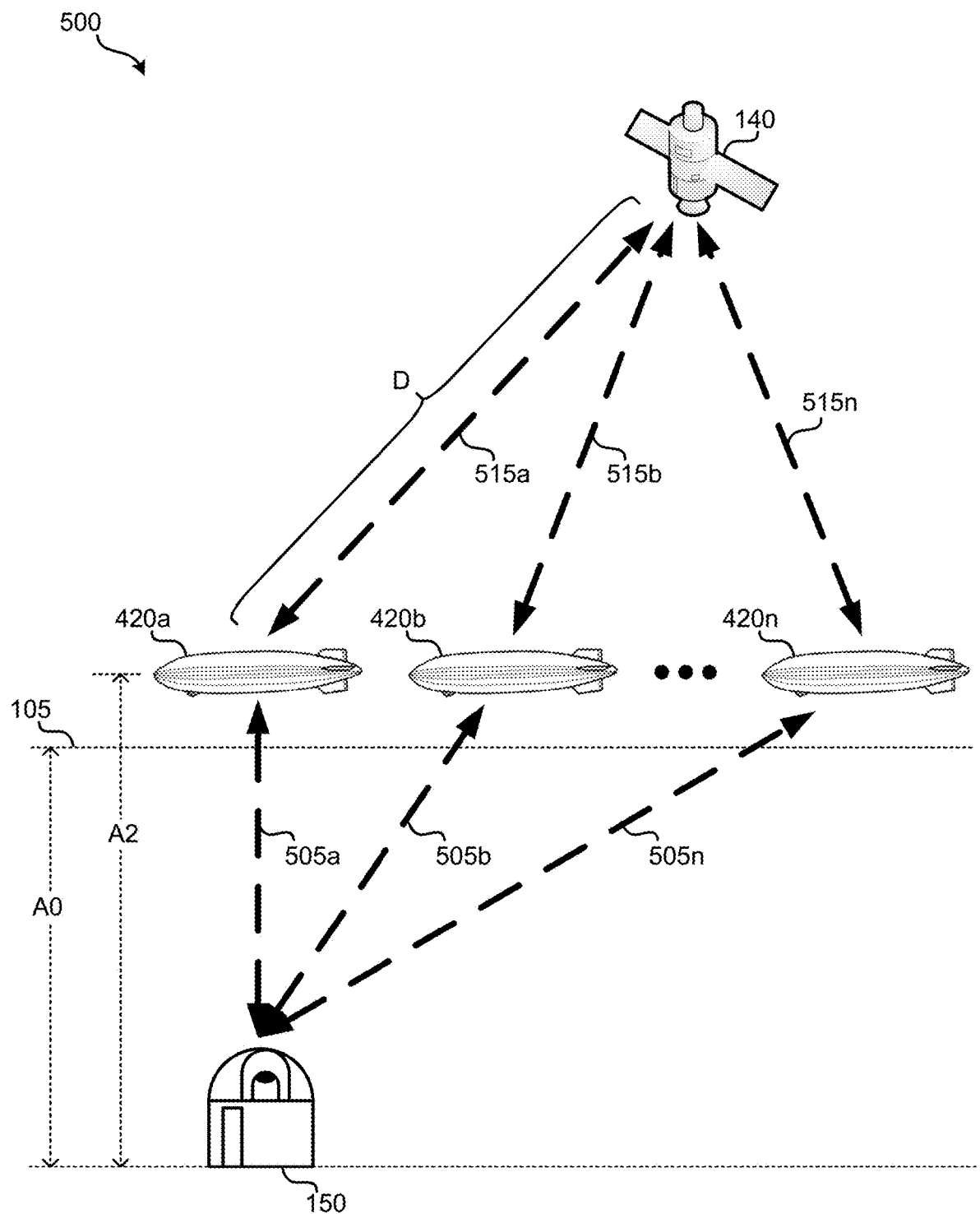
FIG. 5 shows an illustrative satellite communication system having an optical ground station in communication with a satellite via a parallel relay-assisted ground-to-satellite FSO communication link, according to several embodiments described herein.

FIG. 5 shows an illustrative satellite communication system 500 having an optical ground station 150 in communication with a satellite 140 via a parallel relay-assisted ground-to-satellite FSO communication link, according to several embodiments described herein. As illustrated, the satellite communication system 500 includes multiple stratospheric FSO relays 420. For example, N stratospheric FSO relays 420 are illustrated as relays 420a-420n. In such embodiments, N can be any integer greater than 2. Each stratospheric FSO relay 420 is simply illustrated as part of a respective deployed HAPS (e.g., a high-altitude blimp) at an altitude of (A2). Alternatively, two or more of the stratospheric FSO relays 420 (e.g., or even all of the N stratospheric FSO relays 420) can be deployed on a single HAPS. Typically, A2 is at, near, or slightly above A0 105. In some embodiments that include multiple HAPSs, all of the HAPSs are at a same altitude (i.e., A2 is the same for all stratospheric FSO relays 420).

The ground-to-satellite FSO communication link is implemented as parallel first FSO sub-links 505 between the optical ground station 150 and each of the stratospheric FSO relays 420, and parallel second FSO sub-links 515 between each of the stratospheric FSO relays 420 and the satellite 140. Based on the detailed analyses presented above, it can be seen that high atmospheric attenuation and turbulence will affect the first FSO sub-links 505, but those effects will be substantially negligible in the second FSO sub-links 515. However, free-space path loss is not atmospherically dependent and will impact all FSO sub-links. As described below, the altitudes of the stratospheric FSO relays 420, transmission power, and/or other parameters can be optimized to minimize the effects of both atmospheric and non-atmospheric attenuating factors, thereby maximizing the reliability of the FSO communications.

In such parallel relaying approaches, each of the stratospheric FSO relays 420 can receive an instance of a transmitted signal from a corresponding transmit aperture (e.g., of a multi-aperture optical ground station 150) pointed in its respective direction via the corresponding first FSO sub-link 505. The respective received signal at any $i^{th}$ stratospheric FSO relay 420 (i=1, 2, ..., N), where N denotes the number of relays, can be described as follows:

$$r_i = P_{T_{s,i}} RI_{s-i} s + n_i \qquad \text{(Eq. 30)}$$

where $P_{T_{s,i}}$ is the transmitted optical power at the source aperture which is directed to the $i^{th}$ relay, and $I_{s-i}$ is the channel coefficient between the source and the $i^{th}$ relay.

Each stratospheric FSO relay 420 decodes its respective received signal after direct detection. As described above, some implementations only perform such decoding if it is determined that the received SNR satisfies a predetermined decoding threshold. After decoding, each stratospheric FSO relay 420 can modulate its decoded signal to produce a respective instance of a second-modulated signal. For example, the modulating can be implemented using OOK. The signals and/or the stratospheric FSO relays 420 can be synchronized so that the stratospheric FSO relay 420 simultaneously retransmit the respective instances of the second-modulated signal to the satellite 140 (i.e., in parallel). The optical receiver at the satellite 140 can have a sufficiently large field of view to detect all optical irradiances simultaneously transmitted from the different stratospheric FSO relays 420 (i.e., or at least from those stratospheric FSO relays 420 able to successfully decode the signal transmitted from the optical ground station 150). As such, the received signal at the satellite 140 is effectively a superposition of the received optical irradiance transmitted from multiple of the stratospheric FSO relays 420 in parallel.

Figure 6:
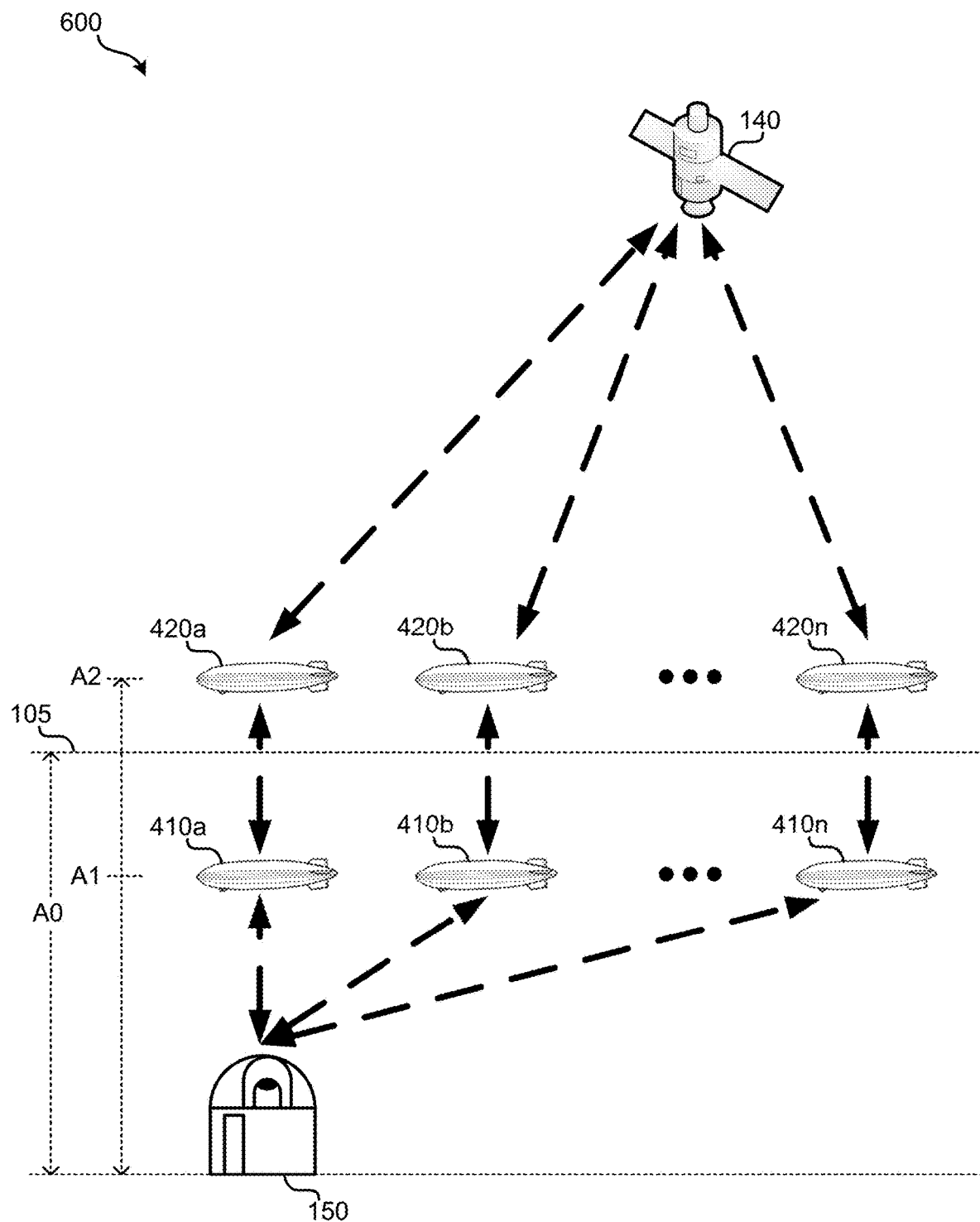
FIG. 6 shows one illustrative example of a hybrid architecture for a satellite communication system.

While FIG. 5 shows a parallel deployment of multiple stratospheric FSO relays 420, alternative embodiments can be implemented as a parallel deployment of multiple tropospheric FSO relays 410. Alternatively, embodiments can be implemented as any suitable hybrid of the serial approach of FIG. 4 and the parallel approach of FIG. 5. FIG. 6 shows one illustrative example of a hybrid architecture for a satellite communication system 600. As illustrated, an optical ground station 150 is in communication with a satellite 140 via multiple (e.g., N) tropospheric FSO relays 410 and multiple (e.g., N) stratospheric FSO relays 420. The optical ground station 150 synchronously transmits respective instances of a signal to the N tropospheric FSO relays 410 (in parallel). Each tropospheric FSO relay 410 can decode and forward the signal to a respective one of the N stratospheric FSO relays 420 in a synchronized manner. The N stratospheric FSO relays 420 can then decode and forward the signals to the satellite 140 in a synchronized manner.

Figure 7:
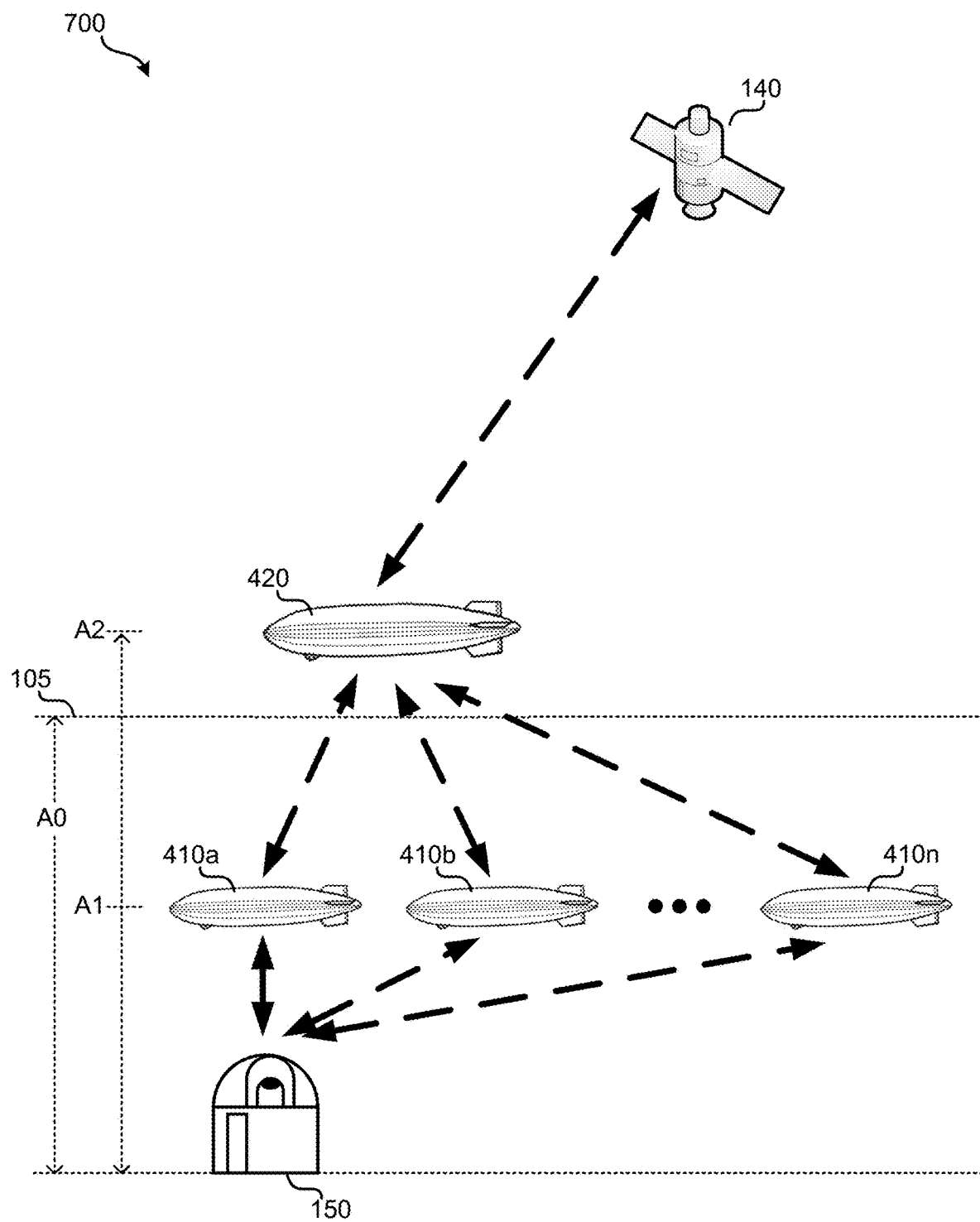
FIG. 7 shows another illustrative example of a hybrid architecture for a satellite communication system.

FIG. 7 shows another illustrative example of a hybrid architecture for a satellite communication system 700. As illustrated, an optical ground station 150 is in communication with a satellite 140 via multiple (e.g., N) tropospheric FSO relays 410 and a single stratospheric FSO relay 420. The optical ground station 150 synchronously transmits respective instances of a signal to the N tropospheric FSO relays 410 (in parallel). Each tropospheric FSO relay 410 can decode and forward the signal to the single stratospheric FSO relay 420 in a synchronized manner. The stratospheric FSO relay 420 can then decode and forward the signal to the satellite 140.

Performance Evaluation of Ground-to-Satellite FSO Communication Link Architectures Features of relay-assisted ground-to-satellite FSO communications are discussed further below in relation to outage analysis and other performance metrics. In FSO communications, atmospheric turbulence results in a very slowly varying fading, where the fading remains constant over thousands, or up to millions, of consecutive bits for typical transmission rates. For such quasi-static channels, errors caused by fading can be considered as no longer independent. Therefore, outage probability can be used as a suitable metric to evaluate system performance.

An outage probability analysis can begin by letting $C(\gamma_{in})$ denote instantaneous capacity corresponding to instantaneous electrical SNR. The outage probability at the transmission rate of $R_0$ can be described as follows:

$$P_{out}(R_0) = P_r(C(\gamma_{in}) < R_0) \quad \text{(Eq. 31)}$$

Since $C(\gamma_{in})$ is monotonically increasing with respect to $\gamma_{in}$, the above expression can be expressed as:

$$P_{out}(R_0) = P_r(\gamma_{in} < \gamma_{th}) \quad \text{(Eq. 32)}$$

where $\gamma_{th} = C^{-1}(R_0)$ is the threshold SNR to achieve a target bit error rate. An underlying concept of such an outage probability analysis is that no outage will occur so long as SNR exceeds $\gamma_{th}$. For example, a closed link requires that the link capacity can support the transmission rate, such that the outage probability is the probability of the link capacity dropping below the transmission rate.

For the sake of comparison, an outage probability analysis can be applied first to a direct (i.e., not relay-assisted) ground-to-satellite FSO communication link, such as illustrated in FIG. 1. With reference to detailed analyses provided above, the instantaneous received electrical SNR for the direct ground-to-satellite link without any relay can be described as follows:

$$\gamma_{in,DL} = \frac{P_T^2 R^2 I^2}{\sigma_n^2} \quad \text{(Eq. 33)}$$

where $\gamma_{in,\,DL}$ is the instantaneous electrical SNR at the photodetector for the direct link, $\sigma_n^2 = 4K_b T_e B/R_L$ is the thermal noise variance of the photodetector, $K_b = 1.38e-23$ J/K is the Boltzmann constant, $T_e$ is the temperature in Kelvin, B is the filter bandwidth, and $R_L$ is the equivalent load resistance.

Combining the preceding two equations, the outage probability for a direct FSO link can be described as follows:

$$P_{out_{DL}} = P_r(\gamma_{in,DL} < \gamma_{th}) = P_r\left(\frac{P_T^2 R^2 I^2}{\sigma_n^2} < \gamma_{th}\right) = P_r\left(I < \sqrt{\frac{\sigma_n^2 \gamma_{th}}{P_T^2 R^2}}\right) \quad \text{(Eq. 34)}$$

Considering the atmospheric attenuation and beam scintillation effect ($I = I_l I_a$) and using the PDF for $I_a$ as given by equation (5) above, the outage expression for a direct link can be described as follows:

$$P_{out_{DL}} = Q\left(\frac{\ln\left(\frac{RP_T I_l}{\sqrt{\sigma_n^2 \gamma_{th}}}\right) + 2\mu_\chi}{2\sigma_\chi}\right) \quad \text{(Eq. 35)}$$

where $Q(\cdot)$ is the Gaussian Q function. Considering the atmospheric attenuation, beam scintillation, and pointing error due to misalignment, the PDF given by equation (16) can be used; and considering the atmospheric attenuation, beam scintillation, and beam wandering effects, the PDF given by equation (28) can be used for I to calculate the outage probability for a direct ground-to-satellite FSO link. In such a case, the outage expression can be expressed as:

$$P_{out_{DL}} = \frac{1}{2}\left[\exp(\gamma^2 \psi - 2\sigma_\chi^2 \gamma^4)\operatorname{erfc}\left(\frac{\psi}{\sqrt{8}\sigma_\chi}\right) + \operatorname{erfc}\left(\frac{4\sigma_\chi^2 \gamma^2 - \psi}{\sqrt{8}\sigma_\chi}\right)\right] \quad \text{(Eq. 36)}$$

where $\psi = \ln(\sqrt{\sigma_n^2 \gamma_{th}}/P_T R I_l) + \mu$.

Turning now to relay-assisted approaches, such as described with reference to FIGS. 4-7, an outage probability analysis can assume that an outage of any intermediate sub-link will result in an outage of the entire relay system (i.e., in serial approaches, and assuming a decode and forward type of relaying scheme). As such, evaluation of end-to-end performance involves calculating outage probabilities for each intermediate sub-link. Notably, such a computation for each sub-link is essentially equivalent to the computation described above for a direct link. In particular, the outage probability of each intermediate sub-link can be obtained by applying the two preceding equations (equations (35) and (36)) to the corresponding conditions of each sub-link.

A first example can assume a relay-assisted architecture in which only a single stratospheric FSO relay 420 is deployed at a HAPS between the optical ground station 150 and the satellite 140. In such a case, the end-to-end outage probability can be obtained by the following:

$$P_{out_{G-H-S}} = 1 - \{(1 - P_{out_{G-H}})(1 - P_{out_{H-S}})\} \quad \text{(Eq. 37)}$$

where $P_{out_{G-H}}$ and $P_{out_{H-S}}$ denote the outage probabilities of the link between the optical ground station 150 and the stratospheric FSO relay 420, and the link between the stratospheric FSO relay 420 and the satellite 140, respectively.

Relay-assisted schemes described herein use at least two FSO relays, as opposed to the single-relay approach described in the first example. Generally, cloud blockage and/or other atmospheric conditions tend to limit effectiveness of a single direct FSO link from the optical ground station 150 to the stratospheric FSO relay 420. As such, previous explorations of such a single-relay approach have tended to use hybrid communications with both an FSO link and an RF link (which tends to have lower capacity than the FSO link). For example, the RF link provides backup to the FSO link when there is excessive cloud blockage, or the like. Relay-assisted schemes described herein instead use multiple FSO relays in series and/or FSO relays in parallel.

A second example extends the first example to a serial relay-assisted architecture similar to the one illustrated in FIG. 4, in which a tropospheric FSO relay 410 at a LAPS and a stratospheric FSO relay 420 at a HAPS are deployed between the optical ground station 150 and the satellite 140. For such a serial approach, the end-to-end outage can be obtained as follows:

$$P_{out_{G-L-H-S}} = 1 - \{(1 - P_{out_{G-L}})(1 - P_{out_{L-H}})(1 - P_{out_{H-S}})\} \quad \text{(Eq. 38)}$$

where $P_{out_{G-L}}$, $P_{out_{L-H}}$, and $P_{out_{H-S}}$ denote the outage probabilities of the links between the optical ground station 150 and the tropospheric FSO relay 410, between the tropospheric FSO relay 410 and the stratospheric FSO relay 420, and between the stratospheric FSO relay 420 and the satellite 140, respectively.

A third example describes a parallel relay-assisted architecture similar to the one illustrated in FIG. 5, in which the optical ground station 150 communicates with the satellite 140 via N parallel FSO relays (e.g., stratospheric FSO relays 420). Such a parallel architecture can be designed so that outages in one (or some subset of) intermediate sub-links will not automatically result in outage of the entire relaying scheme. The parallel relaying scheme with N parallel relays can be analyzed as N parallel dual-hop FSO links, each with a single FSO relay. Similar to the serial relaying scheme, the outage performance of each path depends on the outage probability of each hop in the corresponding path, which can be obtained using equation (37). Therefore, the end-to-end outage probability for the entire parallel relaying scheme can be obtained as follows:

$$P_{out_{PR}} = \prod_{i=1}^{N} P_{out_{G-H_i-S}} = \prod_{i=1}^{N} \{1 - \{(1 - P_{out_{G-H_i}})(1 - P_{out_{H_i-S}})\}\} \quad \text{(Eq. 39)}$$

where $$P_{out_{G-H_i-S}}$$

is the outage probability of the path from the optical ground station 150 to the satellite 140 through any $i^{th}$ FSO relay, $$P_{out_{G-H_i}}$$

is the outage probability of the link between the optical ground station 150 and any $i^{th}$ FSO relay, and $$P_{out_{H_i-S}}$$

is the outage probability of the link between any $i^{th}$ relay and the satellite 140.

Figure 8:
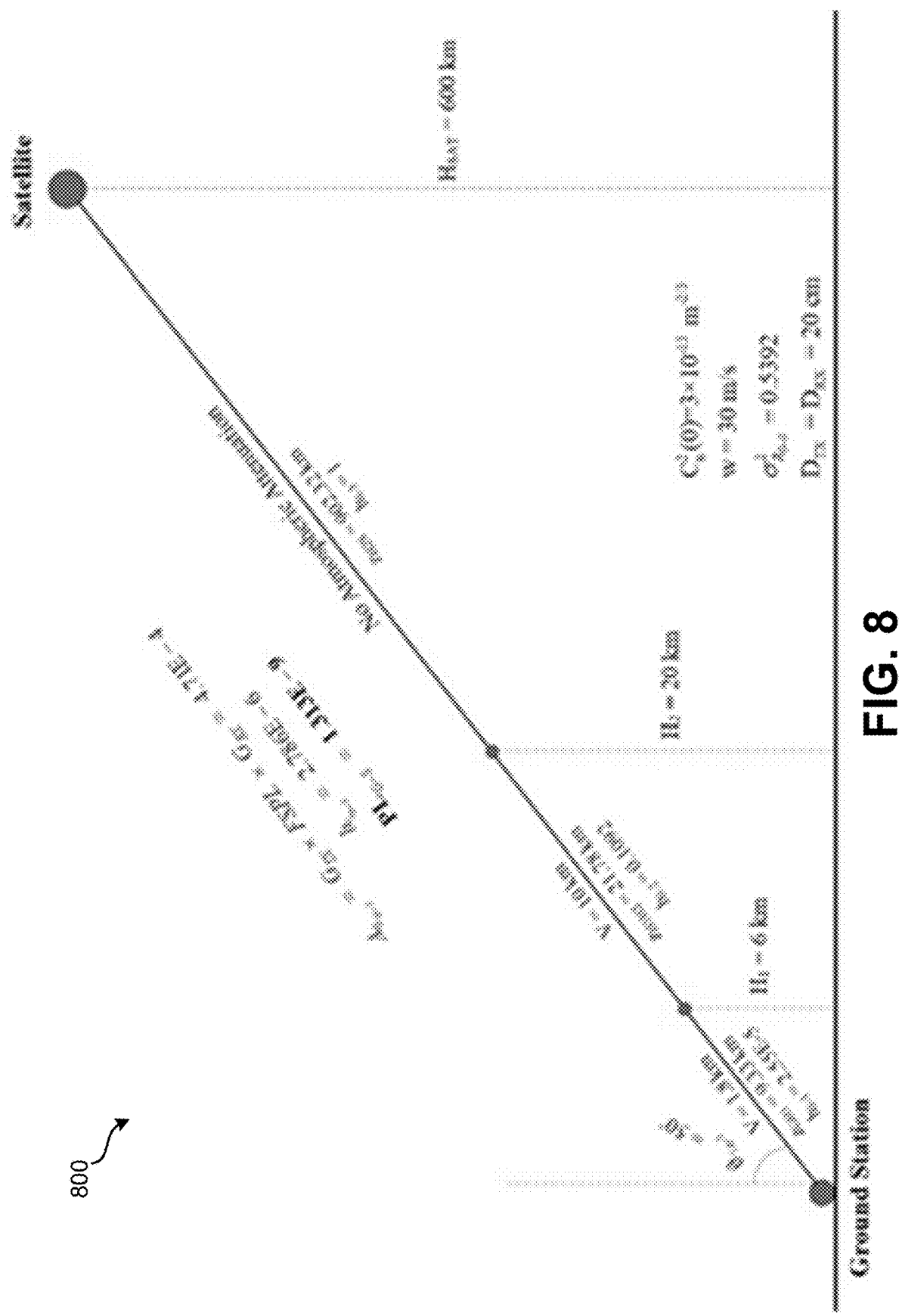
FIG. 8 shows a first simulation setup with numerical values for beam and channel parameters corresponding to a direct link architecture, similar to the one in FIG. 1.
Figure 9:
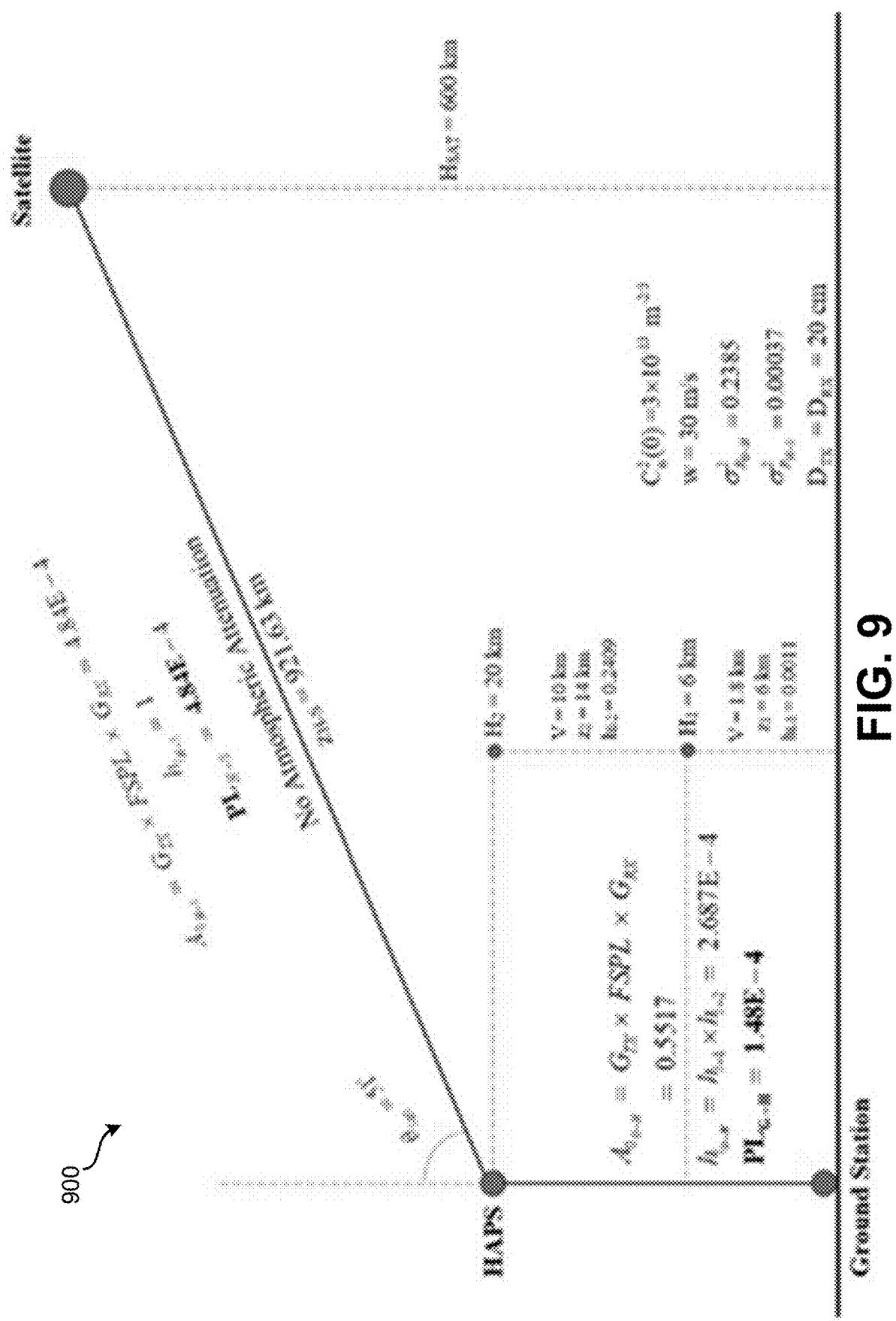
FIG. 9 shows a second simulation setup with numerical values for beam and channel parameters corresponding to a relaying scheme using only a single stratospheric FSO relay at a single HAPS.
Figure 10:
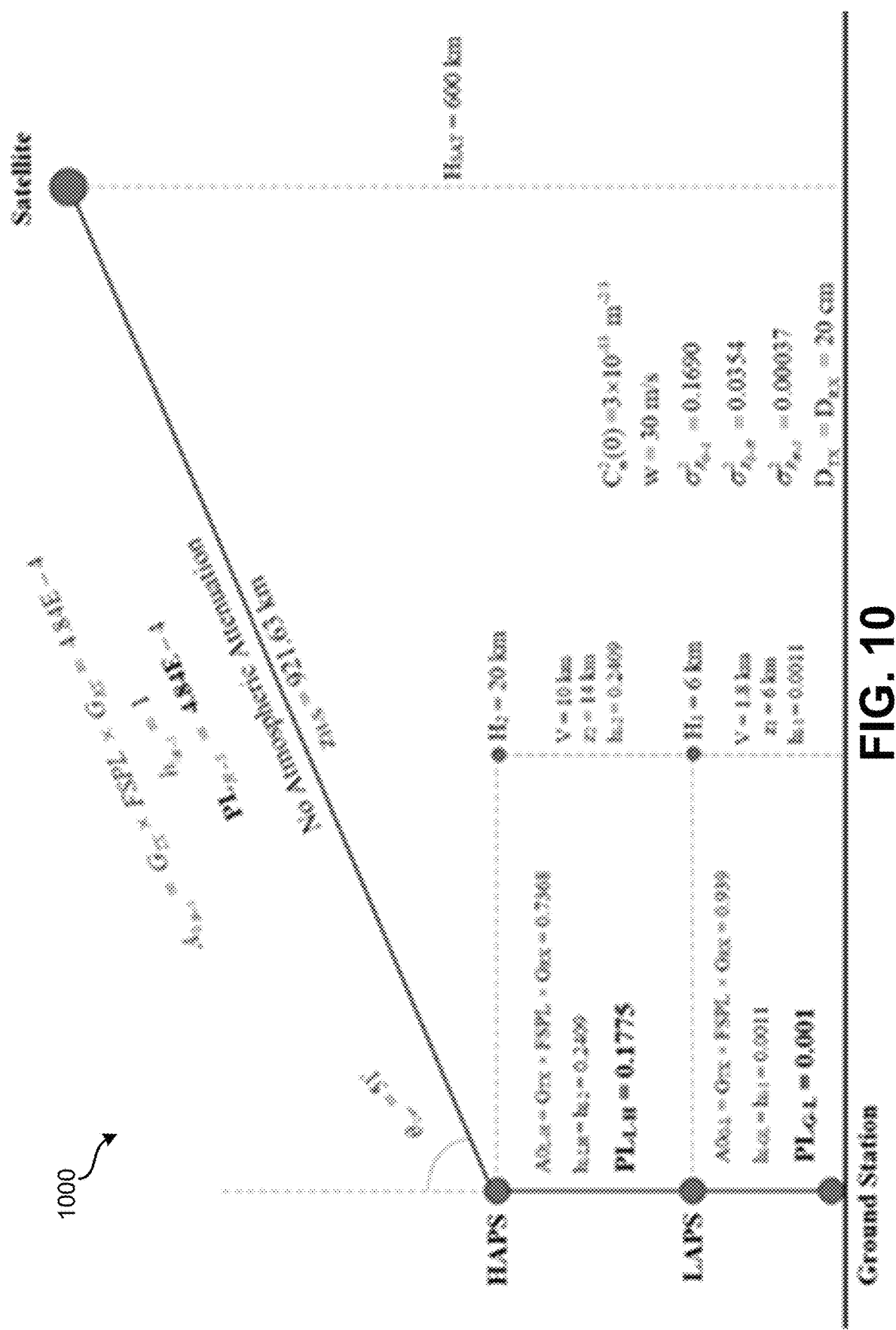
FIG. 10 shows a third simulation setup with numerical values for beam and channel parameters corresponding to a serial relay-assisted scheme, similar to the one in FIG. 4.
Figure 11:
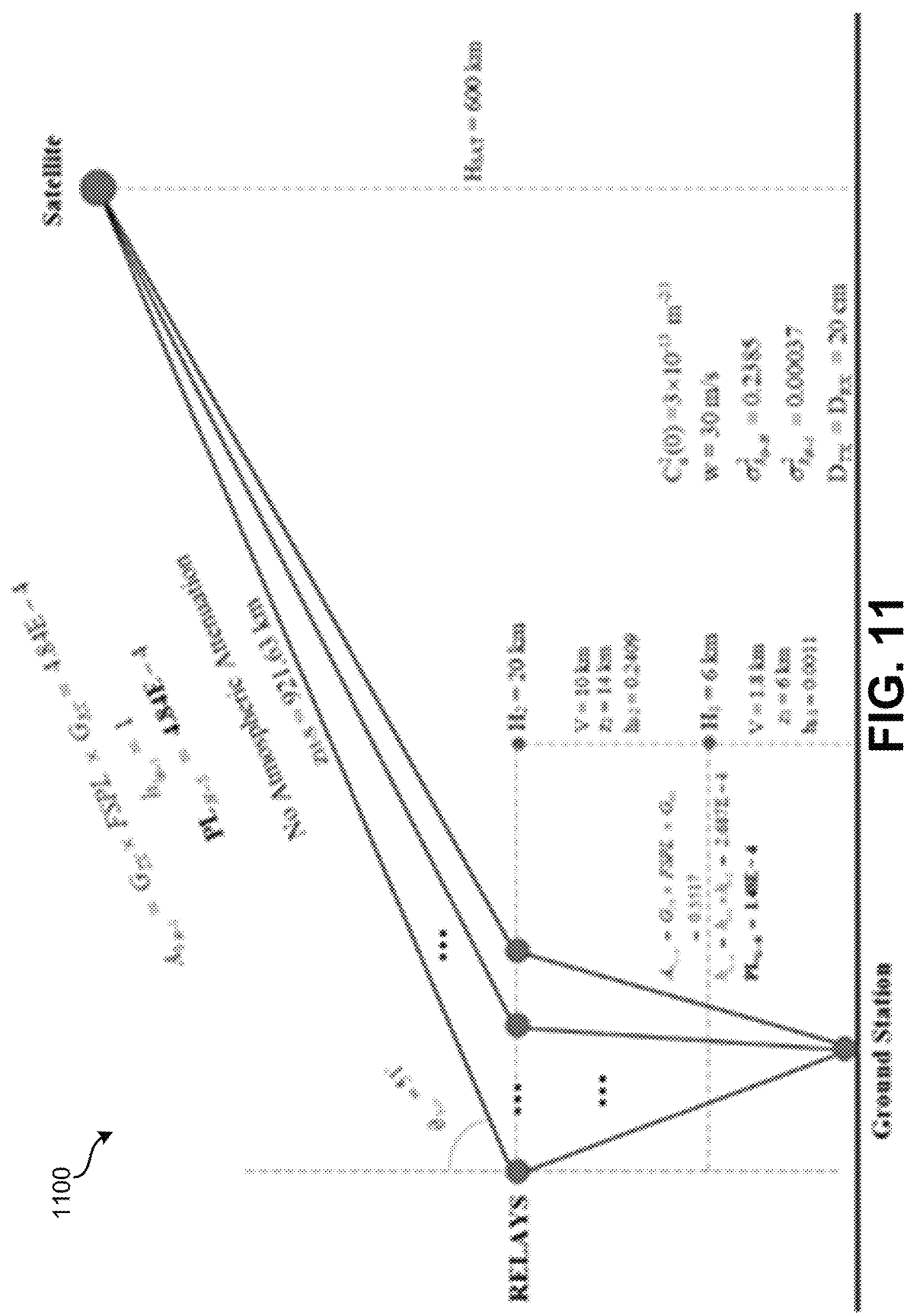
FIG. 11 shows a fourth simulation setup with numerical values for beam and channel parameters corresponding to a parallel relay-assisted scheme, similar to the one in FIG. 5.

Having described outage probability analyses of different example approaches, several performance criteria can be evaluated. Results of these evaluations described herein are obtained both by derivation from analytical expressions and from extensive computational simulations. Simulations were set up to compare four architectures. FIG. 8 shows a first simulation setup 800 with numerical values for beam and channel parameters corresponding to a direct link architecture, similar to the one in FIG. 1. FIG. 9 shows a second simulation setup 900 with numerical values for beam and channel parameters corresponding to a relaying scheme using only a single stratospheric FSO relay 420 at a single HAPS. FIG. 10 shows a third simulation setup 1000 with numerical values for beam and channel parameters corresponding to a serial relay-assisted scheme, similar to the one in FIG. 4. FIG. 11 shows a fourth simulation setup 1100 with numerical values for beam and channel parameters corresponding to a parallel relay-assisted scheme, similar to the one in FIG. 5. Each simulation assumes that signals are modulated by intensity modulation with OOK used at the transmitter of each node, and that signals are received by a PIN photodetector at each receiver. As illustrated in FIGS. 8-11, each simulation considers realistic channel conditions, such as strong atmospheric attenuation and turbulence in the first 6 kilometers of altitude above sea-level, milder attenuation and turbulence between 6 kilometers and 20 kilometers of altitude, and negligible attenuation and turbulence in altitudes above 20 kilometers (e.g., altitudes exceeding A0 105, as shown in FIGS. 1 and 4-7).

Numerical analyses assume the following parameter values, unless otherwise specified: $\gamma_{th}$=18.75 dB (the SNR value required to achieve a bit-error-rate of $10^{-9}$); $H_{SAT}$=600 km; $H_{HAPS}$=20 km; $H_{LAPS}$=6 km; $\theta_{z_{G\text{-}S}}$=50°; $\theta_{z_{G\text{-}L}}$=$\theta_{z_{G\text{-}S}}$=0°; $R_b$=5 Gbps, which results in a noise variance of $\sigma_n^2$=4.14× $10^{-13}$ A2; w=30 m/sec; λ=1550 nm; $C_n^2(0)$=3×$10^{-13}$ $m^{-2/3}$; $D_{TX}$=$D_{RX}$=20 cm; $V_{0\text{-}6\ km}$=1.8 km; and $V_{6\text{-}20\ km}$=10 km.

Figure 12:
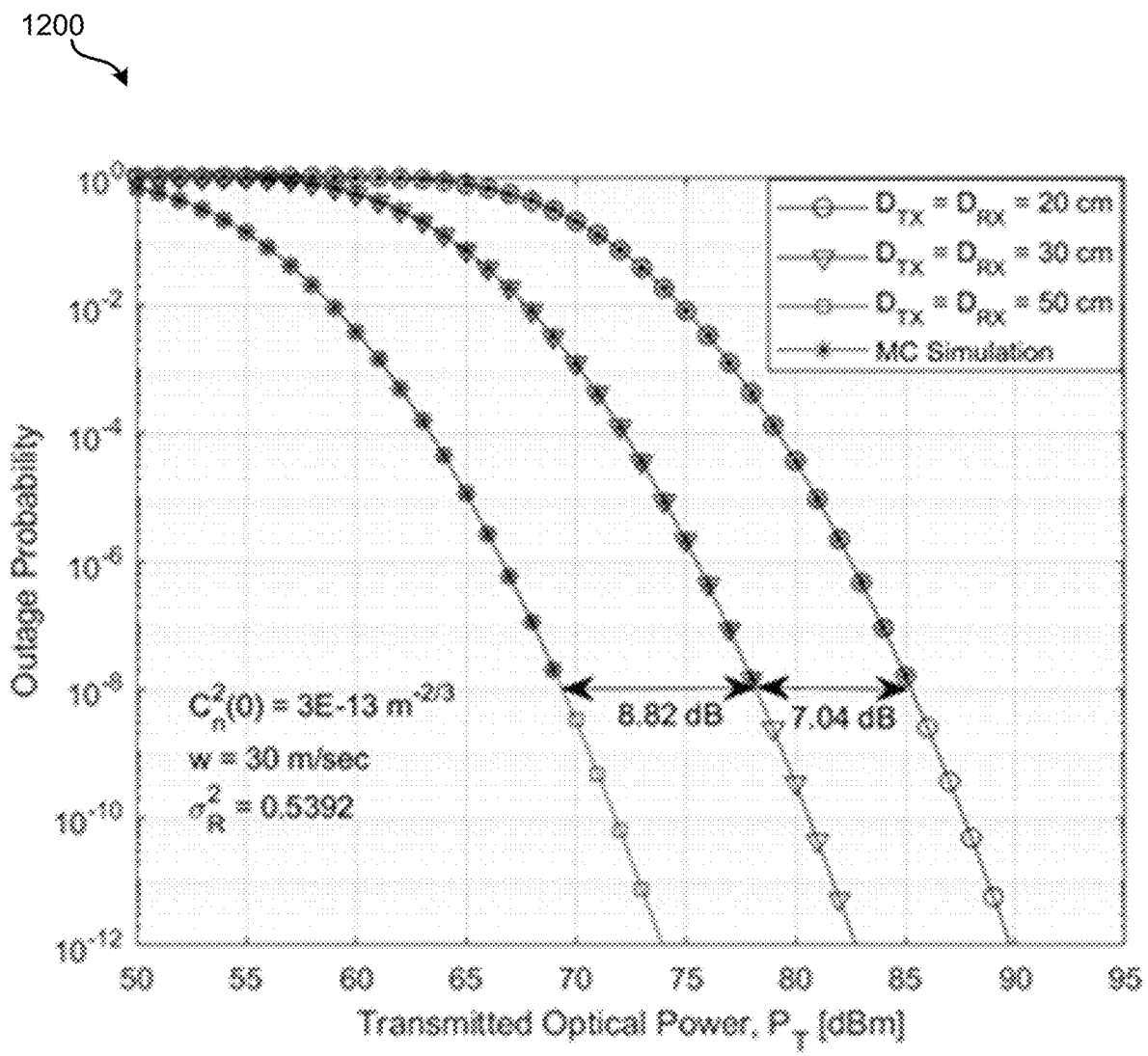
FIG. 12 shows plots of outage performance of a direct ground-to-satellite FSO link in the presence of atmospheric attenuation and beam scintillation as a function of transmitted optical power for various transmit and receive aperture sizes.

The evaluations of the various FSO architectures can begin by again evaluating outage performance. FIG. 12 shows plots 1200 of outage performance of a direct ground-to-satellite FSO link in the presence of atmospheric attenuation and beam scintillation as a function of transmitted optical power for various transmit and receive aperture sizes. In FIG. 12 and subsequent figures, "MC simulation" refers to a Monte Carlo simulation run on the simulated architecture. It can be generally assumed that a link can be considered as reliably closed when the outage probability is below approximately $10^{-5}$. FIG. 12 shows, as expected, that the link is easier to close at lower power levels with larger aperture sizes. However, it can be seen that the effect of atmospheric attenuation and beam scintillation is still so significant in a direct ground-to-satellite FSO link that a huge (undesirable, or even impractical) amount of transmit power is needed to have a reliable link even with large aperture sizes.

Figure 13:
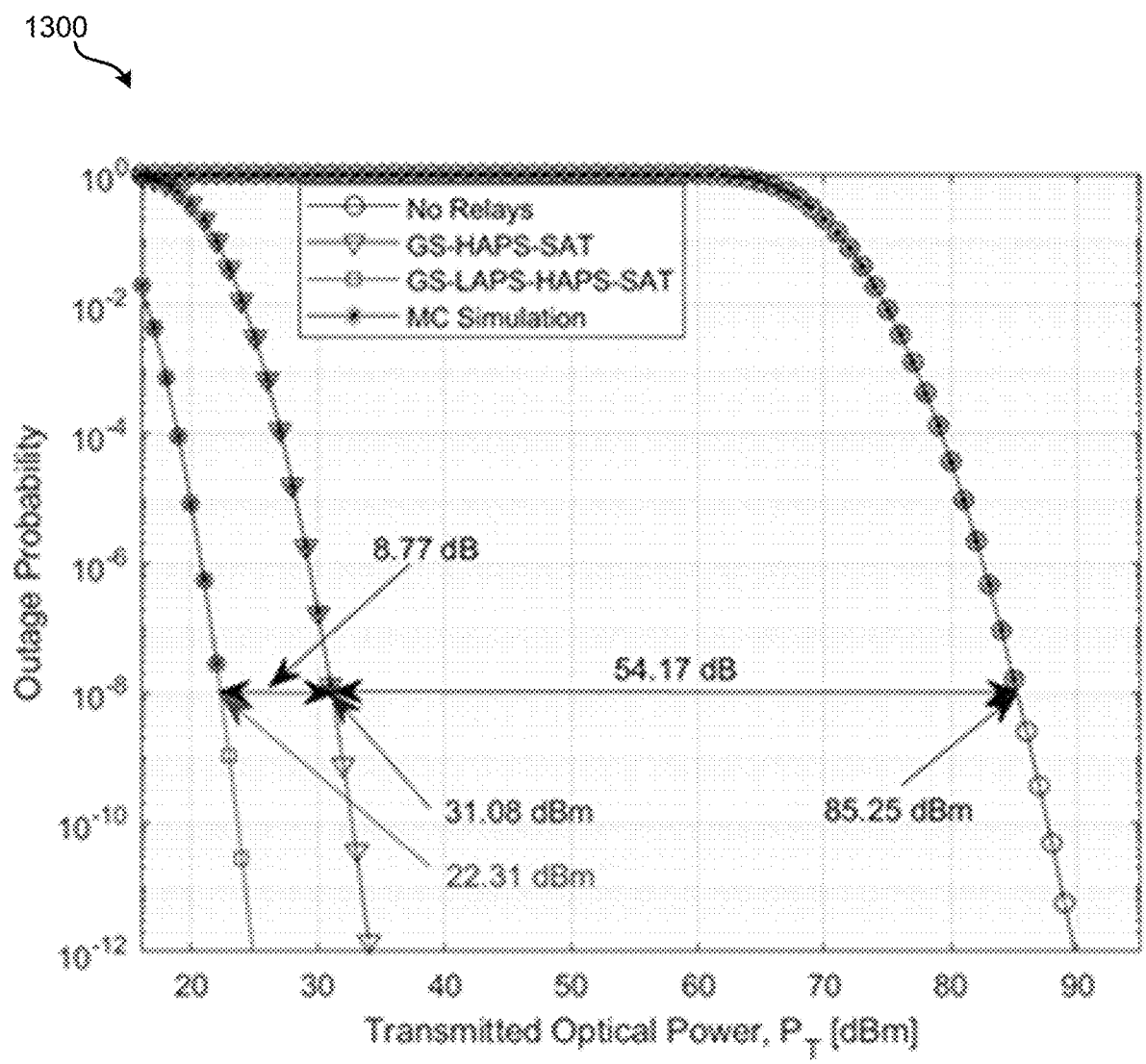
FIG. 13 shows plots of relative outage performance of serial relay-assisted schemes in the presence of atmospheric attenuation, free-space path loss, and beam scintillation.

FIG. 13 shows plots 1300 of relative outage performance of serial relay-assisted schemes in the presence of atmospheric attenuation, free-space path loss, and beam scintillation. The plots 1300 compare performance of the direct ground-to-satellite FSO communication link of FIG. 8, the single-relay architecture of FIG. 9, and the serial relay-assisted architecture of FIG. 10. It can be seen that even a single relay significantly improves the outage performance as compared to a ground-to-satellite FSO link, and the serial relay-assisted architecture provides an even further appreciable improvement. For example, to achieve an outage probability of $10^{-8}$, while 85.25 dBm of total transmit power is needed for a direct link without relays, only 31.08 dBm is needed to close the link using a single relay, and 22.31 dBm is needed to close the link with two serial FSO relays (i.e., a tropospheric FSO relay 410 and a stratospheric FSO relay 420). Therefore, the single-relay architecture of FIG. 9 can achieve a 54.17 dB gain improvement over the direct ground-to-satellite FSO communication link of FIG. 8, and the serial relay-assisted architecture of FIG. 10 can achieve an additional 8.77 dB gain improvement.

Figure 14:
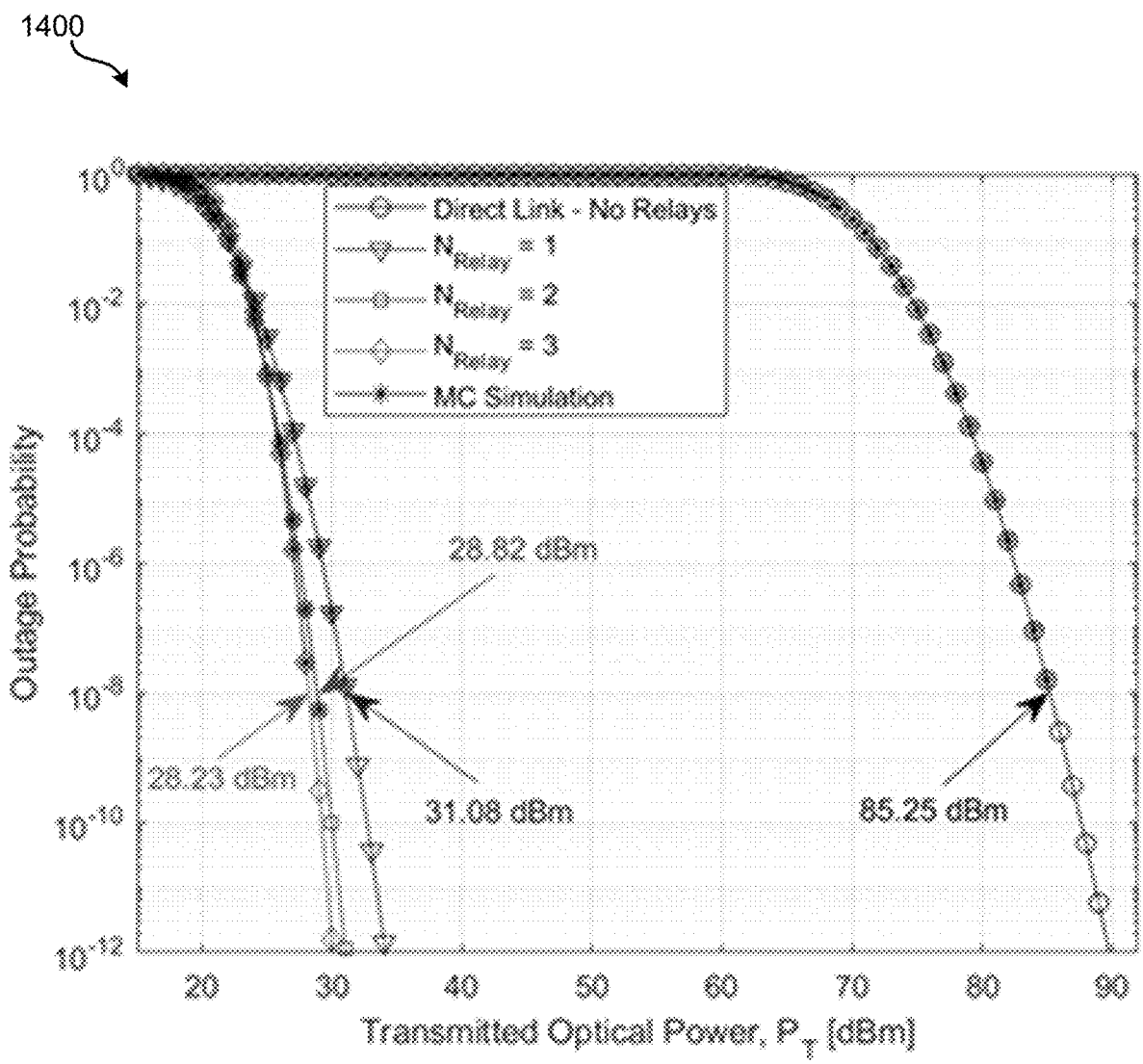
FIG. 14 shows plots of relative outage performance of parallel relay-assisted schemes in the presence of atmospheric attenuation, free-space path loss, and beam scintillation.

FIG. 14 shows plots 1400 of relative outage performance of parallel relay-assisted schemes in the presence of atmospheric attenuation, free-space path loss, and beam scintillation. The plots 1400 compare performance of the direct ground-to-satellite FSO communication link of FIG. 8, the single-relay architecture of FIG. 9, a first version of the parallel relay-assisted architecture of FIG. 11 having two relays in parallel, and a second version of the parallel relay-assisted architecture of FIG. 11 having three relays in parallel. For the parallel cases, it is assumed that the parallel FSO relays are at the same altitude as each other. The same improvements can be seen between the single-relay architecture and the direct ground-to-satellite FSO communication link as described in FIG. 13.

It can be further seen that both parallel relaying schemes provide further outage performance improvements over both the single-relay architecture and the direct ground-to-satellite FSO communication link, though less than the improvement achieved by the serial relay-assisted architecture of FIG. 10, as illustrated by FIG. 13. For example, to achieve an outage probability of $10^{-8}$, 85.25 dBm of total transmit power is needed to close the direct link without relays, while only 31.08 dBm is needed to close the link using one relay; 28.82 dBm is needed to close the link using two parallel relays, and 28.23 dBm is needed to close the link using three parallel relays. As demonstrated below, while the addition of serial FSO relays tends to address both beam scintillation and path loss effects, the addition of parallel FSO relays tends only to address beam scintillation effects.

Figure 15:
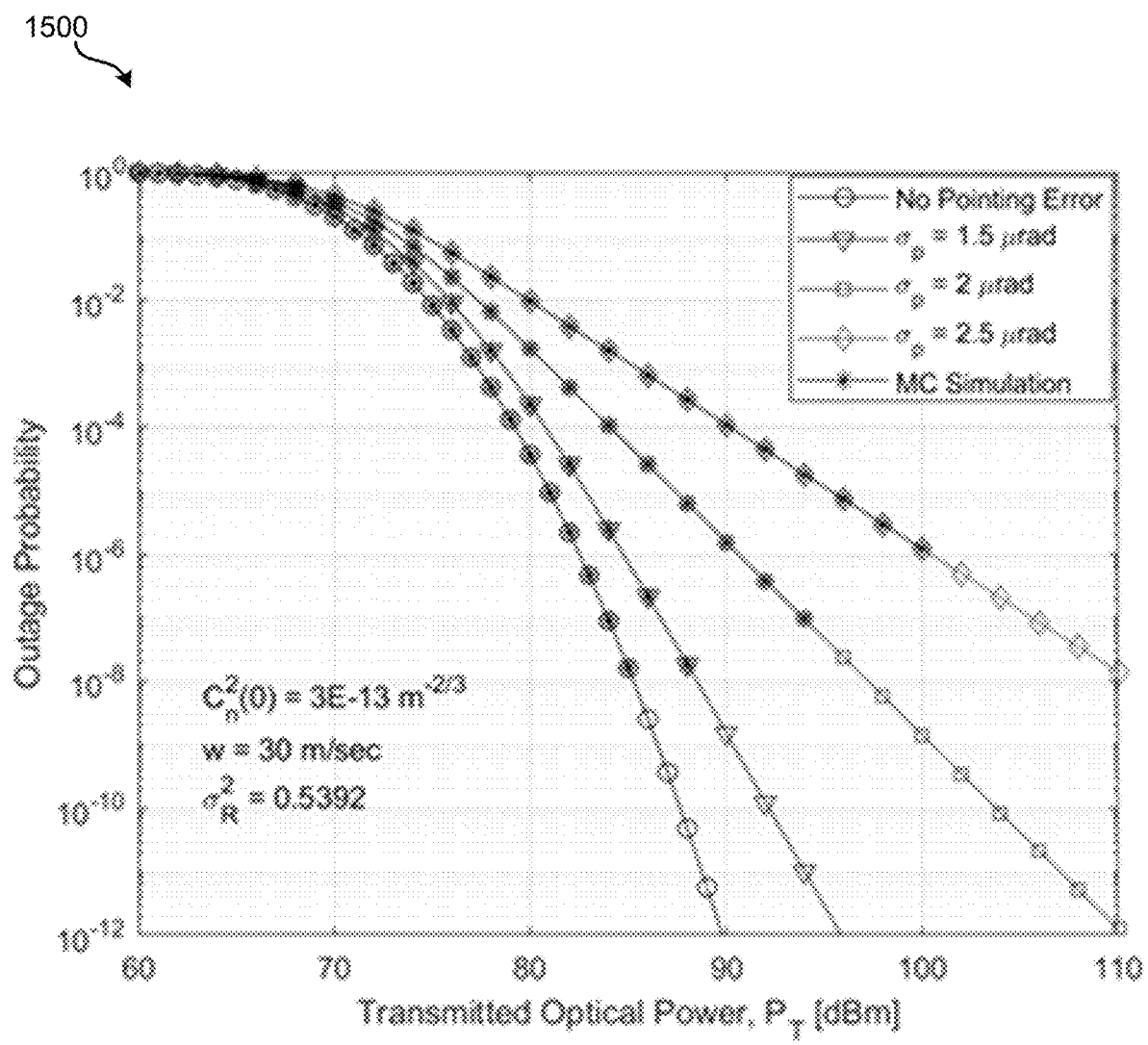
FIG. 15 shows plots of relative outage performance of a direct ground-to-satellite FSO communication link in the presence of atmospheric attenuation, free-space path loss, beam scintillation, and pointing error due to misalignment for various values of angular pointing jitter.

FIG. 15 shows plots 1500 of relative outage performance of a direct ground-to-satellite FSO communication link in the presence of atmospheric attenuation, free-space path loss, beam scintillation, and pointing error due to misalignment for various values of angular pointing jitter. The plots 1500 compares performance of the same direct ground-to-satellite FSO communication link of FIG. 8 using four different values of angular pointing jitter. The plots 1500 indicate that the pointing error due to misalignment significantly degrades the performance of a direct ground-to-satellite FSO link. Since power losses due to pointing error are also distance-dependent, relaying schemes provide an appreciable reduction in the effect of pointing error on the performance of the overall ground-to-satellite FSO link.

Figure 16:
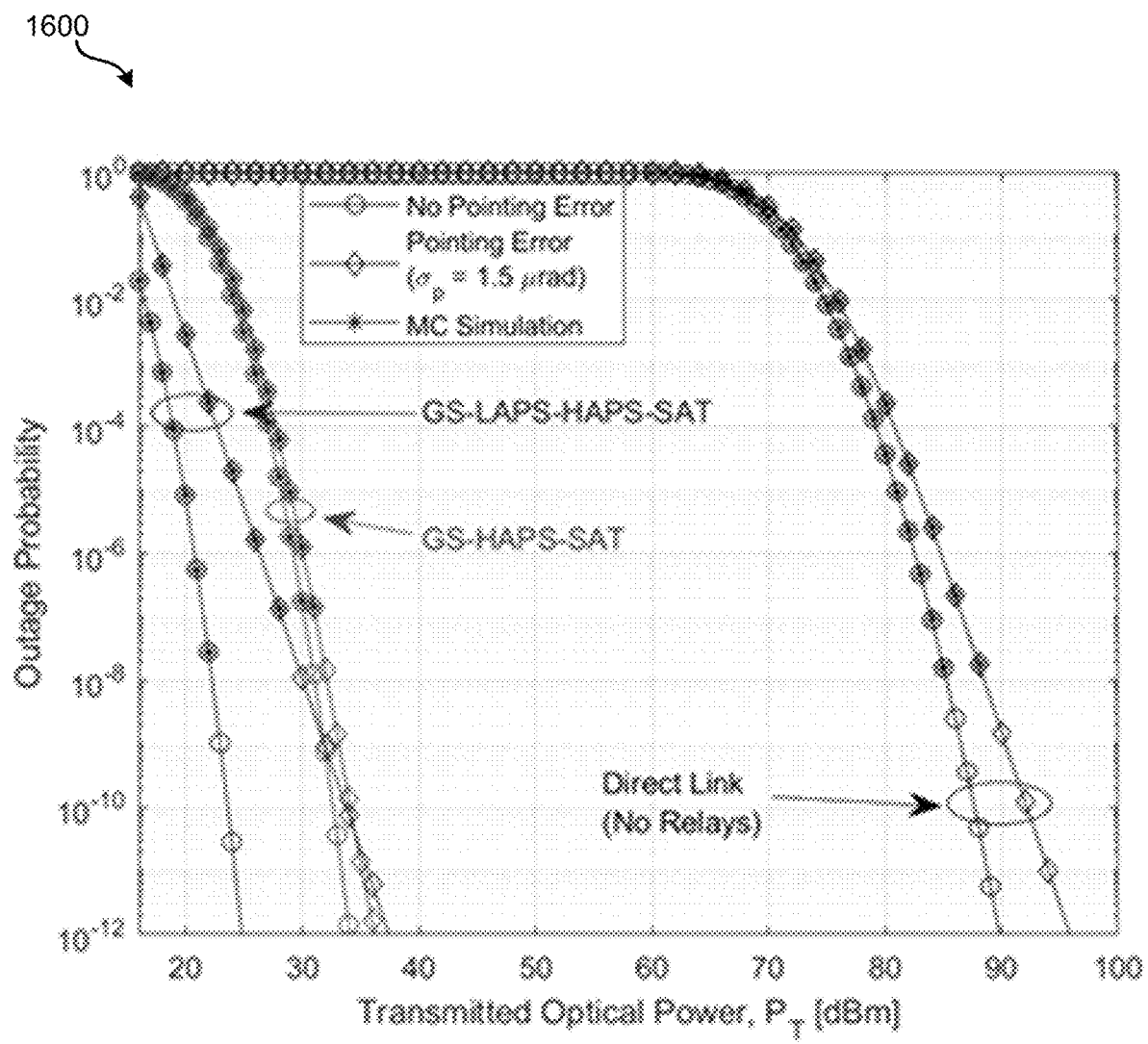
FIG. 16 shows plots of relative outage performance of various architectures in the presence of atmospheric attenuation, free-space path loss, beam scintillation, and pointing error.

In comparison with FIG. 15, FIG. 16 shows plots 1600 of relative outage performance of various architectures in the presence of atmospheric attenuation, free-space path loss, beam scintillation, and pointing error. The plots 1600 compare the direct ground-to-satellite FSO communication link of FIG. 8, the single-relay architecture of FIG. 9, and the serial relay-assisted architecture of FIG. 10, each for a condition without pointing error and for a condition with an angular pointing jitter of $\sigma_p$=1.5 μrad. It can be seen that adding serial FSO relays can significantly improve performance of the ground-to-satellite FSO link in the presence of misalignment induced pointing error. Notably, pointing error has less effect on the single-relay architecture of FIG. 9 than on the serial relay-assisted architecture of FIG. 10 or on the direct ground-to-satellite FSO communication link of FIG. 8. This is because, in the single-relay architecture, the sub-link between the optical ground station 150 and the FSO relay (e.g., the stratospheric FSO relay 420) is dominating the overall outage probability and it is a much shorter link, as compared with a direct link from the optical ground station 150 to the satellite 140, or the longer sub-link from the stratospheric FSO relay 420 to the satellite 140.

Figure 17:
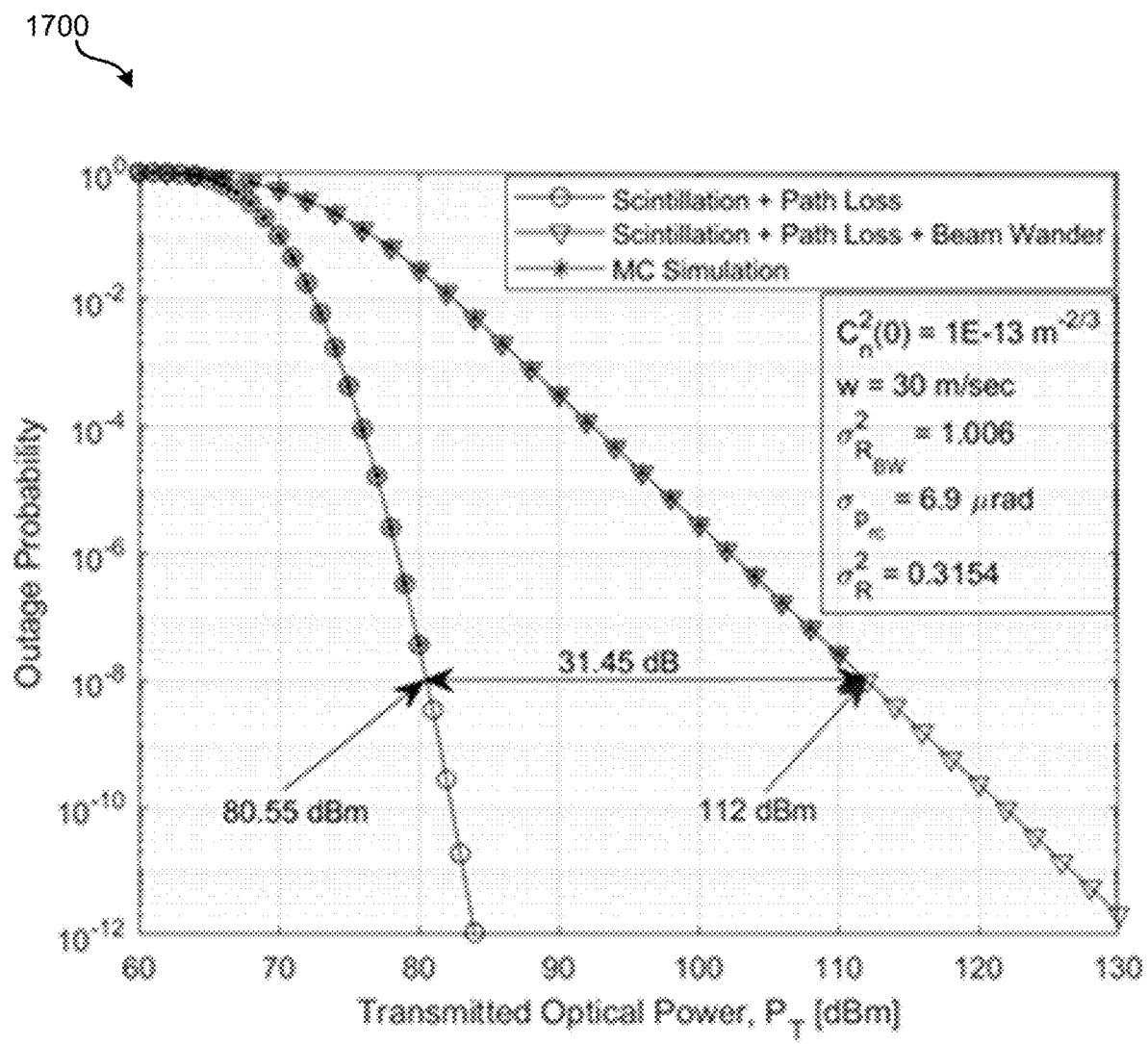
FIG. 17 shows plots of relative outage performance of the direct ground-to-satellite FSO communication link of FIG. 8 with and without beam wander.
Figure 18:
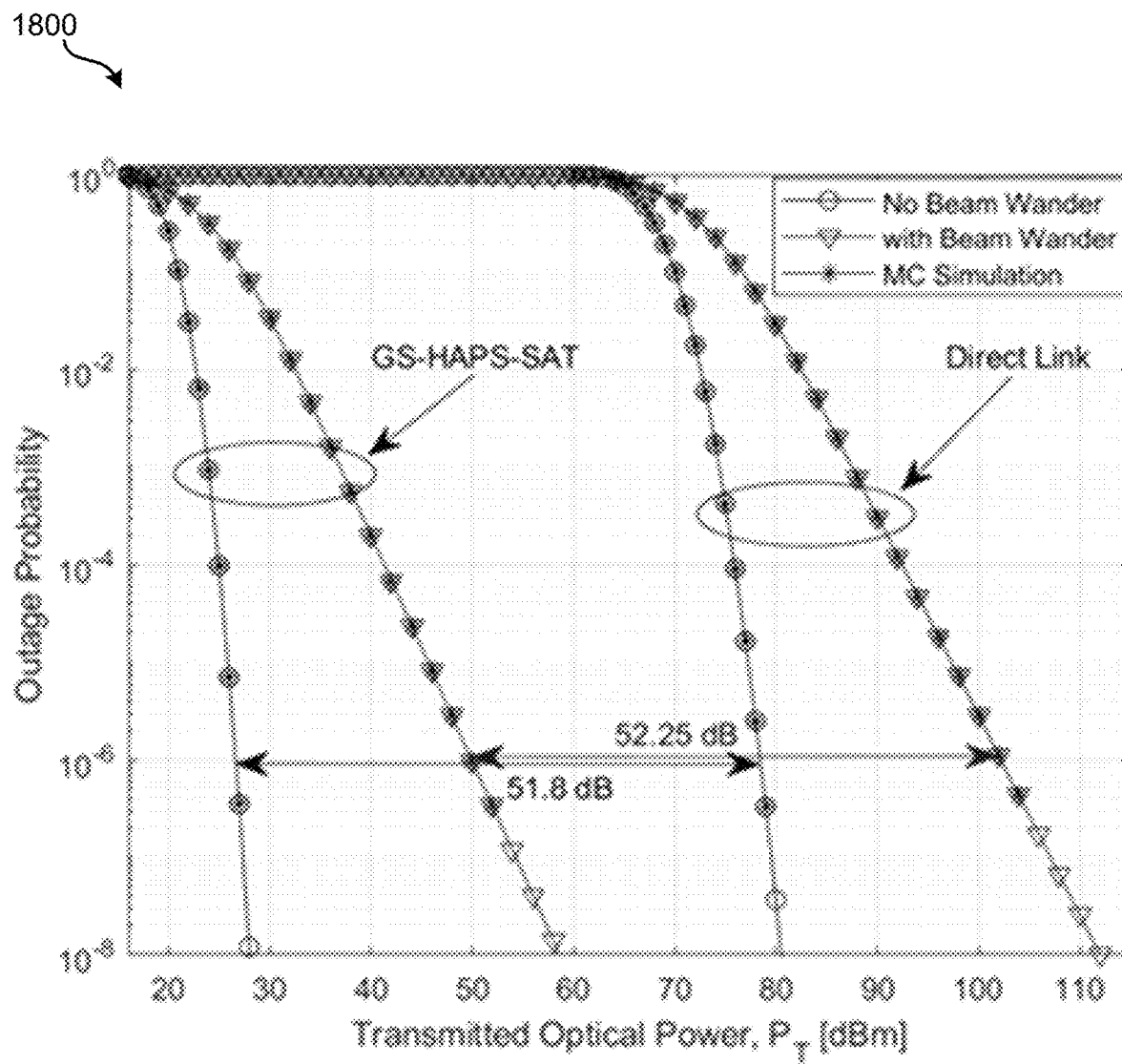
FIG. 18 shows plots of relative outage performance between the direct ground-to-satellite FSO communication link of FIG. 8 and the single-relay architecture of FIG. 9, both with and without beam wander.
Figure 19:
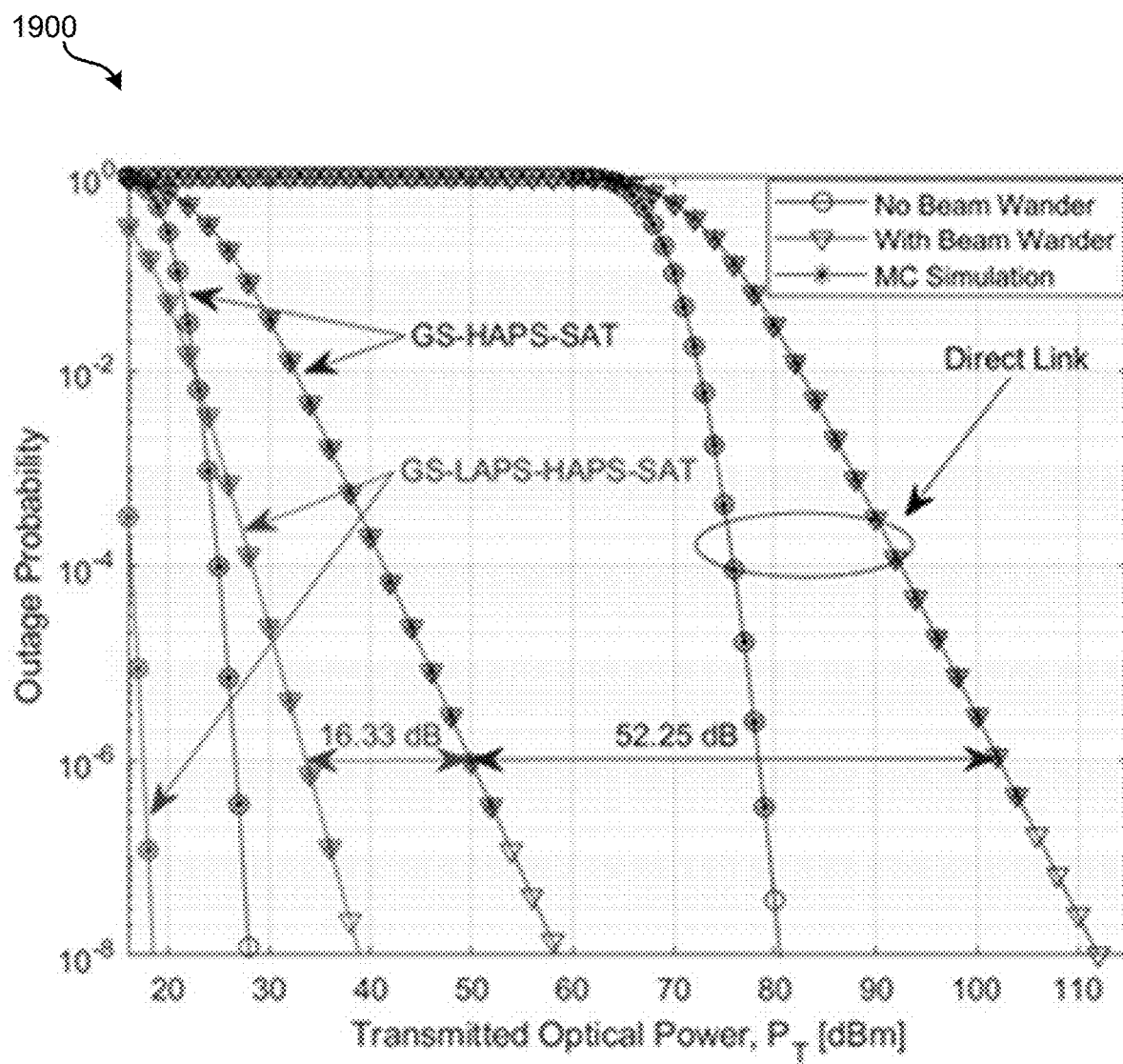
FIG. 19 shows plots comparing relative outage performance results of FIGS. 17 and 18 with further outage performance results for the serial relay-assisted architecture of FIG. 10, all with and without beam wander.

FIGS. 17-19 evaluate the effect of beam wander on various architectures. FIG. 17 shows plots 1700 of relative outage performance of the direct ground-to-satellite FSO communication link of FIG. 8 with and without beam wander. The plots 1700 both assume the presence of free-space path loss and beam scintillation. The plots 1700 assume $C_n^2(0)$=$10^{-13}$ $m^{-2/3}$ and w=30 m/sec. As illustrated, one result is a Rytov variance of $\sigma_{R_{BW}}$=1.006 in the presence of beam wander effect, as compared to a Rytov variance of $\sigma_R^2$=0.3154 without beam wander. Another result is a beam wander induced angular pointing jitter of $\sigma_{p_{rc}}$=6.9 μrad. It can be seen that the beam wander has significant effect on the performance of the direct ground-to-satellite FSO link. It can be observed that for the given atmospheric conditions, there is a 31.45 dB loss at an outage probability of $10^{-8}$ due to beam wander effects in a direct ground-to-satellite FSO link.

In comparison, FIG. 18 shows plots 1800 of relative outage performance between the direct ground-to-satellite FSO communication link of FIG. 8 and the single-relay architecture of FIG. 9, both with and without beam wander. The plots 1800 all assume the presence of atmospheric attenuation, free-space path loss, and beam scintillation. As in FIG. 17, the plots 1800 assume $C_n^2(0)$=$10^{-13}$ $m^{-2/3}$ and w=30 m/sec. For the single-relay architecture, this results in: for the sub-link between the optical ground station 150 and the stratospheric FSO relay, 420, a reduced Rytov variance of $\sigma_{R_{G\text{-}H,BW}}^2=0.7317$ with beam wander effects and of $\sigma_{R_{G\text{-}H}}^2=0.1389$ without beam wander effects; and for the sub-link between the stratospheric FSO relay 420 and the satellite 140, a further reduced Rytov variance of $\sigma_{R_{G\text{-}S,BW}}^2=0.00005$ with beam wander effects and of $\sigma_{R_{H\text{-}S}}^2=0.00037$ without beam wander effects. It also results in a beam wander induced angular pointing jitter of $\sigma_{p_{rc},G\text{-}H}=5.53$ μrad for the sub-link between the optical ground station 150 and the stratospheric FSO relay 420, and a beam wander induced angular pointing jitter of $\sigma_{p_{rc},H\text{-}S}=0.115$ μrad for the sub-link between the stratospheric FSO relay 420 and the satellite 140.

In further comparison, FIG. 19 shows plots 1900 comparing relative outage performance results of FIGS. 17 and 18 with further outage performance results for the serial relay-assisted architecture of FIG. 10, all with and without beam wander. The plots 1900 all assume the presence of atmospheric attenuation, free-space path loss, and beam scintillation. As in FIGS. 17 and 18, the plots 1900 assume $C_n^2(0)=10^{-13}$ m$^{-2/3}$ and w=30 m/sec. From FIGS. 17-19, it can be seen that beam wander has significant relative effect on the link performance in all architectures. However, even the single relay at a HAPS can appreciably improve the performance of a ground-to-satellite FSO link in the presence of beam wander, and the serial implementation of multiple FSO relays provides an even greater performance improvement in the presence of beam wander. As an example, FIG. 18 demonstrates that there is a 52.25 dB power gain in the single-relay architecture as compared with the direct ground-to-satellite FSO communication link. FIG. 19 shows that the outage performance of the serial relay-assisted architecture of FIG. 10 (i.e., with both a tropospheric FSO relay 410 and a stratospheric FSO relay 420) achieves an additional 16.33 dB of power gain even in the presence of beam wander.

Optimizations of Novel Ground-to-Satellite FSO Communication Link Architectures

The following description details optimizations of ground-to-satellite FSO communication link architectures described herein, including optimizations to optimize power allocation to the FSO relays (FIGS. 20-23), to optimize altitude of the FSO relays (FIGS. 24-27), and/or to optimize transmitter beam radius for the optical ground station and/or FSO relays (FIGS. 28-35). Though each optimization is described as a stand-alone optimization, the optimizations can be combined in any suitable manner. In some embodiments, a multi-variable optimization can be performed to simultaneously optimize for some or all of the power allocation, relay altitude, and transmitter beam radius. In other embodiments, one or more optimizations can be performed serially.

Turning first to power allocation optimization, power allocation to the source and relay nodes can be an important consideration in a relay-assisted transmission scheme. Power allocation can be optimized based on the channel condition of each intermediate link (i.e., each sub-link), or based on the power efficiency requirements of each node (i.e., each FSO relay). In the above performance evaluations, the power is assumed to be equally distributed between the nodes. However, at least because the channel conditions of each intermediate link are typically different and the channels are typically not identical, equal distribution of the power will tend not to be the optimum power allocation. The above performance evaluations demonstrate that more power can be used to decrease outage probability (i.e., to improve closure of the link) in cases with less favorable channel conditions. As such, because atmospheric attenuation and turbulence are relatively severe in any sub-links between the optical ground station 150 and the atmospheric effect boundary (A0 105 in FIGS. 1 and 4-7), it can be assumed that an optimal power allocation will tend to allocate more power to the optical ground station 150 and/or to lower-altitude FSO relays (e.g., a tropospheric FSO relay 410), and less power to higher-altitude relays (e.g., a stratospheric FSO relay 420).

The optimum power allocation to the nodes in a relay-assisted transmission scheme can be obtained by minimizing a performance metric, such as outage probability or bit-error-rate with respect to the allocated power to each node. This can be described as follows:

$$\min_{P_{T_i}}(P_{out}),\ \text{s.t.} \sum_{i=1}^{N} P_{T_i} = P_T \qquad \text{(Eq. 40)}$$

where i∈ {GS, LAPS, HAPS}, and N is the number of nodes. Since the outage expression in the case of relay-assisted transmission schemes is very complicated, the outage performance as a function of total transmitted power graphs can be used to more easily optimize power allocation to each node. Such an approach can consider the outage performance of each intermediate link in a relay-assisted scheme as a function of total transmitted power when the power is equally distributed to each node.

Figure 20:
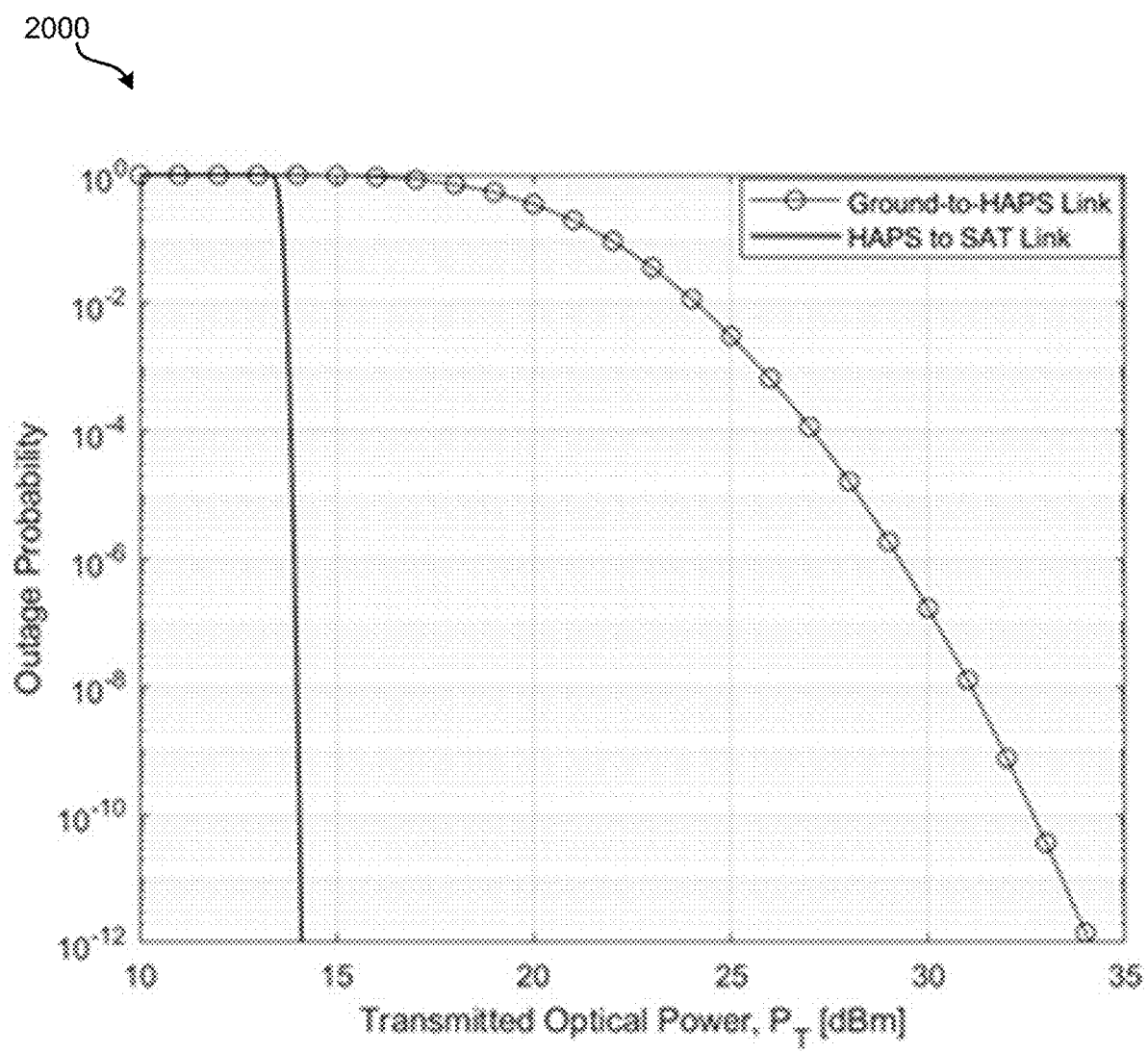
FIG. 20 shows plots of outage performance comparing each intermediate link from ground-station to a HAPS and from a HAPS to a satellite for the single-relay architecture of FIG. 9 as a function of total transmitted power with equal distribution of power to each node.

FIG. 20 shows plots 2000 of outage performance of the FSO sub-links (i.e., the FSO link between the optical ground station 150 and the stratospheric FSO relay 420, and the FSO link between the stratospheric FSO relay 420 and the satellite 140) of the single-relay architecture of FIG. 9 as a function of total transmitted power with equal distribution of power to each node. The plots 2000 assume the presence of atmospheric attenuation and beam scintillation. It can be inferred that the optical ground station 150 needs much more power to minimize the overall outage probability since the sub-link between the optical ground station 150 and the HAPS (i.e., the single stratospheric FSO relay 420) seems to dominate the overall outage probability.

Figure 21A:
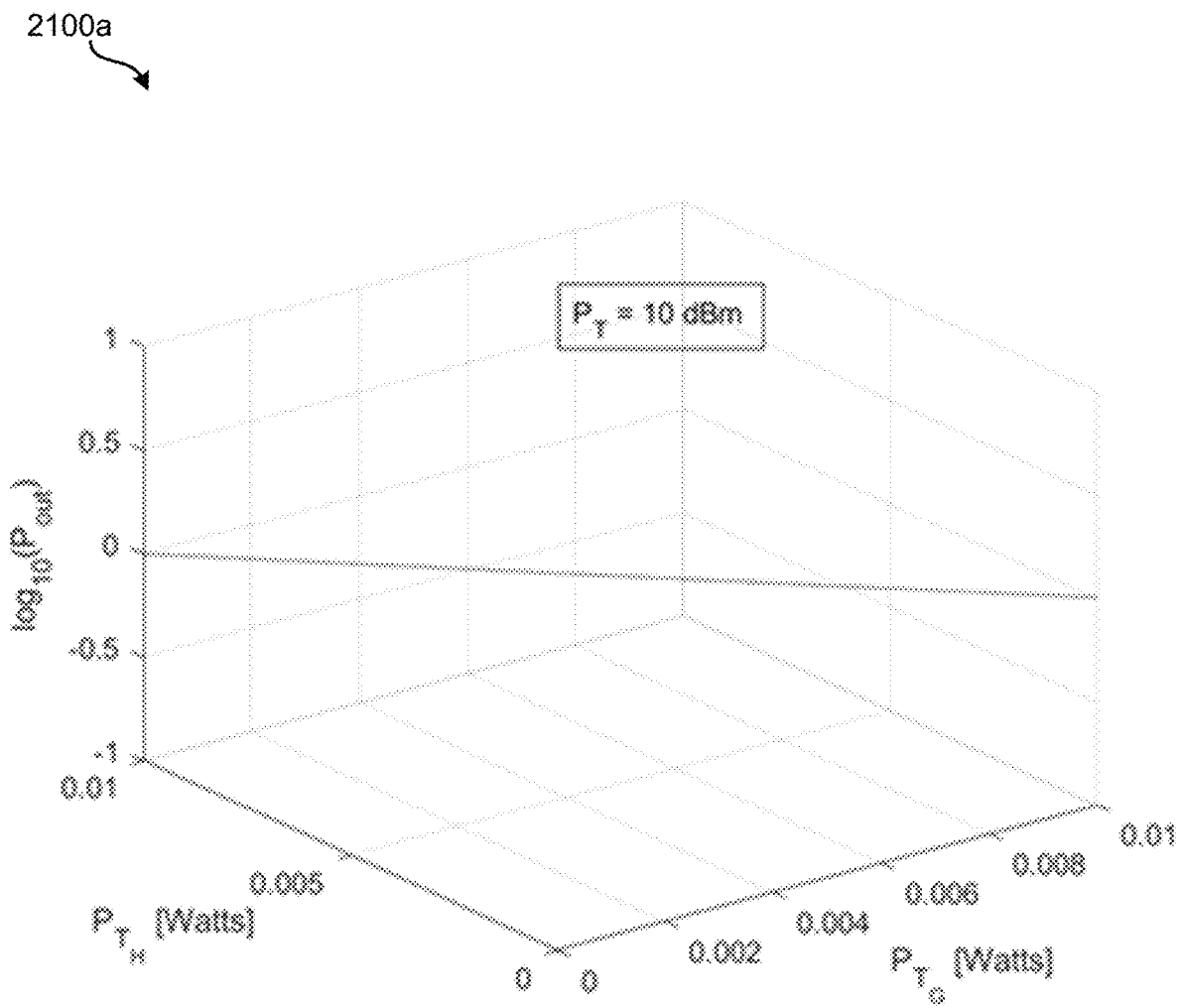
FIGS. 21A-21C show plots of illustrative power allocation optimizations for the single-relay architecture of FIG. 9 for total transmitted powers of 10 dBm, 20 dBm, and 30 dBm, respectively.
Figure 21B:
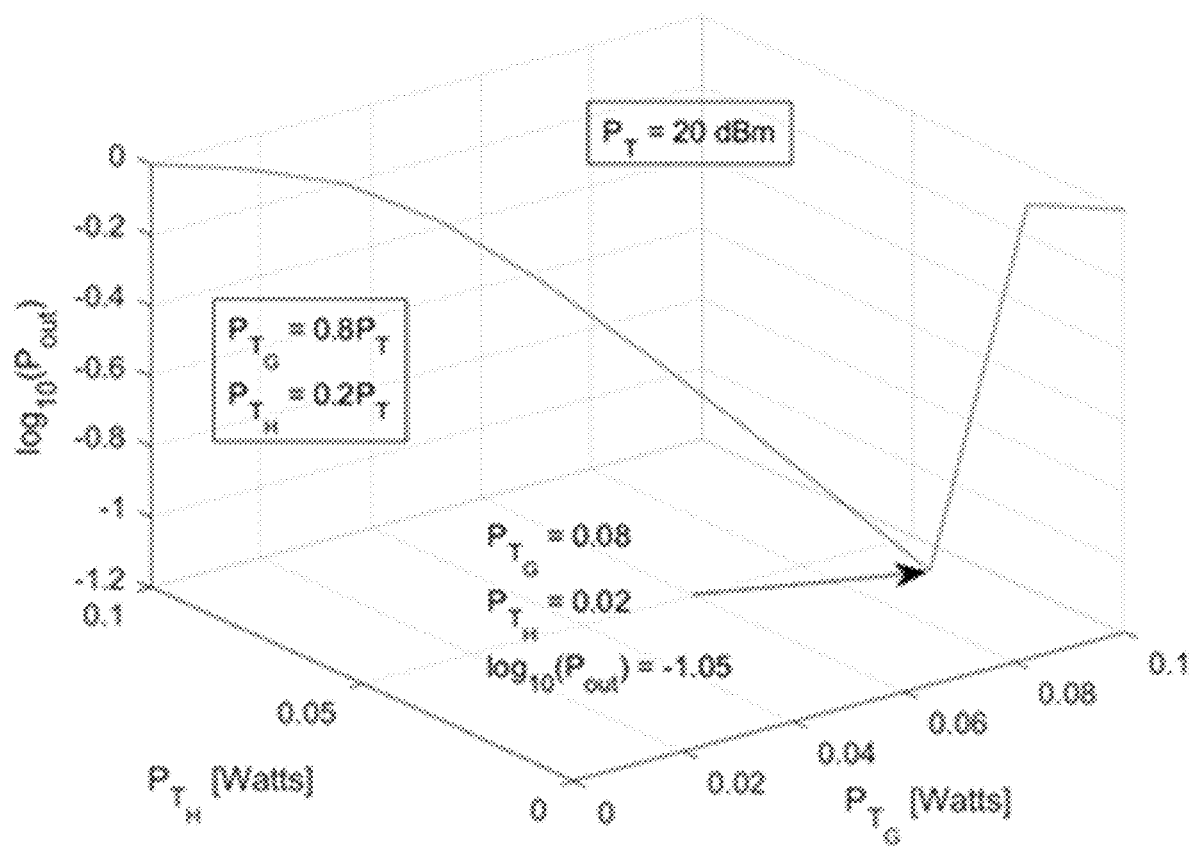
Figure 21C:
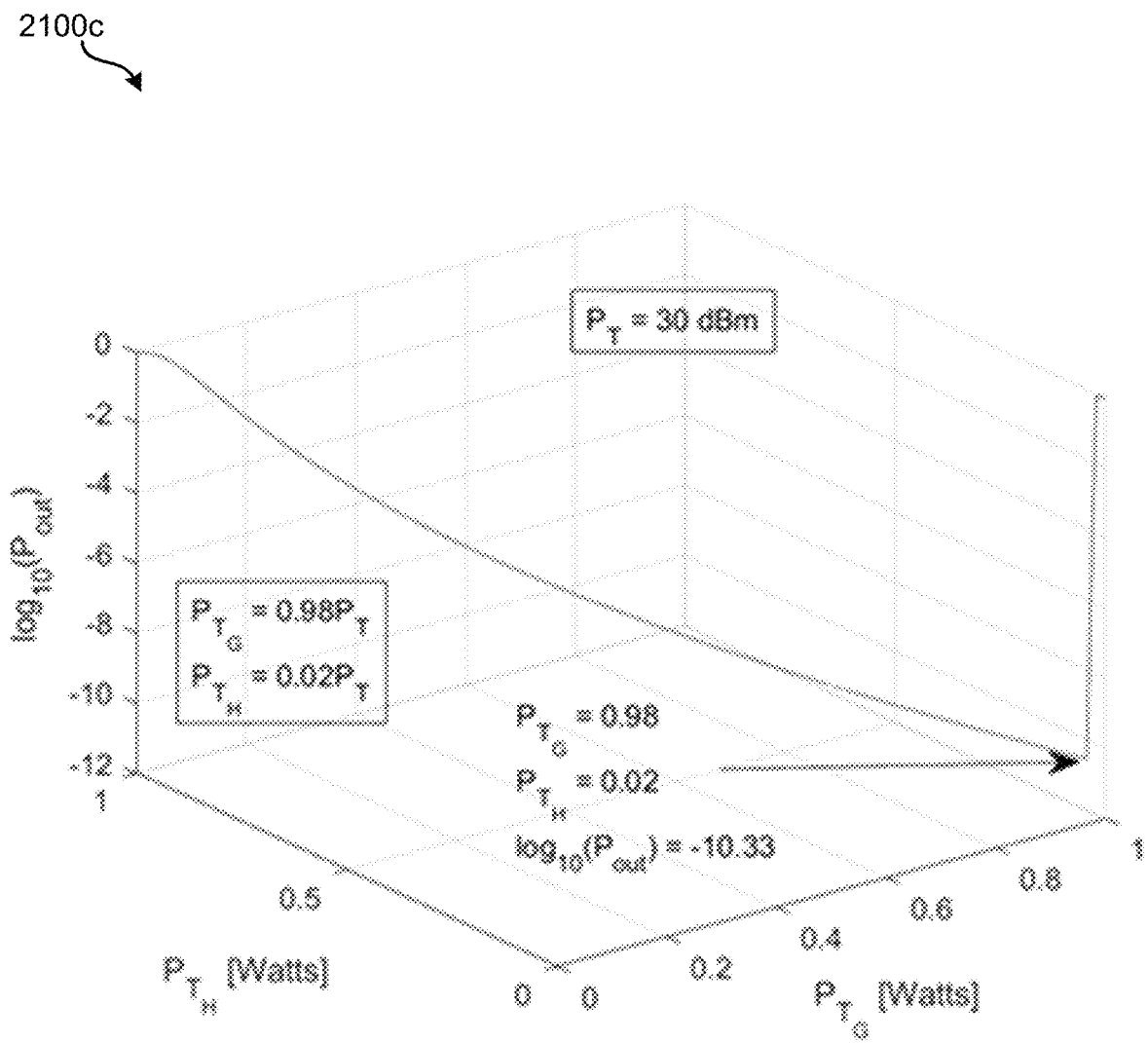

Because the slopes of the curves are not the same, it is beneficial to optimize the power allocation ratio for each total transmitted power. For example, FIGS. 21A-21C show plots 2100 of illustrative power allocation optimizations for the single-relay architecture of FIG. 9 for total transmitted powers of 10 dBm, 20 dBm, and 30 dBm, respectively. It can be seen that, for a total transmitted power less than 14 dBm, the link would be in an outage condition for any allocation ratio. For the total transmitted power of 20 dBm (FIG. 21B), the optimum allocation ratio is $P_{T_G}/P_{T_H}=0.8/0.2=4$, and for the total transmitted power of 30 dBm (FIG. 21C), the optimum allocation ratio is $P_{T_G}/P_{T_H}=0.98/0.02=49$. Performing the power allocation optimization for all total transmitted powers can yield a power allocation table for each node (e.g., for the optical ground station 150 and all FSO relays) for which the outage probability is minimum.

Figure 22:
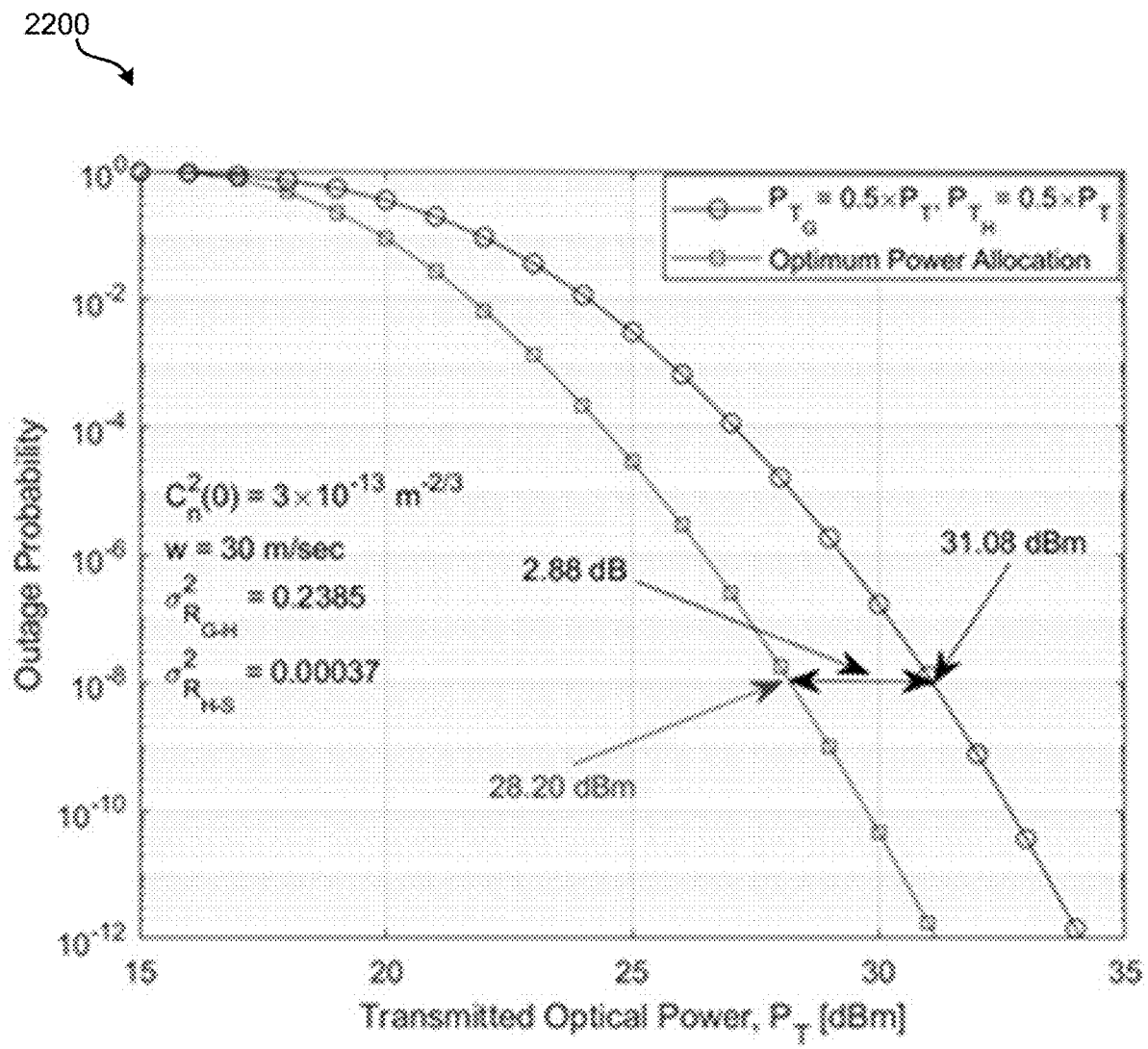
FIG. 22 shows plots of outage performance for the single-relay architecture of FIG. 9 in the presence of atmospheric attenuation and beam scintillation, comparing an equal power allocation condition and an optimum power allocation condition.
Figure 23:
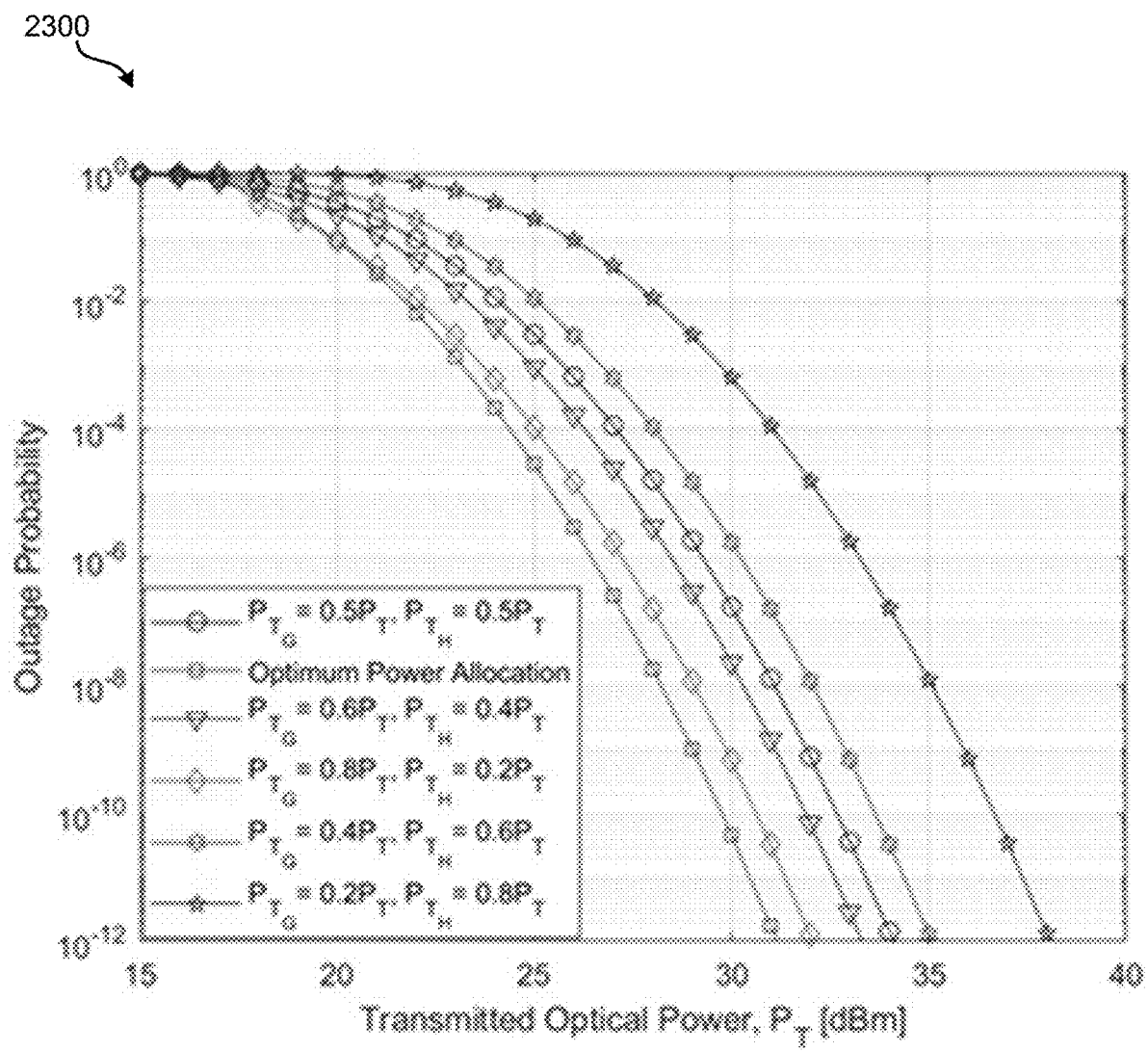
FIG. 23 shows plots of outage performance of the single-relay architecture of FIG. 9 in the presence of atmospheric attenuation and beam scintillation with various power allocation ratios.

FIG. 22 shows plots 2200 of outage performance for the single-relay architecture of FIG. 9 in the presence of atmospheric attenuation and beam scintillation, comparing an equal power allocation condition and an optimum power allocation condition. It can be seen that a 2.88 dB power gain is obtained at an outage probability of $10^{-8}$ using an optimum power allocation with respect to the equal power allocation. It should be noted that the optimum power allocation allocates much less power to the HAPS (i.e., to the stratospheric FSO relay 420). This can provide the further feature that the HAPS typically has a limited power source, and such an optimal power allocation can help to reduce power consumption at the HAPS.

To further support the results illustrated in FIGS. 20-22, FIG. 23 shows plots 2300 of outage performance of the single-relay architecture of FIG. 9 in the presence of atmospheric attenuation and beam scintillation with various power allocation ratios. The plots 2300 demonstrate that the optimum power allocation yields the best performance, as compared with all other allocation ratios.

The same approach to power allocation optimization can be applied to any of the novel relay-assisted schemes described herein, including to the serial relay-assisted architecture of FIG. 10 and/or to the parallel relay-assisted architecture of FIG. 11. In each case, an optimum power allocation can be obtained for the optical ground station 150 and for all tropospheric FSO relays 410 and/or stratospheric FSO relays 420. The result yields an optimum power allocation for the entire ground-to-satellite FSO link. In some embodiments, the optimizations are constrained by real world parameters. For example, one or more nodes may have a maximum power at which they can operate based on regulations, electronics, etc.; and the power allocation optimization can be configured to account for such limitations.

Turning to a second type of optimization, FSO link performance can be improved by optimizing the altitudes of the two or more FSO relays, there by essentially optimizing the path lengths of the FSO sub-links. The atmospheric channel is variable along the vertical path and its properties change as a function of altitude. Therefore, each intermediate sub-link can manifest different performance based at least on the altitude of the relay and the sub-link's path length. An optimum altitude can be found for any tropospheric FSO relay 410 and/or stratospheric FSO relay 420 that minimizes the overall outage probability.

Figure 24:
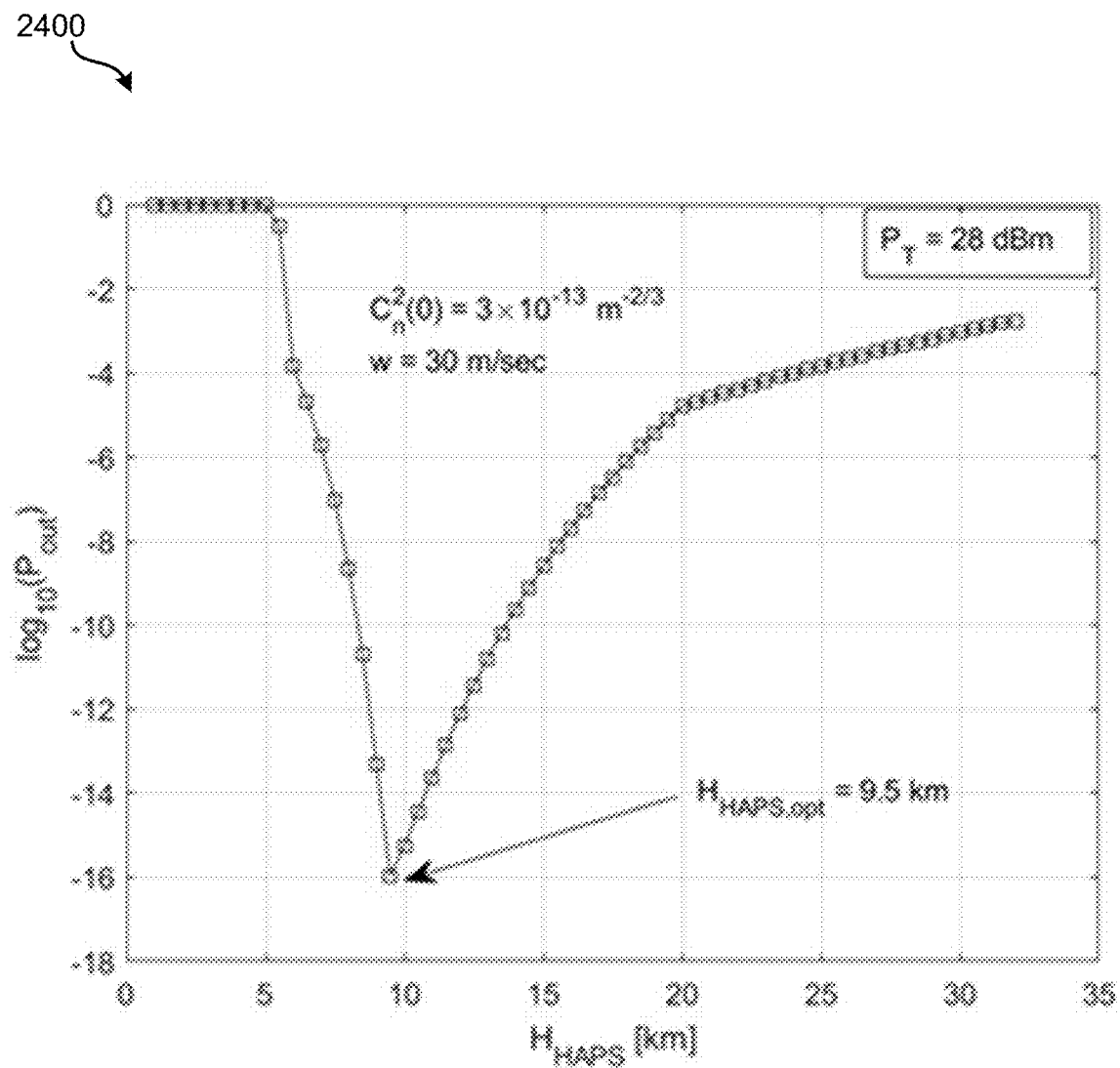
FIG. 24 shows a plot of outage performance of the single-relay architecture of FIG. 9 as a function of relay altitude.

For example, FIG. 24 shows a plot 2400 of outage performance of the single-relay architecture of FIG. 9 as a function of relay altitude. The plot 2400 assumes a fixed total transmit power of $P_T$=28 dBm and the presence of atmospheric attenuation, free space path loss, and beam scintillation. It can be seen that, for a single FSO relay and the given atmospheric channel conditions, the optimum altitude for the FSO relay at which the link has minimum outage probability is 9.5 kilometers above sea level. Although FIG. 24 shows the height as "$H_{HAPS}$", the results suggest that the optimal single-relay implementation under these conditions uses a tropospheric FSO relay 410 deployed on a LAPS at only 9.5 kilometers (well below A0 105 of FIGS. 1 and 4-7).

Figure 25:
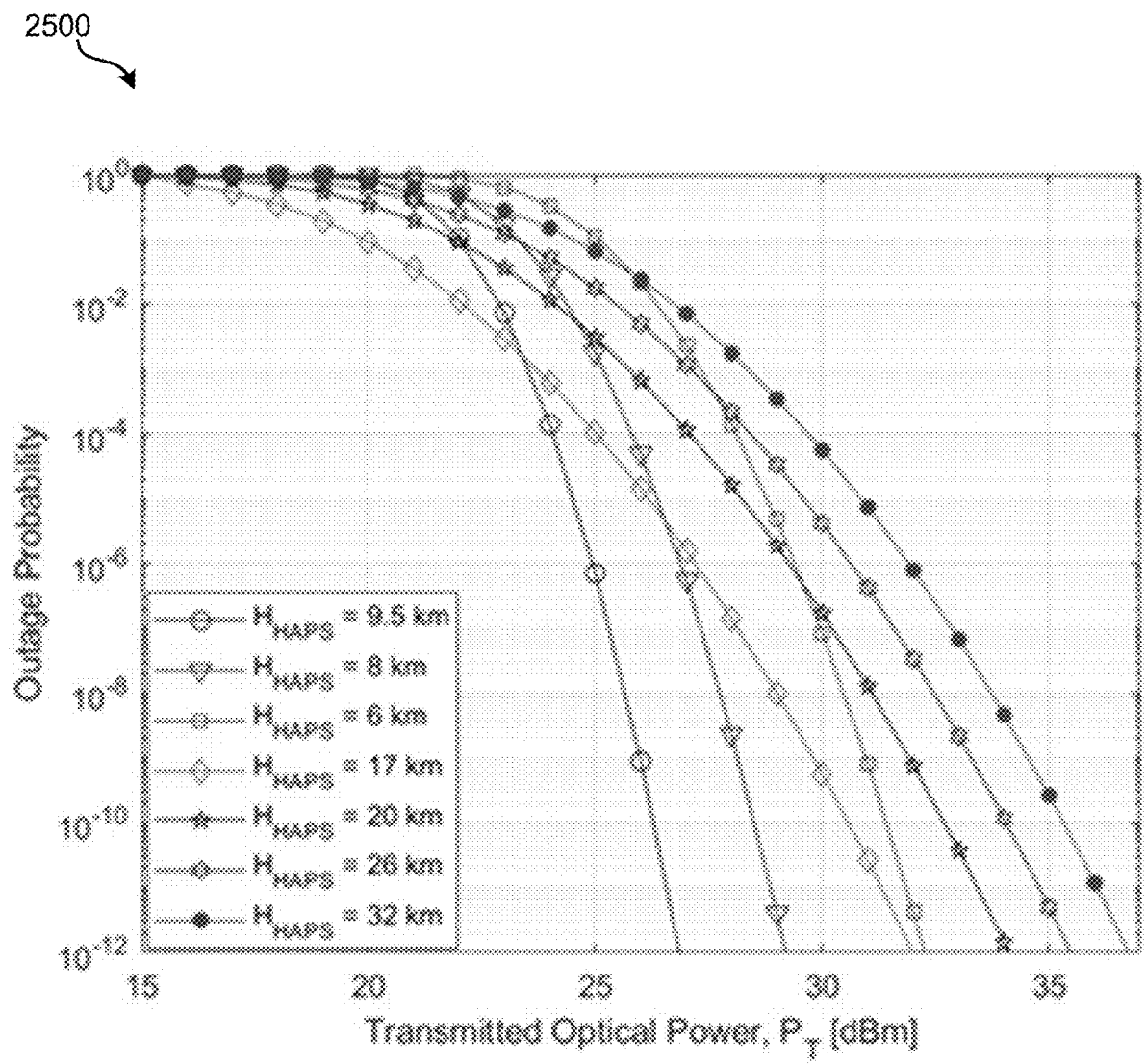
FIG. 25 shows plots of outage performance of the single-relay architecture of FIG. 9 as a function of total transmitted optical power for various FSO relay altitudes.

For added comparison, FIG. 25 shows plots 2500 of outage performance of the single-relay architecture of FIG. 9 as a function of total transmitted optical power for various FSO relay altitudes. It can be seen that deploying the FSO relay at an altitude of around 9.5 kilometers yields better outage performance than all altitudes above and below. For example, to achieve an outage probability of less than $10^{-5}$, a minimum amount of total transmit power is needed when the FSO relay is at around 9.5 kilometers above sea level.

Figure 26:
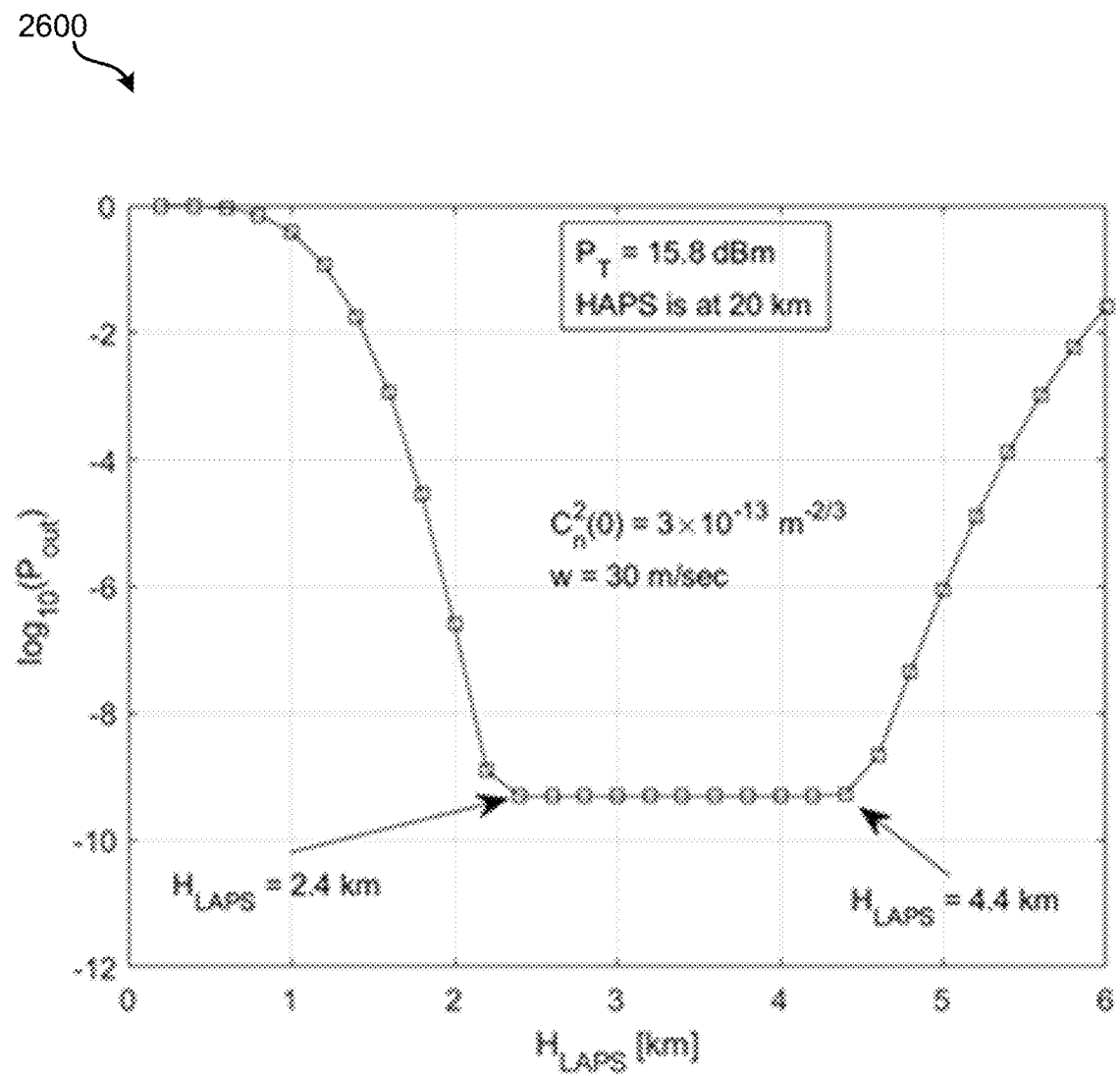
FIG. 26 shows a plot of outage performance for the serial relay-assisted architecture of FIG. 10 as a function of the altitude of the tropospheric FSO relay, assuming the stratospheric FSO relay is deployed at 20 kilometers above sea level.

FIG. 26 shows a plot 2600 of outage performance for the serial relay-assisted architecture of FIG. 10 as a function of the altitude of the tropospheric FSO relay 410, assuming the stratospheric FSO relay 420 is deployed at 20 kilometers above sea level. The plot 2600 assumes a fixed total transmitted optical power of $P_T$=15.8 dBm and the presence of atmospheric attenuation, free-space path loss, and beam scintillation. It can be seen that, for the given atmospheric channel conditions, the optimum altitude of a LAPS (i.e., of the tropospheric FSO relay 410) at which the link has a minimum outage probability is between 2.4 km and 4.4 km.

Figure 27:
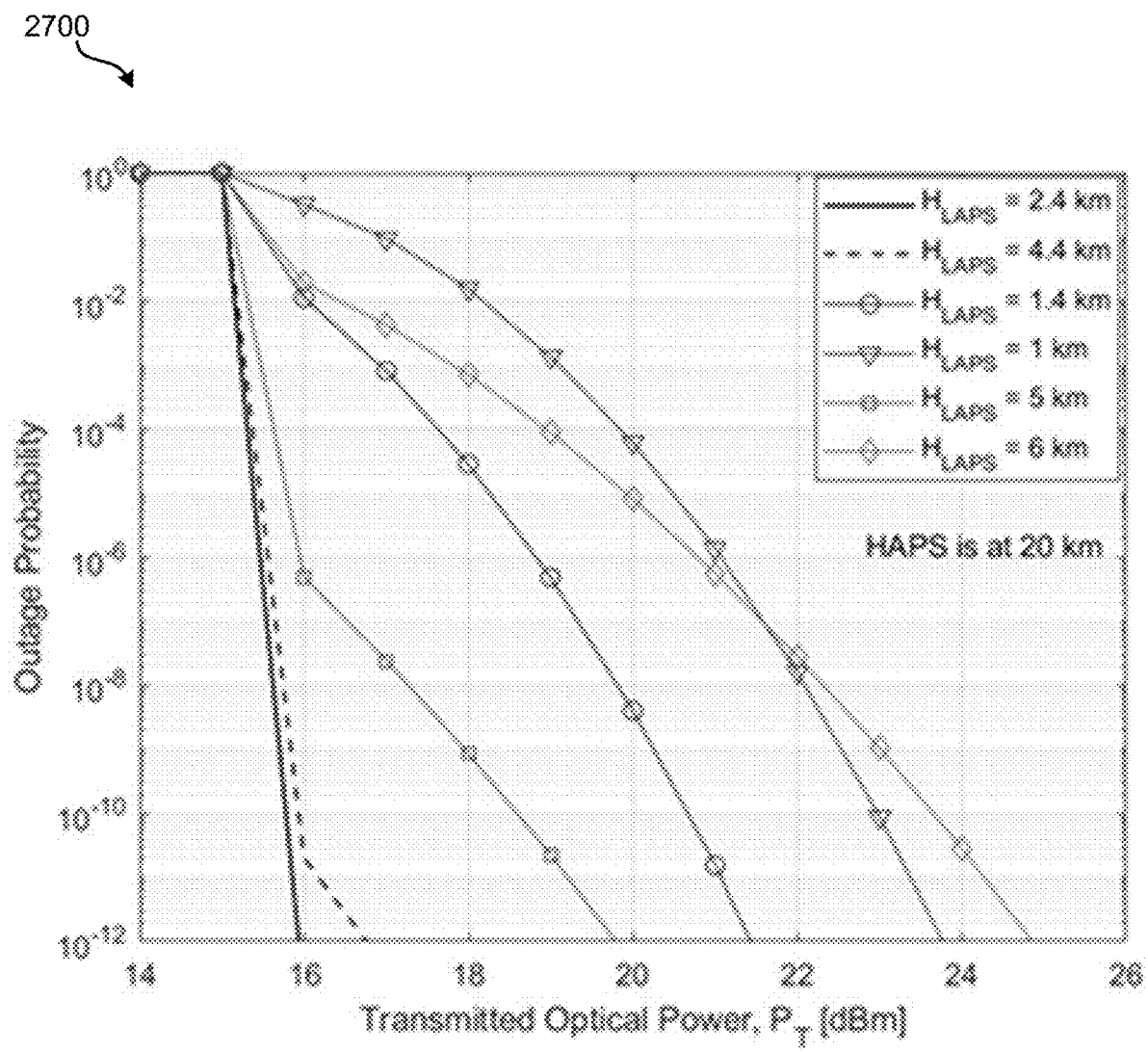
FIG. 27 shows plots of outage performance of the serial relay-assisted architecture of FIG. 10 as a function of total transmitted optical power for various altitudes of the tropospheric FSO relay, assuming again that the stratospheric FSO relay is at 20 kilometers above sea level.

For added comparison, FIG. 27 shows plots 2700 of outage performance of the serial relay-assisted architecture of FIG. 10 as a function of total transmitted optical power for various altitudes of the tropospheric FSO relay 410, assuming again that the stratospheric FSO relay 420 is at 20 kilometers above sea level. The plots 2700 demonstrate that the best performance is obtained when the LAPS (i.e., the tropospheric FSO relay 410) is located between 2.4 km and 4.4 km altitudes.

Turning to a third optimization, FSO link performance can be improved by optimizing the transmitter beam radius at one or more nodes. Transmitter beam radius can have different impacts on the transmitter aperture gain, pointing error due to misalignment, scintillation index in the presence of beam wander, and beam wander induced angular pointing jitter. Therefore, optimizing the transmitter beam radius for a ground-to-satellite FSO link can help to achieve the best performance.

Figure 28A:
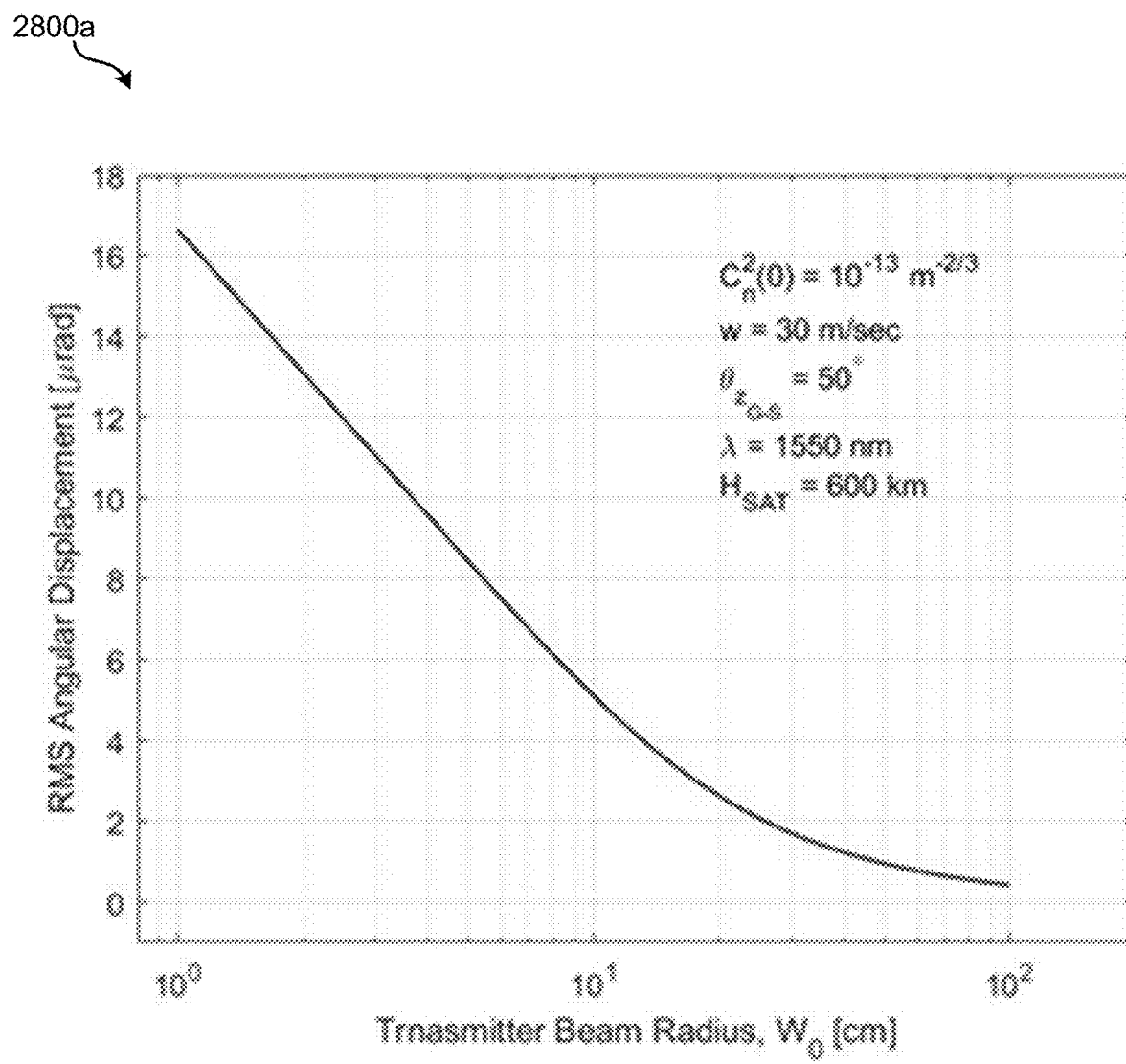
FIGS. 28A and 28B show plots of the behavior of beam wander induced root-mean-squared (RMS) angular displacement and on-axis scintillation index, respectively, as a function of transmitter beam radius.
Figure 28B:
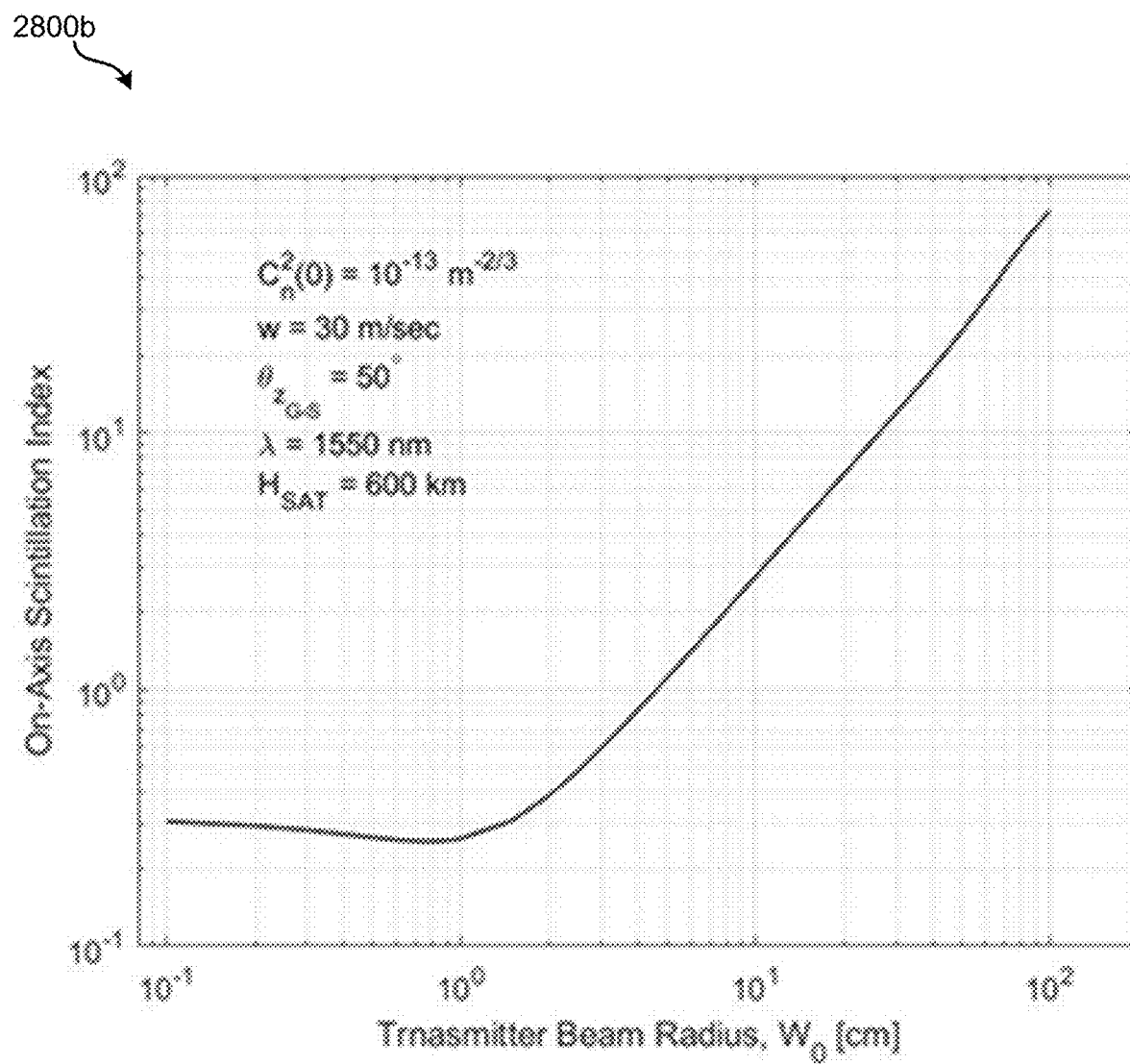

FIGS. 28A and 28B show plots 2800 of the behavior of beam wander induced root-mean-squared (RMS) angular displacement and on-axis scintillation index, respectively, as a function of transmitter beam radius. Plot 2800a of FIG. 28A demonstrates that the beam wander induced RMS angular displacement is a decreasing function of transmitter beam radius. Plot 2800b of FIG. 28B demonstrates that the on-axis scintillation index in the presence of beam wander is an increasing function of the transmitter beam radius. Therefore, for any FSO link in the presence of atmospheric attenuation, beam scintillation, and beam wander, there can be an optimum transmitter beam radius that optimizes the performance of the link.

Figure 29:
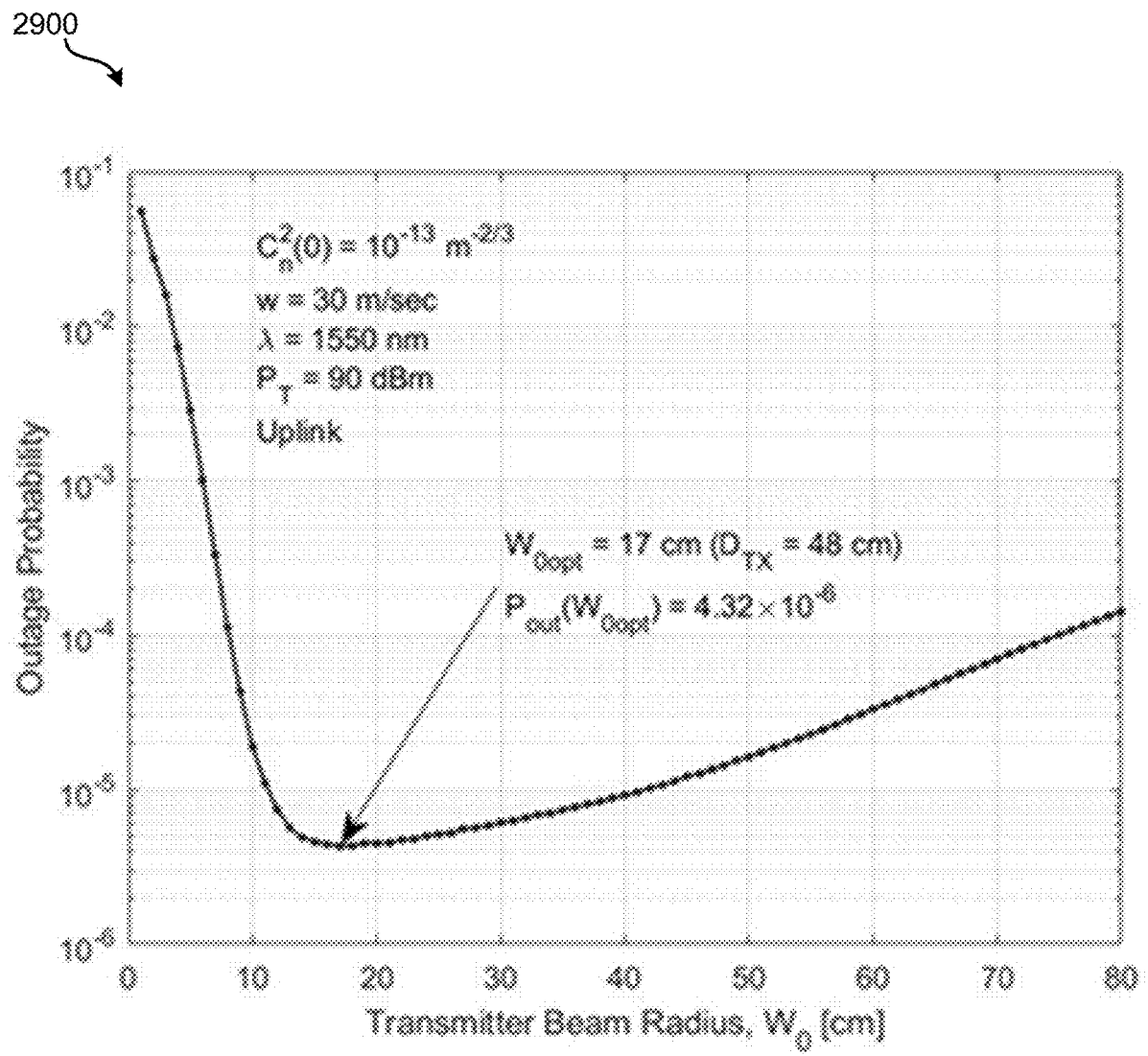
FIG. 29 shows a plot of outage performance of the direct ground-to-satellite FSO communication link of FIG. 8 (i.e., with no FSO relays) as a function of transmitter beam radius.
Figure 30:
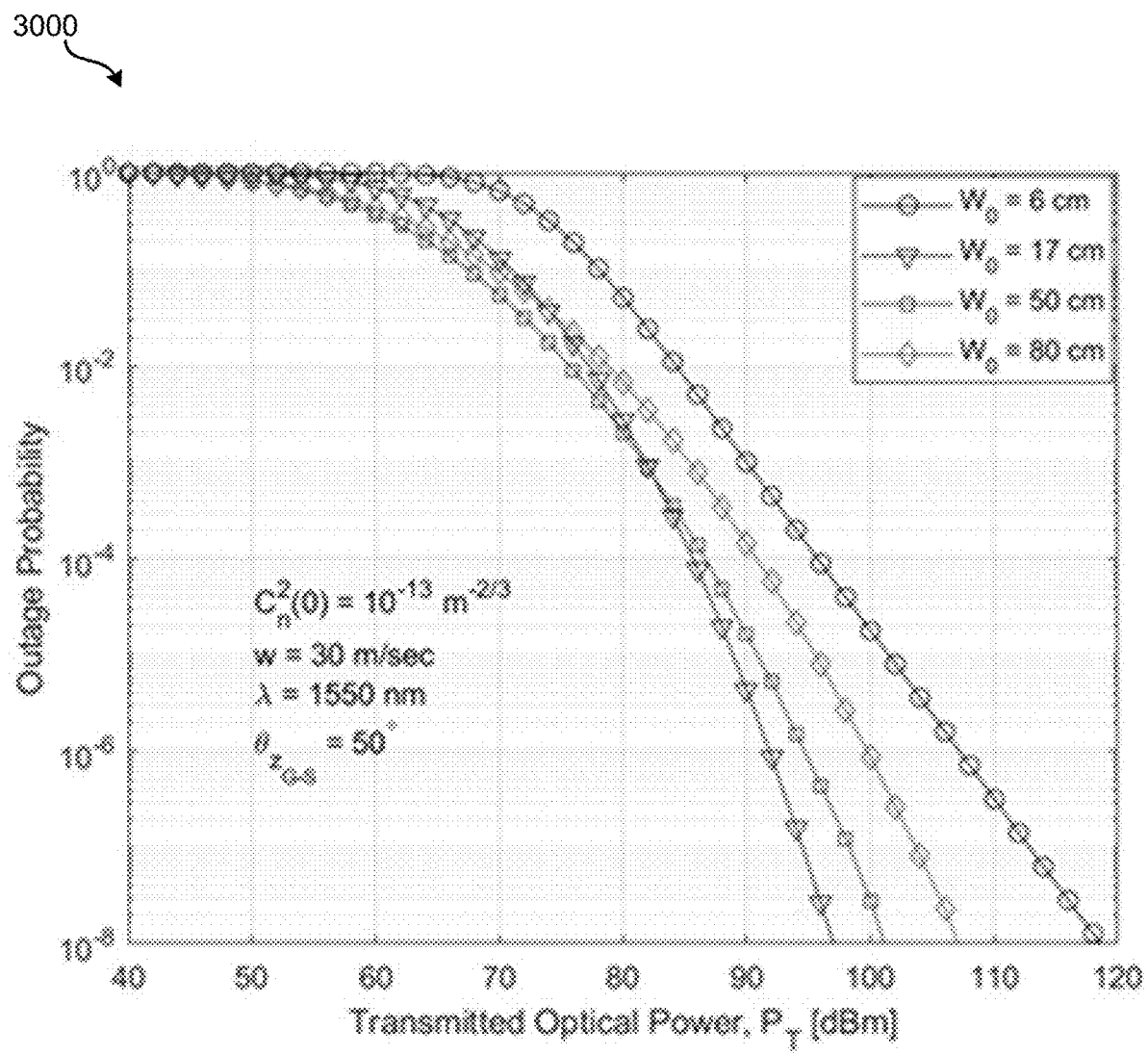
FIG. 30 shows plots of outage performance of the same direct ground-to-satellite FSO communication link of FIG. 8 as a function of total transmitted optical power for several different transmitter beam radiuses.

As a preliminary matter, FIG. 29 shows a plot 2900 of outage performance of the direct ground-to-satellite FSO communication link of FIG. 8 (i.e., with no FSO relays) as a function of transmitter beam radius. The plot 2900 assumes the presence of atmospheric attenuation, free-space path loss, beam scintillation, and beam wander effects. The plot 2900 demonstrates that, for the given channel conditions, the optimum transmitter beam radius is around 17 centimeters (which corresponds to a transmit aperture diameter of around 48 centimeters). To further support this finding, FIG. 30 shows plots 3000 of outage performance of the same direct ground-to-satellite FSO communication link of FIG. 8 as a function of total transmitted optical power for several different transmitter beam radiuses. Again, the plots 3000 assume the presence of atmospheric attenuation, free-space path loss, beam scintillation, and beam wander. The plots 3000 support the finding in FIG. 29 that the best outage performance is obtained when the transmitter beam radius is optimized.

Figure 31:
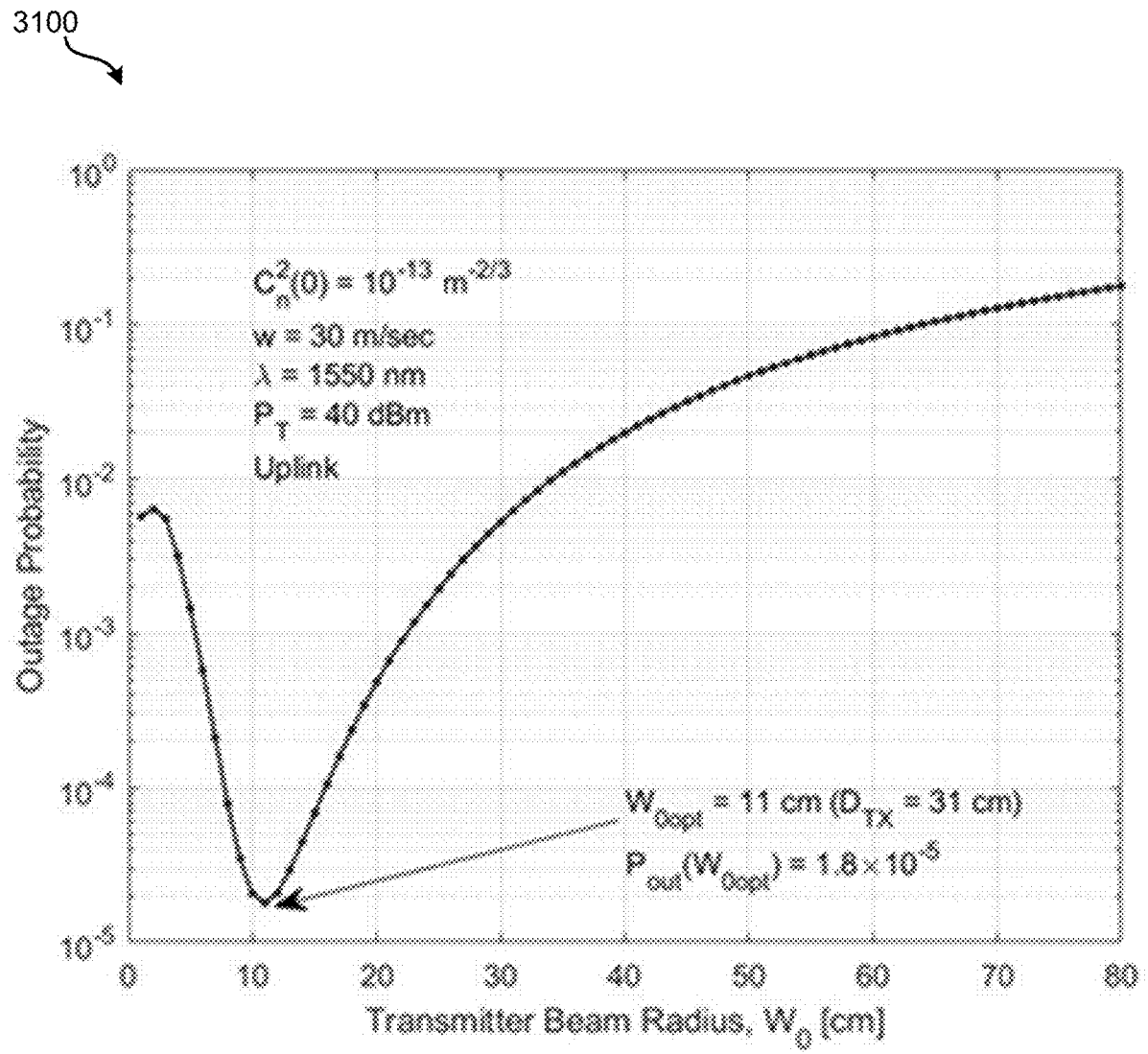
FIG. 31 shows a plot of outage performance of the single-relay architecture of FIG. 9 as a function of transmitter beam radius.
Figure 32:
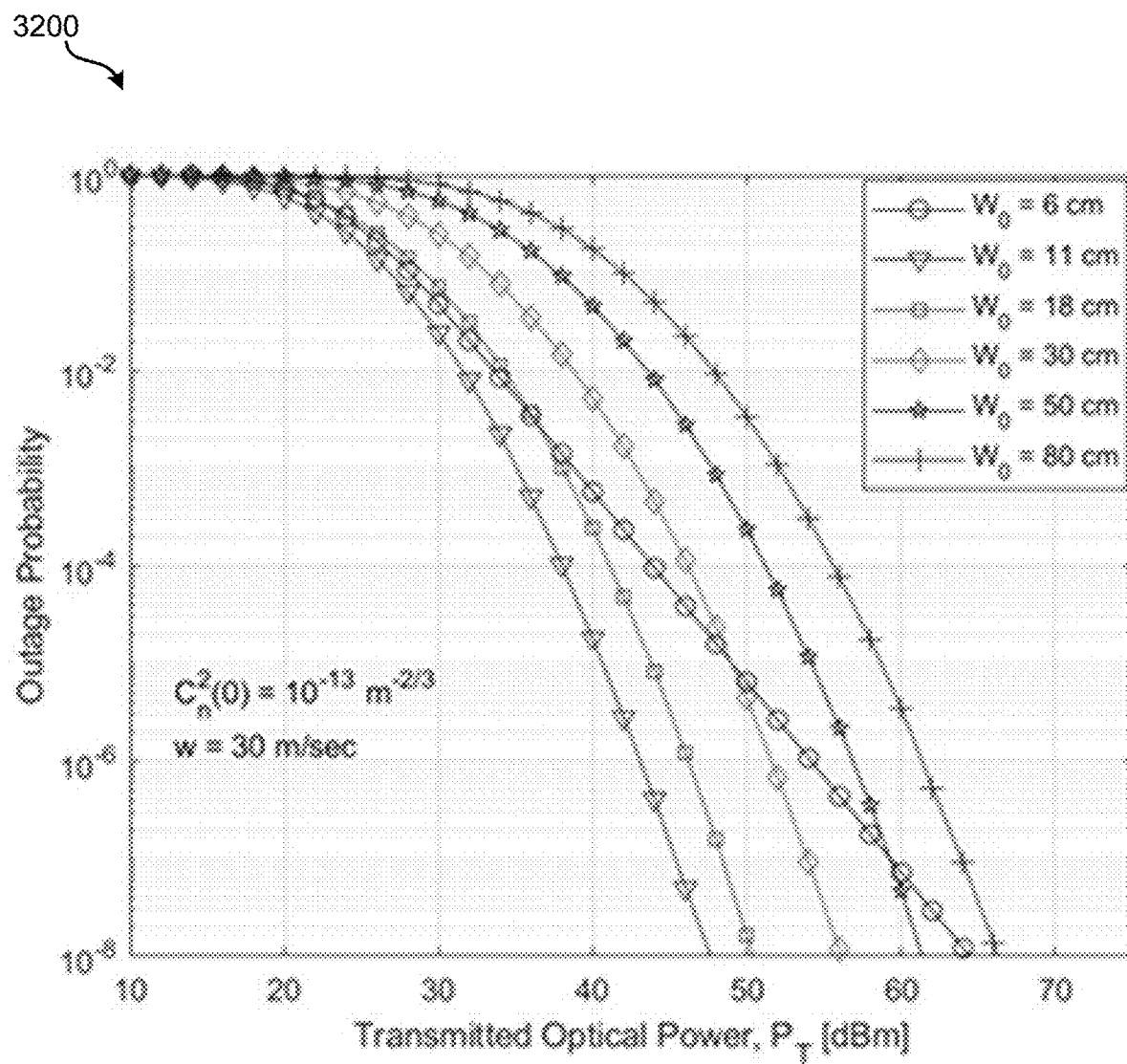
FIG. 32 shows plots of outage performance of the same single-relay architecture of FIG. 9 as a function of total transmitted optical power for several different transmitter beam radiuses.

FIG. 31 shows a plot 3100 of outage performance of the single-relay architecture of FIG. 9 as a function of transmitter beam radius. The plot 3100 assumes a fixed total transmitted power and the presence of atmospheric attenuation, free-space path loss, beam scintillation, and beam wander effects. The plot 3100 demonstrates that, for the given channel conditions, the optimum transmitter beam radius is around 11 centimeters (which corresponds to a transmit aperture diameter of around 31 centimeters). To further support this finding, FIG. 32 shows plots 3200 of outage performance of the same single-relay architecture of FIG. 9 as a function of total transmitted optical power for several different transmitter beam radiuses. Again, the plots 3200 assume the presence of atmospheric attenuation, free-space path loss, beam scintillation, and beam wander. The plots 3200 support the finding in FIG. 31 that the best outage performance is obtained when the transmitter beam radius is optimized.

Figure 33:
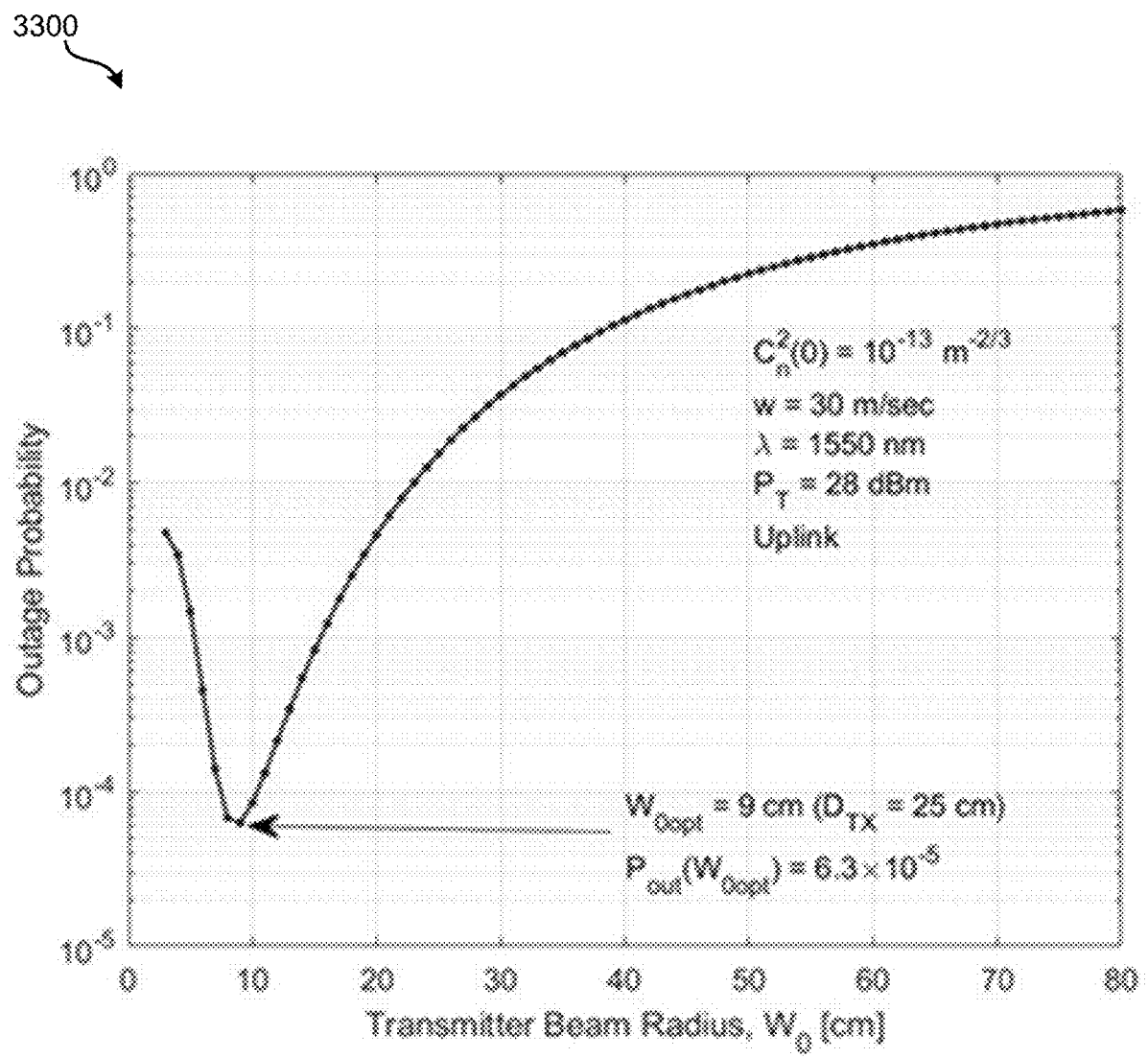
FIG. 33 shows a plot of outage performance of the serial relay-assisted architecture of FIG. 10 as a function of transmitter beam radius.
Figure 34:
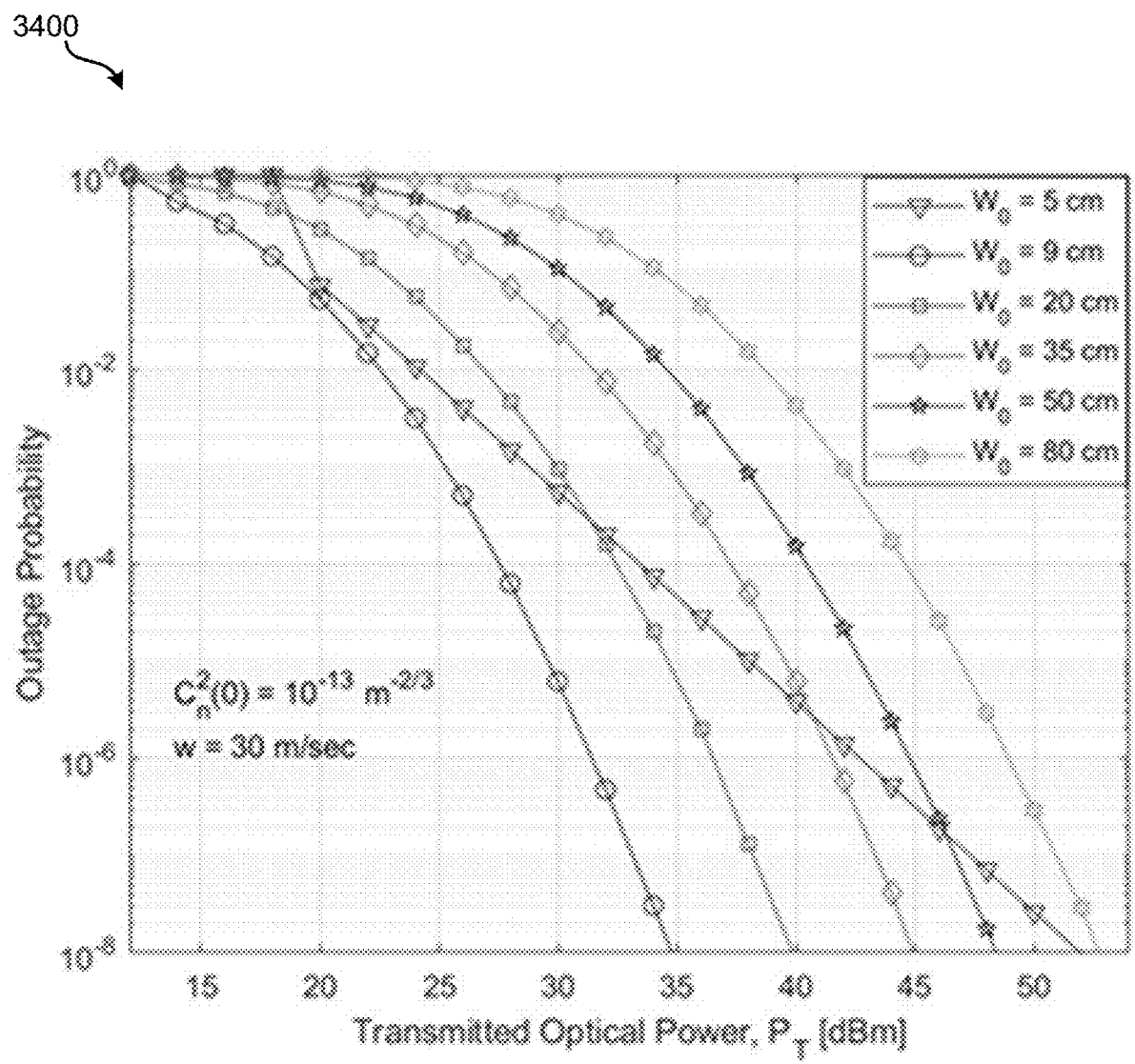
FIG. 34 shows plots of outage performance of the same serial relay-assisted architecture of FIG. 10 as a function of total transmitted optical power for several different transmitter beam radiuses.

FIG. 33 shows a plot 3300 of outage performance of the serial relay-assisted architecture of FIG. 10 as a function of transmitter beam radius. The plot 3300 assumes a fixed total transmitted power and the presence of atmospheric attenuation, free-space path loss, beam scintillation, and beam wander effects. The plot 3300 demonstrates that, for the given channel conditions, the optimum transmitter beam radius is around 9 centimeters (which corresponds to a transmit aperture diameter of around 25 centimeters). To further support this finding, FIG. 34 shows plots 3400 of outage performance of the same serial relay-assisted architecture of FIG. 10 as a function of total transmitted optical power for several different transmitter beam radiuses. Again, the plots 3400 assume the presence of atmospheric attenuation, free-space path loss, beam scintillation, and beam wander. The plots 3400 support the finding in FIG. 33 that the best outage performance is obtained when the transmitter beam radius is optimized.

Figure 35:
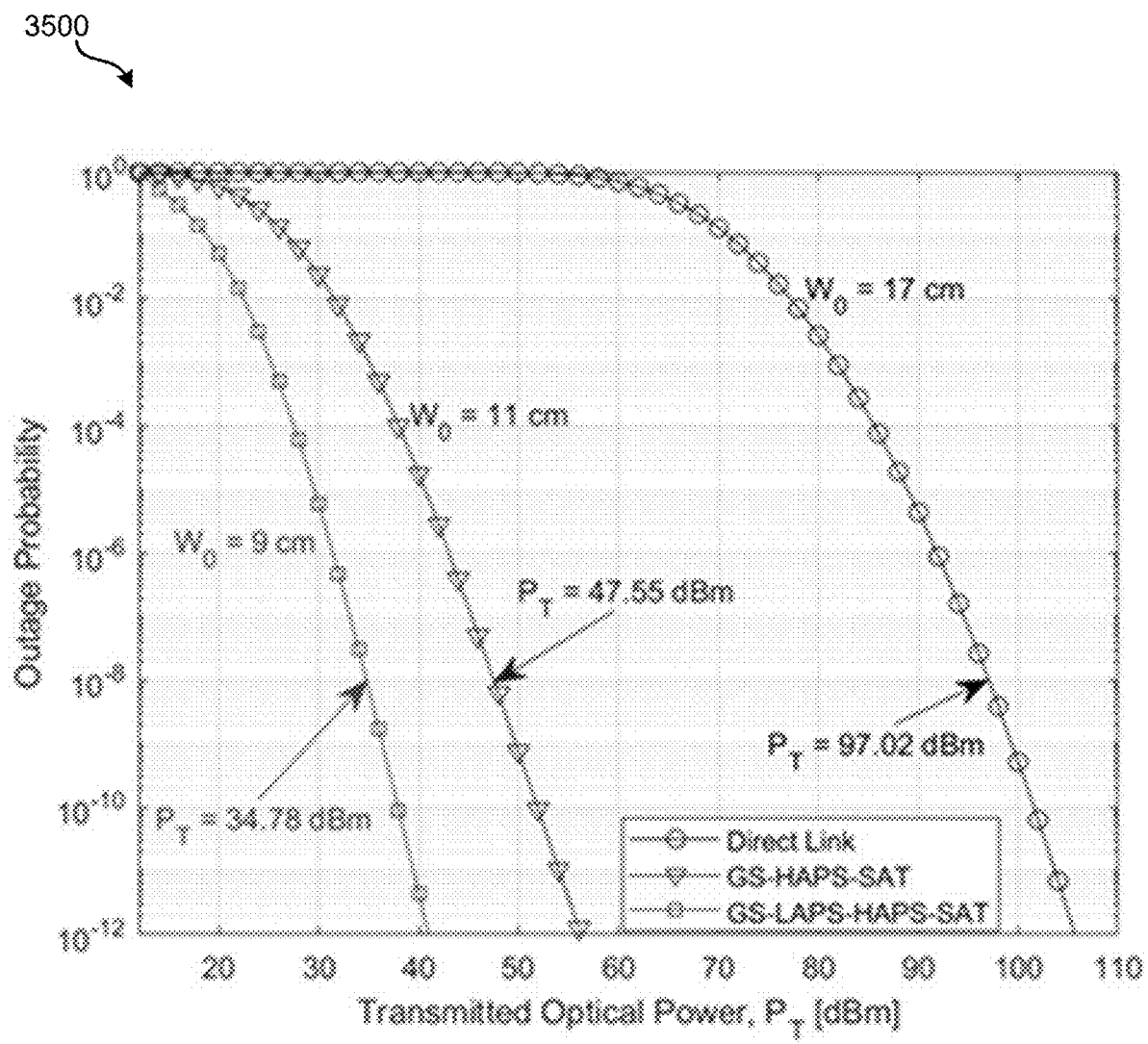
FIG. 35 shows plots of outage performance comparing the direct ground-to-satellite FSO communication link of FIG. 8, the single-relay architecture of FIG. 9, and the serial relay-assisted architecture of FIG. 10, each as a function of total transmitted optical power at their respective optimized transmitter beam radiuses.

For the same of further comparison, FIG. 35 shows plots 3500 of outage performance comparing the direct ground-to-satellite FSO communication link of FIG. 8, the single-relay architecture of FIG. 9, and the serial relay-assisted architecture of FIG. 10, each as a function of total transmitted optical power at their respective optimized transmitter beam radiuses. The plots 3500 assume the presence of atmospheric attenuation, free-space path loss, beam scintillation, and beam wander. It can be seen that adding FSO relays to split the ground-to-satellite FSO link into sub-links appreciably improves the performance of a ground-to-satellite FSO link and also tends to reduce the optimum transmit aperture size. Such a reduction in transmit aperture size can provide the additional feature of reducing the sizes of corresponding optical components, which can reduce cost, reduce weight, and/or be otherwise desirable.

Figure 36:
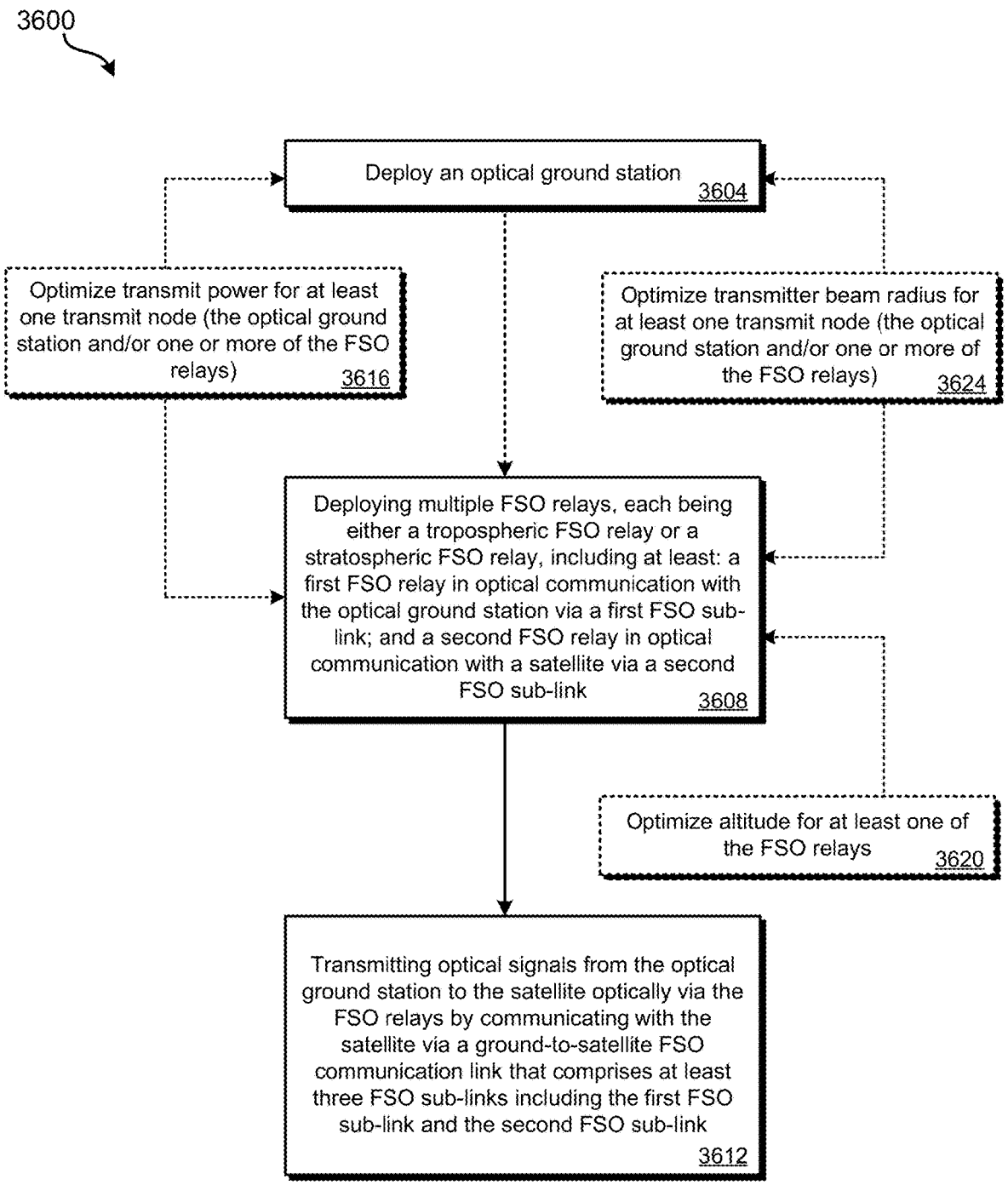
FIG. 36 shows a flow diagram of an illustrative method for providing free space optical (FSO) ground-to-satellite communications, according to embodiments described herein.

FIG. 36 shows a flow diagram of an illustrative method 3600 for providing free space optical (FSO) ground-to-satellite communications, according to embodiments described herein. Embodiments of the method 3600 can be implemented using any of the novel relay-assisted architectures described herein, such as those illustrated in FIG. 4-7, 10, or 11. Embodiments begin at sage 3604 by deploying an optical ground station.

At stage 3608, embodiments can deploy two or more FSO relays. Each FSO relay can be implemented as a tropospheric FSO relay or a stratospheric FSO relay. Each FSO relay can be deployed on an aerial platform, such as a drone, balloon, etc. For example, a tropospheric FSO relay can be deployed on any suitable LAPS, and a stratospheric FSO relay can be deployed on any suitable HAPS. In some embodiments, multiple (e.g., two or more, up to all) of the FSO relays can be deployed on a single aerial platform.

Among the FSO relays is at least a first FSO relay in optical communication with the optical ground station via a first FSO sub-link, and a second FSO relay in optical communication with a satellite via a second FSO sub-link. In some embodiments, the first FSO relay is deployed at a first altitude, and the second FSO relay is deployed at a second altitude higher than the first altitude. For example, the first FSO relay is a tropospheric FSO relay, and the second FSO relay is a stratospheric FSO relay. In other embodiments, the first FSO relay and the second FSO relay are deployed at substantially a same altitude. For example, both of the first and second FSO relays are tropospheric FSO relays, or both of the first and second FSO relays are stratospheric FSO relays.

At stage 3612, embodiments can transmit optical signals from the optical ground station to the satellite optically via the FSO relays by communicating with the satellite via a ground-to-satellite FSO communication link that comprises at least three FSO sub-links including the first FSO sub-link and the second FSO sub-link. In some embodiments, where the second FSO relay is at a higher altitude than that of the first FSO relay, the transmitting at stage 3612 can include communicating serially through at least the first and second FSO relays. In other embodiments, where the first and second FSO relays are at substantially the same altitude, the transmitting at stage 3612 can include communicating in parallel with at least the first and second FSO relays.

Embodiments can include one or more optimizations. In some embodiments, the transmitting at stage 3612 from the optical ground station to the satellite involves multiple transmit nodes including the optical ground station and at least some of the plurality of FSO relays. Each of the transmit nodes participates in the transmission by transmitting at a respective partial transmit power over a respective FSO sub-link of the ground-to-satellite FSO communication link. In such embodiments, the respective partial transmit powers sum to a total transmit power of the ground-to-satellite FSO communication link. In such embodiments, the deploying the plurality of FSO relays at stage 3608 can involve, at stage 3616, for each of at least two transmit nodes, optimizing the respective partial transmit power based on minimizing an outage probability associated with the respective FSO sub-link in the presence of predetermined attenuation factors.

In some embodiments, the deploying the plurality of FSO relays at stage 3608 can involve, for each FSO relay of at least one of the plurality of FSO relays, at stage 3620, optimizing a respective altitude for the FSO relay based on minimizing an outage probability associated with at least one of the FSO sub-links of the ground-to-satellite FSO communication link in the presence of predetermined attenuation factors. In accordance with the optimization, the FSO relays can be deployed at stage 3608 based on optimized respective altitudes.

In some embodiments, the transmitting at stage 3612 from the optical ground station to the satellite involves multiple transmit nodes including the optical ground station and at least some of the plurality of FSO relays. Each of the transmit nodes participates in the transmission by transmitting at a respective transmitter beam radius over a respective FSO sub-link of the ground-to-satellite FSO communication link. In such embodiments, the deploying the plurality of FSO relays at stage 3608 can involve, at stage 3624, for each of at least two transmit nodes, optimizing the respective transmitter beam radius based on minimizing an outage probability associated with the respective FSO sub-link in the presence of predetermined attenuation factors.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A communication system for providing free space optical (FSO) ground-to-satellite communications, the communication system comprising:
   an optical ground station;
   a plurality of FSO relays, each being either a tropospheric FSO relay or a stratospheric FSO relay, the plurality of FSO relays comprising:
      a first FSO relay to communicate with the optical ground station via a first FSO sub-link; and
      a second FSO relay to communicate with a satellite via a second FSO sub-link, wherein:
      the optical ground station is communicatively coupled with the satellite optically via the plurality of FSO relays by communicating with the satellite via a ground-to-satellite FSO communication link that comprises at least three FSO sub-links including the first FSO sub-link and the second FSO sub-link;
      each of the plurality of FSO relays is deployed at a respective altitude thereby defining a path length for each of the FSO sub-links of the ground-to-satellite FSO communication link; and
      the respective altitude for at least one of the plurality of FSO relays is optimized based on decreasing an outage probability associated with at least one of the FSO sub-links in presence of predetermined attenuation factors.

2. The communication system of claim 1, wherein:
   the first FSO relay and the second FSO relay are communicatively coupled optically via a third FSO sub-link; and
   the ground-to-satellite FSO communication link further comprises the third FSO sub-link.

3. The communication system of claim 2, wherein:
   the first FSO relay is a tropospheric FSO relay; and
   the second FSO relay is a stratospheric FSO relay.

4. The communication system of claim 1, wherein:
   the plurality of FSO relays are deployed substantially at a same altitude, each having a respective ground-to-relay FSO sub-link and a respective relay-to-satellite FSO sub-link, the first FSO sub-link being the respective ground-to-relay FSO sub-link for the first FSO relay, and the second FSO sub-link being the respective relay-to-satellite FSO sub-link for the second FSO relay;
   the optical ground station communicates in parallel with each of the plurality of FSO relays via the respective ground-to-relay FSO sub-links; and
   the satellite communicates in parallel with each of the plurality of FSO relays via the respective relay-to-satellite FSO sub-links.

5. The communication system of claim 4, wherein each of the plurality of FSO relays is a stratospheric FSO relay.

6. The communication system of claim 4, wherein each of the plurality of FSO relays is a tropospheric FSO relay.

7. The communication system of claim 4, wherein:
   each of the plurality of FSO relays is deployed on an aerial platform system.

8. The communication system of claim 7, wherein:
   at least two of the plurality of FSO relays are deployed on a same aerial platform system.

9. The communication system of claim 1, wherein:
   the plurality of FSO relays comprises:
      a first one or more FSO relays deployed substantially at a same first altitude, each having a respective ground-to-relay FSO sub-link; and
      a second one or more FSO relays deployed substantially at a same second altitude above the same first altitude, each having a respective relay-to-satellite FSO sub-link; and
   each of the first one or more FSO relays is in optical communication with at least one of the second one or more FSO relays via a relay-to-relay FSO sub-link.

10. The communication system of claim 1, wherein:
    a transmission from the optical ground station to the satellite involves a plurality of transmit nodes including the optical ground station and at least some of the plurality of FSO relays, such that each of the plurality of transmit nodes participates in the transmission by transmitting at a respective partial transmit power over a respective FSO sub-link of the ground-to-satellite FSO communication link;
    the respective partial transmit powers sum to a total transmit power of the ground-to-satellite FSO communication link; and
    for each of at least two transmit nodes, the respective partial transmit power is optimized based on minimizing the outage probability associated with the respective FSO sub-link in presence of predetermined attenuation factors.

11. The communication system of claim 10, wherein the respective partial transmit power is optimized so that the respective partial transmit power allocated to the optical ground station is greater than the respective partial transmit power allocated to any other of the transmit nodes.

12. The communication system of claim 1, wherein:
    a transmission from the optical ground station to the satellite involves a plurality of transmit nodes including the optical ground station and at least some of the plurality of FSO relays, such that each of the plurality of transmit nodes participates in the transmission by transmitting according to a respective transmitter beam radius over a respective FSO sub-link of the ground-to-satellite FSO communication link; and
    for each of at least one transmit node, the respective transmitter beam radius is optimized based on minimizing the outage probability associated with the respective FSO sub-link in presence of predetermined attenuation factors.

13. A method for providing free space optical (FSO) ground-to-satellite communications, the method comprising:
    deploying an optical ground station;
    deploying a plurality of FSO relays, each being either a tropospheric FSO relay or a stratospheric FSO relay, the plurality of FSO relays comprising:
       a first FSO relay in optical communication with the optical ground station via a first FSO sub-link; and
       a second FSO relay in optical communication with a satellite via a second FSO sub-link; and
    transmitting optical signals from the optical ground station to the satellite optically via the plurality of FSO relays by communicating with the satellite via a ground-to-satellite FSO communication link that comprises at least three FSO sub-links including the first FSO sub-link and the second FSO sub-link, wherein:
       the transmitting involves a plurality of transmit nodes, including the optical ground station and at least some of the plurality of FSO relays, such that each of the plurality of transmit nodes participates in the transmission by transmitting at a respective partial transmit power over a respective FSO sub-link of the ground-to-satellite FSO communication link;

the deploying the plurality of FSO relays comprises, for each of at least two transmit nodes, optimizing the respective partial transmit power based on decreasing an outage probability associated with the respective FSO sub-link in presence of predetermined attenuation factors.

14. The method of claim 13, wherein:
the first FSO relay is deployed at a first altitude;
the second FSO relay is deployed at a second altitude higher than the first altitude; and
the transmitting comprises communicating serially through at least the first and second FSO relays.

15. The method of claim 13, wherein:
the first FSO relay and the second FSO relay are deployed at substantially a same altitude; and
the transmitting comprises communicating in parallel with at least the first and second FSO relays.

16. The method of claim 13, wherein the deploying the plurality of FSO relays comprises deploying each of the plurality of FSO relays on an aerial platform system, such that at least two of the plurality of FSO relays are deployed on a same aerial platform system.

17. The method of claim 13, wherein the deploying the plurality of FSO relays comprises, for each FSO relay of at least one of the plurality of FSO relays:
optimizing a respective altitude for the FSO relay based on minimizing the outage probability associated with at least one of the FSO sub-links of the ground-to-satellite FSO communication link in presence of predetermined attenuation factors; and
deploying the FSO relay at the respective altitude.

18. The method of claim 13, wherein:
the deploying the plurality of FSO relays comprises, for each of at least one transmit node, optimizing the respective transmitter beam radius based on minimizing the outage probability associated with the respective FSO sub-link in presence of predetermined attenuation factors.

* * * * *